(12) United States Patent
Palayangoda et al.

(10) Patent No.: US 12,215,276 B2
(45) Date of Patent: *Feb. 4, 2025

(54) PH CONTROL IN FLUID TREATMENT

(71) Applicant: CHEVRON U.S.A. INC., San Ramon, CA (US)

(72) Inventors: Sujeewa S. Palayangoda, San Ramon, CA (US); Kerry Kennedy Spilker, San Ramon, CA (US); Sumitra Subrahmanyan, San Ramon, CA (US); Gayani W. Pinnawala, San Ramon, CA (US); Sophany Thach, San Ramon, CA (US); Gregory A. Winslow, San Ramon, CA (US); Dennis Arun Alexis, San Ramon, CA (US); Harold Charles Linnemeyer, San Ramon, CA (US); Timothy P. Theriot, San Ramon, CA (US); Les Leszek Jackowski, San Ramon, CA (US); Francesca Cibotti, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,710

(22) Filed: Jan. 27, 2023

(65) Prior Publication Data
US 2023/0323193 A1 Oct. 12, 2023

Related U.S. Application Data

(63) Continuation of application No. 17/287,734, filed as application No. PCT/US2019/057462 on Oct. 22, 2019, now Pat. No. 11,591,893.
(Continued)

(51) Int. Cl.
*C09K 8/588* (2006.01)
*C09K 8/03* (2006.01)
(Continued)

(52) U.S. Cl.
CPC .............. *C09K 8/588* (2013.01); *C09K 8/032* (2013.01); *E21B 21/068* (2013.01);
(Continued)

(58) Field of Classification Search
CPC ........ E21B 21/06; E21B 43/35; E21B 43/385; E21B 43/40; C09K 8/58; C09K 8/588;
(Continued)

(56) References Cited

U.S. PATENT DOCUMENTS

| 2,398,338 A | 4/1946 | Walker |
| 2,996,188 A | 8/1961 | May |

(Continued)

FOREIGN PATENT DOCUMENTS

| CN | 105419772 A | 3/2016 |
| DE | 10106342 A1 | 8/2002 |

(Continued)

OTHER PUBLICATIONS

International Search Report and Written Opinion for International Application No. PCT/US2019/057462 dated Jan. 28, 2020.
(Continued)

*Primary Examiner* — Angela M Ditrani Leff
(74) *Attorney, Agent, or Firm* — Meunier Carlin & Curfman LLC

(57) ABSTRACT

Described herein are methods of treating fluid including hydrocarbons, water, and polymer being produced from a hydrocarbon-bearing formation. The methods include adding a concentration of a viscosity reducer to the fluid to degrade the polymer present in the fluid and adding a concentration of a neutralizer to the fluid to neutralize the
(Continued)

viscosity reducer in the fluid. The viscosity reducer is buffered at a pH of 7 or less. The addition of the concentration of the viscosity reducer is in a sufficient quantity to allow for complete chemical degradation of the polymer prior to the addition of the concentration of the neutralizer in the fluid such that excess viscosity reducer is present in the fluid.

20 Claims, 19 Drawing Sheets

Related U.S. Application Data

(60) Provisional application No. 62/748,897, filed on Oct. 22, 2018.

(51) Int. Cl.
  *E21B 21/06* (2006.01)
  *E21B 43/38* (2006.01)

(52) U.S. Cl.
  CPC ........ *E21B 43/385* (2013.01); *C09K 2208/26* (2013.01); *C09K 2208/28* (2013.01)

(58) Field of Classification Search
  CPC . C09K 8/032; C09K 2208/26; C09K 2208/28
  See application file for complete search history.

(56) References Cited

U.S. PATENT DOCUMENTS

| | | | |
|---|---|---|---|
| 3,020,953 A | 2/1962 | Werner et al. | |
| 3,343,601 A | 9/1967 | Pye | |
| 3,811,504 A | 5/1974 | Flournoy et al. | |
| 3,811,505 A | 5/1974 | Flournoy et al. | |
| 3,811,507 A | 5/1974 | Flournoy et al. | |
| 3,847,764 A | 11/1974 | Schievelbein et al. | |
| 3,890,239 A | 6/1975 | Dycus | |
| 3,977,472 A * | 8/1976 | Graham | E21B 43/26 |
| | | | 166/308.4 |
| 4,014,801 A | 3/1977 | Fullinwider et al. | |
| 4,151,077 A | 4/1979 | Abad et al. | |
| 4,463,806 A | 8/1984 | Hurd et al. | |
| 4,486,340 A | 12/1984 | Glass, Jr. | |
| 4,867,896 A | 9/1989 | Elliott et al. | |
| 5,102,558 A | 4/1992 | McDougall et al. | |
| 5,110,486 A | 5/1992 | Manalastas et al. | |
| 5,413,178 A | 5/1995 | Walker et al. | |
| 5,488,148 A | 1/1996 | Weerasooriya et al. | |
| 5,601,700 A | 2/1997 | Bridge et al. | |
| 6,022,843 A | 2/2000 | Shanks et al. | |
| 6,225,267 B1 | 5/2001 | Eckard et al. | |
| 6,288,198 B1 | 9/2001 | Mechtel et al. | |
| 6,382,316 B1 * | 5/2002 | Kintzele | E21B 43/385 |
| | | | 166/305.1 |
| 6,630,205 B2 | 10/2003 | Brueck et al. | |
| 7,093,659 B2 | 8/2006 | Powell et al. | |
| 7,159,658 B2 | 1/2007 | Frost et al. | |
| 7,345,131 B2 | 3/2008 | Selbertinger et al. | |
| 7,629,299 B2 | 12/2009 | Berger et al. | |
| 7,770,641 B2 | 8/2010 | Dwarakanath et al. | |
| 7,923,414 B2 | 4/2011 | Lin et al. | |
| 8,211,837 B2 | 7/2012 | Weerasooriya et al. | |
| 8,383,560 B2 | 2/2013 | Pich et al. | |
| 8,394,872 B2 | 3/2013 | Faust, Jr. et al. | |
| 8,714,247 B1 | 5/2014 | Berger et al. | |
| 8,853,136 B2 | 10/2014 | Bittner et al. | |
| 9,029,491 B2 | 5/2015 | Bischoff et al. | |
| 9,422,469 B2 | 8/2016 | Dwarakanath et al. | |
| 9,605,198 B2 | 3/2017 | Shong et al. | |
| 9,617,464 B2 | 4/2017 | Dwarakanath et al. | |
| 9,752,071 B2 | 9/2017 | Dwarakanath et al. | |
| 9,896,617 B2 | 2/2018 | Dwarakanath et al. | |
| 9,902,894 B2 | 2/2018 | Dwarakanath et al. | |
| 9,902,895 B2 | 2/2018 | Dwarakanath et al. | |
| 9,909,053 B2 | 3/2018 | Dwarakanath et al. | |
| 9,976,072 B2 | 5/2018 | Shong et al. | |
| 10,011,757 B2 | 7/2018 | Dwarakanath et al. | |
| 11,242,739 B2 * | 2/2022 | Subrahmanyan | C09K 8/032 |
| 11,591,893 B2 * | 2/2023 | Palayangoda | E21B 21/068 |
| 2003/0049486 A1 | 3/2003 | Van Ooij et al. | |
| 2005/0199395 A1 | 9/2005 | Berger et al. | |
| 2005/0261138 A1 | 11/2005 | Robb et al. | |
| 2006/0185845 A1 | 8/2006 | Shpakoff et al. | |
| 2006/0189486 A1 | 8/2006 | Shpakoff et al. | |
| 2007/0017402 A1 | 1/2007 | Jordens et al. | |
| 2007/0102359 A1 * | 5/2007 | Lombardi | B01D 61/04 |
| | | | 210/764 |
| 2007/0111898 A1 | 5/2007 | Frost et al. | |
| 2007/0191633 A1 | 8/2007 | Berger et al. | |
| 2008/0090010 A1 | 4/2008 | Zhang et al. | |
| 2008/0280790 A1 | 11/2008 | Mirakyan et al. | |
| 2009/0099287 A1 | 4/2009 | Gier et al. | |
| 2009/0112014 A1 | 4/2009 | Campbell et al. | |
| 2009/0270281 A1 | 10/2009 | Steinbrenner et al. | |
| 2010/0004843 A1 | 1/2010 | Yu et al. | |
| 2010/0291487 A1 | 11/2010 | Nakajima et al. | |
| 2010/0292110 A1 | 11/2010 | Pope et al. | |
| 2010/0319920 A1 | 12/2010 | Pope et al. | |
| 2011/0017677 A1 | 1/2011 | Evans | |
| 2011/0034352 A1 | 2/2011 | Lin et al. | |
| 2011/0046024 A1 | 2/2011 | Campbell et al. | |
| 2011/0048721 A1 | 3/2011 | Pope et al. | |
| 2011/0059872 A1 | 3/2011 | Weerasooriya et al. | |
| 2011/0059873 A1 | 3/2011 | Weerasooriya et al. | |
| 2011/0071057 A1 | 3/2011 | Weerasooriya et al. | |
| 2011/0100402 A1 | 5/2011 | Soane et al. | |
| 2011/0190174 A1 | 8/2011 | Weerasooriya et al. | |
| 2011/0190175 A1 | 8/2011 | Steinbrenner et al. | |
| 2011/0201531 A1 | 8/2011 | Sharma et al. | |
| 2012/0108473 A1 * | 5/2012 | Pich | C09K 8/588 |
| | | | 507/225 |
| 2013/0298644 A1 | 11/2013 | Dean et al. | |
| 2014/0000896 A1 | 1/2014 | Wang et al. | |
| 2014/0116689 A1 | 5/2014 | Bittner et al. | |
| 2014/0182854 A1 | 7/2014 | Mukhopadhyay | |
| 2015/0197686 A1 | 7/2015 | Mason | |
| 2015/0252250 A1 | 9/2015 | Levey et al. | |
| 2016/0122622 A1 | 5/2016 | Dwarakanath et al. | |
| 2016/0122623 A1 | 5/2016 | Dwarakanath et al. | |
| 2016/0122624 A1 | 5/2016 | Dwarakanath et al. | |
| 2016/0122626 A1 | 5/2016 | Dwarakanath et al. | |
| 2017/0158947 A1 | 6/2017 | Kim et al. | |
| 2017/0158948 A1 | 6/2017 | Kim et al. | |
| 2017/0198202 A1 | 7/2017 | Shong et al. | |
| 2017/0313888 A1 | 11/2017 | Curran et al. | |
| 2018/0031462 A1 | 2/2018 | Dwarakanath et al. | |
| 2018/0155505 A1 | 6/2018 | Kim et al. | |
| 2018/0275036 A1 | 9/2018 | Dwarakanath et al. | |
| 2019/0002754 A1 | 1/2019 | Yang et al. | |
| 2020/0116003 A1 | 4/2020 | Gawade et al. | |

FOREIGN PATENT DOCUMENTS

| | | |
|---|---|---|
| DE | 10153352 C2 | 10/2003 |
| DE | 102004050747 A1 | 4/2006 |
| DE | 102007020404 A1 | 10/2008 |
| EP | 3870668 A1 | 9/2021 |
| FR | 2984397 B1 | 12/2015 |
| WO | 2005/035676 A1 | 4/2005 |
| WO | 2009/030538 A1 | 3/2009 |
| WO | 2016153792 A1 | 9/2016 |
| WO | 2017100344 A1 | 6/2017 |
| WO | 2018106913 A1 | 6/2018 |
| WO | 2019006369 A1 | 1/2019 |
| WO | 2020086599 A1 | 4/2020 |

OTHER PUBLICATIONS

Odile Rambeau, "Management of Viscosity of the Back Produced Viscosified Water", SPE 179776, Jan. 1, 2016, 12 pages.

(56) References Cited

OTHER PUBLICATIONS

Valeria Oldani et al., "Use of a sol-gel hybrid coating composed by a fluoropolymer and silica for the mitigation of mineral fouling in heat exchangers", Applied Thermal Engineering, vol. 106, Aug. 1, 2016, pp. 427-431.
"Gel Breakers", Society of Petroleum Engineers, http://petrowiki.org/Gel_breakers#Bleach[May 22, 2017 2:49:48 PM], Jun. 9, 2015. 5 pages.
Barnes, Julian et al., "Application of Internal Olefin Sulfonates and Other Surfactants to EOR. Part 1: Structure-Performance Relationships for Selection at Different Reservoir Conditions", 2010 SPE Improved Oil Recovery Symposium, SPE 129766, Apr. 24-28, 2010.
Dwarakanath, Varadarajan et al., "Permeability Reduction Due to use of Liquid Polymers and Development of Remediation Options", 2016 SPE Improved Oil Recovery Conference, SPE-179657-MS, Apr. 11-13, 2016.
Koh, Heesong et al., "Experimental Investigation of the Effect of Polymers on Residual Oil Saturation", 2016 SPE Improved Oil Recovery Conference, Apr. 11-13, 2016. 23 pages.
Koh, Heesong, "Experimental Investigation of the Effect of Polymers on Residual Oil Saturation Dissertation Part 1", Jan. 2015.
Koh, Heesong, "Experimental Investigation of the Effect of Polymers on Residual Oil Saturation Dissertation Part 2", Jan. 2015.
Koh, Heesong, "Experimental Investigation of the Effect of Polymers on Residual Oil Saturation Dissertation Part 3", Jan. 2015.
Koh, Heesong, "Experimental Investigation of the Effect of Polymers on Residual Oil Saturation Dissertation Part 4", Jan. 2015.
Levitt, Benjamin D., "The Optimal Use of Enhanced Oil Recovery Polymers Under Hostile Conditions Dissertation Part 1", May 2009.
Levitt, Benjamin D., "The Optimal Use of Enhanced Oil Recovery Polymers Under Hostile Conditions Dissertation Part 2", May 2009.
Levitt, Benjamin D., "The Optimal Use of Enhanced Oil Recovery Polymers Under Hostile Conditions Dissertation Part 3", May 2009.
Magbagbeola, Oluwaseun A., "Quantification of the Visoelastic Behavior of High Molecular Weight Polymers used for Chemical Enhanced Oil Recovery Thesis Part 1", Dec. 2008.
Magbagbeola, Oluwaseun A., "Quantification of the Visoelastic Behavior of High Molecular Weight Polymers used for Chemical Enhanced Oil Recovery Thesis Part 2", Dec. 2008.
Magbagbeola, Oluwaseun A., "Quantification of the Visoelastic Behavior of High Molecular Weight Polymers used for Chemical Enhanced Oil Recovery Thesis Part 3", Dec. 2008.
Search Report Under Section 17(5) issued in UK Application No. 1915275.0 mailed Jul. 1, 2020.
Examination report issued for Application No. GB1915275, dated Apr. 27, 2022.
Thomas et al., Some Key Features to Consider When Studying Acrylamide-Based Polymers for Chemical Enhanced Oil Recovery, Oil & Gas Science and Technology, vol. 67, 2012, No. 6, pp. 887-902 (Year: 2012).
Office Action issued on Mar. 14, 2024, in corresponding Canadian Patent Application No. 3117034, 4 pages.

* cited by examiner

APPROXIMATELY, 7 MIN AFTER THE ADDITION OF 100 PPM SODIUM HYPOCHLORITE.

ABSENCE OF ANY GELLING IS OBSERVED IN THE SAMPLE CONTAINING APPROXIMATELY 100 PPM SODIUM HYPOCHLORITE. THE CONTROL AND THE SAMPLE WERE HEATED AT 120°C FOR 60 H.

PH CONTROL IN FLUID TREATMENT

CROSS REFERENCES TO RELATED APPLICATIONS

This application is a continuation of U.S. application Ser. No. 17/287,734, filed Oct. 22, 2019, which is a national stage application filed under 35 U.S.C. § 371 of PCT/US2019/057462 filed Oct. 22, 2019, which claims the benefit of U.S. Provisional Application No. 62/748,897 filed Oct. 22, 2018, which are hereby incorporated herein by reference in their entireties.

TECHNICAL FIELD

The present disclosure is generally related to treating a fluid, especially treating a fluid comprising hydrocarbons, water, and polymer, such as in enhanced oil recovery (EOR) in the hydrocarbon industry.

BACKGROUND

A fluid is sometimes injected into a hydrocarbon-bearing formation to improve hydrocarbon production. For example, enhanced oil recovery includes the injection of a fluid containing a polymer into the formation. The formation can be flooded with the polymer to increase the viscosity of the water and control (i.e., decrease) the mobility of water that is injected into the formation during the flood, and thus, increase sweep efficiency. The polymer flood, as it is often called, may increase the rate and/or total volume of produced hydrocarbons. In a typical polymer flood, polymer from a source is mixed on-site with a fluid to form the injection fluid, and then the injection fluid is injected into the formation through an injection wellbore. The mixing process can vary depending on the initial state of the polymer as it is supplied. Unfortunately, the fluid being produced from the formation via a production wellbore, often referred to as produced fluid, may contain polymer from the injection fluid that negatively impacts surface fluid processing equipment. Furthermore, the fluid containing the polymer may also negatively impact downhole fluid lifting equipment in the production wellbore. For example, the negative impact of the polymer may include polymer scaling, Therefore, a need exists in the art for an improved manner of treating a fluid, especially a fluid comprising hydrocarbons, water, and polymer, such as in enhanced oil recovery in the hydrocarbon industry.

SUMMARY

Embodiments of treating fluid comprising hydrocarbons, water, and polymer being produced from a hydrocarbon-bearing formation via a production wellbore are provided herein. One embodiment of a method of treating fluid comprising hydrocarbons, water, and polymer being produced from a hydrocarbon-bearing formation via a production wellbore comprises adding a concentration of a viscosity reducer to the fluid to degrade the polymer present in the fluid and adding a concentration of a neutralizer to the fluid to neutralize the viscosity reducer in the fluid. The viscosity reducer can be buffered at a pH of 7 or less (e.g., a pH of from 2 to 7, a pH of from 3.5 to 7, or a pH of from 5 to 7). The addition of the concentration of the viscosity reducer is in a sufficient quantity to allow for complete chemical degradation of the polymer prior to the addition of the concentration of the neutralizer in the fluid such that excess viscosity reducer is present in the fluid. The addition of the concentration of the neutralizer is sufficiently upstream of any surface fluid processing equipment to allow for complete neutralization of the excess viscosity reducer such that excess neutralizer is present in the fluid prior to the fluid reaching any of the surface fluid processing equipment. In some embodiments, the method can further comprise performing a colorimetric assay to monitor the chemical degradation of the polymer, to determine a pH at which to buffer the viscosity reducer, to determine the concentration of the viscosity reducer to add to the fluid, or any combination thereof.

One embodiment of a system of treating fluid comprising hydrocarbons, water, and polymer being produced from a hydrocarbon-bearing formation via a production wellbore comprises a production wellbore for producing fluid comprising hydrocarbons, water, and polymer from a hydrocarbon-bearing formation. The embodiment of the system also comprises a first injection apparatus for adding a concentration of a viscosity reducer to the fluid to degrade the polymer present in the fluid. The embodiment of the system also comprises a second injection apparatus for adding a concentration of a neutralizer to the fluid to neutralize the viscosity reducer in the fluid. The embodiment of the system also comprises surface fluid processing equipment for separating the hydrocarbons from the fluid. The viscosity reducer can be buffered at a pH of 7 or less (e.g., a pH of from 2 to 7, a pH of from 3.5 to 7, or a pH of from 5 to 7). The addition of the concentration of the viscosity reducer is in a sufficient quantity to allow for complete chemical degradation of the polymer prior to the addition of the concentration of the neutralizer in the fluid such that excess viscosity reducer is present in the fluid. The addition of the concentration of the neutralizer is sufficiently upstream of any of the surface fluid processing equipment to allow for complete neutralization of the excess viscosity reducer such that excess neutralizer is present in the fluid prior to the fluid reaching any of the surface fluid processing equipment.

DESCRIPTION OF THE DRAWINGS

FIG. 14A) and NaOCl buffered at pH 6.5 (FIG. 14B) over 7 minutes.

Figure 1:
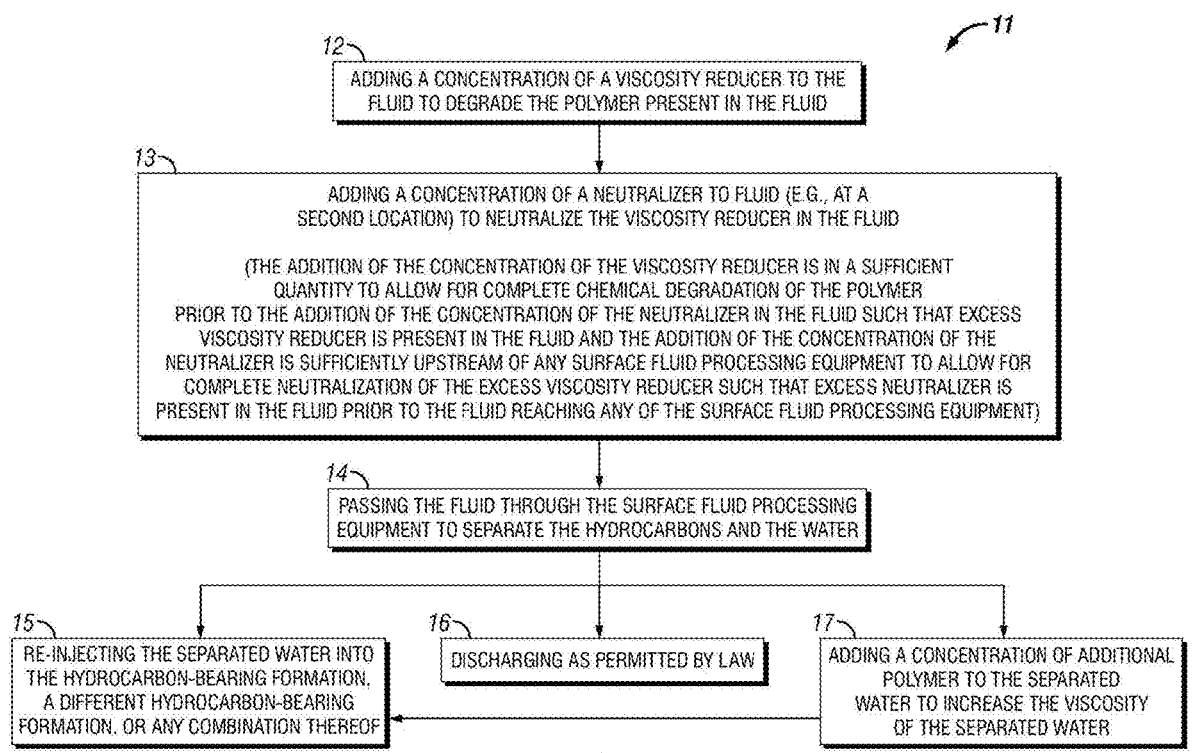
FIG. 1 illustrates one embodiment of a method of treating fluid comprising hydrocarbons, water, and polymer being produced from a hydrocarbon-bearing formation via a production wellbore.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Hydrocarbon-bearing formation: Hydrocarbon exploration processes, hydrocarbon recovery processes, or any combination thereof may be performed on a "hydrocarbon-bearing formation". The hydrocarbon-bearing formation refers to practically any volume under a surface containing hydrocarbons therein. For example, the hydrocarbon-bearing formation may be practically anything under a terrestrial surface (e.g., a land surface), practically anything under a seafloor, etc. A water column may be above the hydrocarbon-bearing formation, such as in marine hydrocarbon exploration, in marine hydrocarbon recovery, etc. The hydrocarbon-bearing formation may be onshore. The hydrocarbon-bearing formation may be offshore with shallow water or deep water above the hydrocarbon-bearing formation. The hydrocarbon-bearing formation may include faults, fractures, overburdens, underburdens, salts, salt welds, rocks, sands, sediments, pore space, etc. The hydrocarbon-bearing formation may include practically any geologic point(s) or volume(s) of interest (such as a survey area) in some embodiments.

The hydrocarbon-bearing formation includes hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Indeed, examples of hydrocarbons are many and may include oil, natural gas, kerogen, bitumen, clathrates (also referred to as hydrates), etc. The hydrocarbons may be discovered by hydrocarbon exploration processes.

The hydrocarbon-bearing formation may also include at least one wellbore. For example, at least one wellbore may be drilled into the hydrocarbon-bearing formation in order to confirm the presence of the hydrocarbons. As another example, at least one wellbore may be drilled into the hydrocarbon-bearing formation in order to recover (also referred to as produce) the hydrocarbons. The hydrocarbons may be recovered from the entire hydrocarbon-bearing formation or from a portion of the hydrocarbon-bearing formation. For example, the hydrocarbon-bearing formation may be divided up into one or more hydrocarbon zones, and hydrocarbons may be recovered from each desired hydrocarbon zone. One or more of hydrocarbon zones may even be shut-in to increase hydrocarbon recovery from a hydrocarbon zone that is not shut-in.

The hydrocarbon-bearing formation, the hydrocarbons, or any combination thereof may also include non-hydrocarbon items. For example, the non-hydrocarbon items may include connate water, brine, tracers, items used in enhanced oil recovery or other hydrocarbon recovery processes, items from other treatments (e.g., gels used in conformance control), etc.

In short, each hydrocarbon-bearing formation may have a variety of characteristics, such as petrophysical rock properties, reservoir fluid properties, reservoir conditions, hydrocarbon properties, or any combination thereof. For example, each hydrocarbon-bearing formation (or even zone or portion of the hydrocarbon-bearing formation) may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, hydrate, mineral, metal, a hydrocarbon-bearing formation having a permeability in the range of 0.01 microdarcy to 10 millidarcy, a hydrocarbon-bearing formation having a permeability in the range of 10 millidarcy to 40,000 millidarcy, etc.

The term "hydrocarbon-bearing formation" may be used synonymously with the term "reservoir" or "subsurface reservoir" or "subsurface region of interest" or "formation" or "subsurface formation" or "subsurface volume of interest". Thus, the terms "hydrocarbon-bearing formation," "hydrocarbons," and the like are not limited to any description or configuration described herein.

Wellbore: A wellbore refers to a single hole, usually cylindrical, that is drilled into the hydrocarbon-bearing formation for hydrocarbon exploration, hydrocarbon recovery, surveillance, or any combination thereof. The wellbore is surrounded by the hydrocarbon-bearing formation and the wellbore is in fluidic communication with the hydrocarbon-bearing formation (e.g., via perforations). The wellbore is also in fluidic communication with the surface, such as a surface facility that may include oil/gas/water separators, gas compressors, storage tanks, pumps, gauges, sensors, meters, pipelines, etc.

The wellbore may be used for injection (referred to as an injection wellbore) in some embodiments. The wellbore may be used for production (referred to as a production wellbore) in some embodiments. The wellbore may be used for a single function, such as only injection, in some embodiments. The wellbore may be used for a plurality of functions, such as production then injection, in some embodiments. The use of the wellbore may also be changed, for example, a particular wellbore may be turned into an injection wellbore after a different previous use such as production. The wellbore may be drilled amongst existing wellbores, for example, as an infill wellbore. A plurality of wellbores (e.g., tens to hundreds of wellbores) are often used in a field to recover hydrocarbons. As an example, hydrocarbons may be swept from at least one injection wellbore towards at least one production wellbore and up towards the surface for processing.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel) between the vertical section of the horizontal wellbore and the horizontal section of the horizontal wellbore.

The wellbore may include a plurality of components, such as, but not limited to, a casing, a liner, a tubing string, a heating element, a sensor, a packer, a screen, a gravel pack, etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the hydrocarbon-bearing formation, producing a fluid from the hydrocarbon-bearing formation, or any combination thereof. The casing may be cemented in place, with the cement positioned in the annulus between the hydrocarbon-bearing formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the specifics of the wellbore, the hydrocarbon-bearing formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the hydrocarbon-bearing formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the hydrocarbon-bearing formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the hydrocarbon-bearing formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or EOR refers to techniques for increasing the amount of hydrocarbons that may be extracted from the hydrocarbon-bearing formation. Enhanced oil recovery may also be referred to as tertiary oil recovery. Secondary recovery is sometimes just referred to as improved oil recovery or enhanced oil recovery.

EOR processes include, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer flooding, surfactant-polymer flooding, or alkaline-surfactant-polymer flooding), (c) microbial injection, (d) thermal recovery (which includes, for example, cyclic steam and steam flooding), or any combination thereof.

Indeed, an EOR process may include practically any flooding involving polymer, a chemical agent, or any combination thereof. For example, the EOR process may comprise a polymer (P) flooding process, an alkaline-polymer (AP) flooding process, a surfactant-polymer (SP) flooding process, an alkaline-surfactant-polymer (ASP) flooding process, or any combination thereof.

Turning to the EOR process, the polymer can be initially provided as a powder that is mixed on-site. Alternatively, the polymer can be initially provided in a partial-strength solution, such as gel, emulsion, or liquid that is made up partly of polymer (e.g., 2%-60% polymer) in a solute such as water. An injection fluid may be mixed on-site to include the polymer, e.g., by mixing the polymer (that may have been initially provided as a powder, gel, emulsion, or liquid) with a solute such as water. Preparing the powder polymer may involve at least one additional mixing step and storage of the result in a tank (e.g., tank on the surface). The result from the tank is then mixed with the solute to form the injection fluid. The injection fluid may also include other components in addition to the polymer.

In one embodiment, an injection fluid may include a variety of components. For example, the injection fluid may include (i) a water or aqueous phase component, such as brine, a mixture of brine and gas, etc. The injection fluid may include (ii) a polymer component, and the polymer component may even include various constituents such as water, mineral oil, one or more solvents, one or more optional additives, etc. The polymer component may include additional and/or alternative constituents as well. The injection fluid may include (iii) a third component, such as one or more solvents, one or more optional additives, etc. The third component may include additional and/or alternative constituents as well. For example, the polymer component may include surfactant and the third component may also include surfactant. The injection fluid may include additional components as well, for example, that may be mixed on-site. Thus, the injection fluid may include a variety of components, and the actual components of the injection fluid may depend, for example, on the hydrocarbon-bearing formation and the hydrocarbons.

The injection fluid is injected into at least one injection wellbore through the wellhead of each injection wellbore using at least one pump. The hydrocarbons will typically be swept from the injection wellbore drilled into the hydrocarbon-bearing formation through the hydrocarbon-bearing formation towards at least one production wellbore drilled into the hydrocarbon-bearing formation, enter the at least one production wellbore, and flow up to the surface for processing.

The physical equipment to be used in preparing and injecting the injection fluid may be dependent on the specifics of the injection fluid, the specifics of the polymer, the specifics of the injection wellbore(s), specifics of the production wellbore(s), the specifics of the hydrocarbon-bearing formation, etc. However, for simplicity, the term "injection apparatus" is meant to represent any tank(s), mixer(s), pump(s), manifold(s), pipeline(s), valve(s), fluid(s), polymer(s), chemical agent(s), and other equipment and techniques related to preparing the injection fluid comprising the polymer and injecting the injection fluid. The "injection apparatus" may even be utilized for another injection in some embodiments.

Water: The term "water" may be practically any aqueous-based liquid that may be injected into the hydrocarbon-bearing formation. In some embodiments, the water may comprise brine (e.g., reservoir or synthetic brine), sea water, brackish water, river water, lake or pond water, aquifer water, wastewater (e.g., reclaimed or recycled), flowback or produced formation brine, fresh water, or any combination thereof. Water can have any salt content. In some embodiments, brines may comprise, but are not necessarily limited to, heavy brines, monovalent brines, divalent brines, and trivalent brines that comprise soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any derivative thereof, or any combination thereof. The term "water" may be used synonymously with the terms "brine" or "solute". The term "water" is not limited to any description or configuration described herein.

Polymer: The term "polymer" refers to practically any polymer that may be injected into and/or produced from the hydrocarbon-bearing formation. As indicated hereinabove, for example, the polymer may be initially provided as a powder that is mixed on-site by at least one mixer. Examples of suitable powder polymers include biopolymers or synthetic polymers. Examples of suitable powder polymers may also include any mixture of these powder polymers (including any modifications of these powder polymers). The "polymer" may even comprise a plurality of polymers in some embodiments. As indicated hereinabove, as another example, the polymer may be initially provided in a partial-strength solution, such as gel, emulsion, or liquid that is made up partly of polymer in a solute such as water (e.g., brine). Depending on the specific embodiment, the "polymer" may be a polymer composition, a polymer solution, a polymer suspension, polymer dispersion, a liquid polymer, etc. Thus, the "polymer" itself may be made up of various constituents. The "polymer" itself may be made up of various constituents such as water, mineral oil, one or more solvents, one or more optional additives, or any combination thereof. The polymer component may include additional and/or alternative constituents as well.

As discussed hereinabove, the injection fluid can be mixed on-site to include the polymer, e.g., by mixing the polymer (may have been initially provided as a powder, gel, emulsion, or liquid), with a solute such as water. At least some of the polymer from the injection fluid may become a component of the fluid being produced from the hydrocarbon-bearing formation via the production wellbore regardless of how the polymer was initially provided, mixed, and injected. For example, polymer such as HPAMs and/or AMPS, discussed further hereinbelow, may be present in the fluid being produced from the hydrocarbon-bearing formation via the production wellbore regardless of how the HPAMs and/or AMPs was initially provided, mixed, and injected.

Turning to powder polymer, a powder polymer may be selected or tailored according to the characteristics of the hydrocarbon-bearing formation for the EOR process such as permeability, temperature, salinity, or any combination thereof. Examples of suitable powder polymers include biopolymers such as polysaccharides. Polysaccharides can be xanthan gum, scleroglucan, guar gum, schizophyllan, any derivative thereof (e.g., such as a modified chain), or any combination thereof. Examples of suitable powder synthetic polymers include polyacrylamides, partially hydrolyzed polyacrylamides (HPAMs or PHPAs), hydrophobically-modified associative polymers (APs), or any combination thereof. Also included are co-polymers of polyacrylamide (PAM) and one or both of 2-acrylamido 2-methylpropane sulfonic acid (and/or sodium salt) commonly referred to as AMPS (also more generally known as acrylamido tertiary-butyl sulfonic acid or ATBS), N-vinyl pyrrolidone (NVP), and the NVP-based synthetic may be single-, co-, or ter-polymers. In one embodiment, the polymer is selected from the group of polyacrylamides, partially hydrolyzed polyacrylamides, hydrophobically-modified associative polymers, copolymers of polyacrylamide and one or both of 2-acrylamido 2-methylpropane sulfonic acid and salts thereof and N-vinyl pyrrolidone, single-, co-, or ter-polymers of N-vinyl pyrrolidones, polyacrylic acid, polyvinyl alcohol, and mixtures thereof. In one embodiment, the powder synthetic polymer comprises polyacrylic acid (PAA). In one embodiment, the powder synthetic polymer comprises polyvinyl alcohol (PVA). Copolymers may be made of any combination or mixture above, for example, a combination of NVP and ATBS. Thus, examples of suitable powder polymers include biopolymers or synthetic polymers. Examples of suitable powder polymers can also include any mixture of these powder polymers (including any modifications of these powder polymers). Indeed, the terminology "mixtures thereof" or "combinations thereof" can even include "modifications thereof" herein.

In one embodiment, the powder polymer is an anionic polyacrylamide having a charge ranging from 0 to about 40%, which may be a result of the reaction to form polyacrylamide that generally starts with about 0% to about 40% acrylic acid or acrylate salt. The polymer that may be formed with acrylic acid or an acid salt monomer is called anionic polyacrylamide because the polymer itself contains a negative charge, which is balanced by a cation, usually sodium. A polymer made with little or no acid or acrylate salt is considered nonionic polyacrylamide because the polymer essentially contains no charge. The powder polymer has an average molecular weights (Mw) of: 0.5 to 30 Million Daltons in one embodiment; from 1 to 15 Million Daltons in a second embodiment; at least 2 Million Daltons in a third embodiment; from 4 to 25 Million Daltons in a fourth embodiment; less than or equal to 25 Million Daltons in a fifth embodiment; and at least 0.5 Million Daltons in a sixth embodiment.

In some embodiments, the polymer powders have an average particle size of at least 5 mesh in one embodiment, 10-100 mesh in a second embodiment, and 40-400 mesh in a third embodiment. The polymer powder undergoes an additional milling, grinding, or crushing prior to mixing with the water-soluble solvent in the preparation, for a particle size of 1-1000 μm in one embodiment; from 10-500 μm in a second embodiment; at least 5 μm in a third embodiment; and from 20-500 μm in a fourth embodiment.

Liquid polymers may be utilized in some embodiments. For example, an inverted polymer solution may be prepared by providing a liquid polymer (LP) composition comprising: one or more hydrophobic liquids having a boiling point at least 100° C.; at least 39% by weight of one or more synthetic (co) polymers; one or more emulsifier surfactants; and one or more inverting surfactants. Preparing the inverted polymer solution may also comprise inverting the LP composition in an aqueous fluid to provide an inverted polymer solution having a concentration of synthetic (co) polymer of from 50 to 15,000 ppm. The inverted polymer solution has a filter ratio of 1.5 or less at 15 psi using a 1.2 micron filter. The inverted polymer solution may be used in an enhanced oil recovery (EOR) operation. The term operation may be used interchangeably with process or application as in EOR process or EOR application.

As another example, an inverted polymer solution may be prepared by providing a liquid polymer (LP) composition in the form of an inverse emulsion comprising: one or more hydrophobic liquids having a boiling point at least 100° C.; up to 38% by weight of one or more synthetic (co) polymers; one or more emulsifier surfactants; and one or more inverting surfactants. Preparing the inverted polymer solution may also comprise inverting the LP composition in an aqueous fluid to provide an inverted polymer solution having a concentration of synthetic (co) polymer of from 50 to 15,000 ppm. The inverted polymer solution has a filter ratio of 1.5 or less at 15 psi using a 1.2 micron filter. The inverted polymer solution may be used in an enhanced oil recovery (EOR) operation.

As another example, an inverted polymer solution may be prepared by providing a liquid polymer (LP) composition in the form of an inverse emulsion comprising: one or more hydrophobic liquids having a boiling point at least 100° C.; up to 35% by weight of one or more synthetic (co) polymers; one or more emulsifier surfactants; and one or more inverting surfactants. Preparing the inverted polymer solution may also comprise inverting the LP composition in an aqueous fluid to provide an inverted polymer solution having a concentration of synthetic (co) polymer of from 50 to 15,000 ppm. The inverted polymer solution has a filter ratio of 1.5 or less at 15 psi using a 1.2 micron filter. The inverted polymer solution may be used in an enhanced oil recovery (EOR) operation.

At least one stabilizer may also be utilized in the context of liquid polymers in some embodiments. In one embodiment, the filter ratio of 1.5 or less may comprise a filter ratio of 1 to 1.5. In one embodiment, the filter ratio of 1.5 or less may comprise a filter ratio of 1 to 1.1. In one embodiment, the filter ratio of 1.5 or less may comprise a filter ratio of 1 to 1.2. In one embodiment, the filter ratio of 1.5 or less may comprise a filter ratio of 1 to 1.3. In one embodiment, the filter ratio of 1.5 or less may comprise a filter ratio of 1 to 1.4. In one embodiment, the filter ratio has a range of 1.1 to 1.3. In one embodiment, the filter ratio of 1.5 or less may comprise a minimum of 1. In one embodiment, the filter ratio is 1.5 or less as well as more than 1. The filter ratio can be determined using the 1.2 μm filter at 15 psi (plus or minus 10% of 15 psi), for example, at ambient temperature (e.g., 25° C.). The 1.2 micron filter can have a diameter of 47 mm or 90 mm, and the filter ratio can be calculated as the ratio of the time for 180 to 200 ml of the injection fluid to filter divided by the time for 60 to 80 ml of the injection fluid to filter:

$$FR = \frac{t200 \text{ ml} - t180 \text{ ml}}{t80 \text{ ml} - t60 \text{ ml}}$$

One embodiment of recovering hydrocarbons using a liquid polymer comprises: (a) providing a subsurface reservoir containing hydrocarbons there within; (b) providing a wellbore in fluid communication with the subsurface reservoir; (c) preparing an inverted polymer solution, such as in any of the examples above; and (d) injecting the inverted polymer solution through the wellbore into the subsurface reservoir.

Discussions on polymers, polymer mixing, and the like may be found in the following: U.S. Pat. Nos. 9,909,053, 9,896,617, 9,902,894, 9,902,895 11,084,973, 10,344,129, 10,865,279, 11,261,300, U.S. Patent App. Pub. No. 2018/0031462, U.S. Ser. No. 15/996,040 with U.S. Patent App. Pub. No. 2018-0275036, U.S. Patent App. Pub. No. 2017/0158947, U.S. Patent App. Pub. No. 2017/0158948, US Patent App. Pub. No. 2018/0155505, U.S. Ser. No. 16/024,147 with U.S. Patent App. Pub. No. 2019/0002754, App. No. PCT/US18/040401 with U.S Patent Pub. No. 2022/0127518, and U.S. Pat. No. 11,220,622, and Dwarakanath et al., "Permeability Reduction Due to use of Liquid Polymers and Development of Remediation Options," SPE 179657, SPE IOR Symposium in Tulsa, 2016, each of which is incorporated by reference.

Solvent: The term "solvent" may refer to practically any solvent that may be injected into a hydrocarbon-bearing formation. The solvent may be a water-soluble solvent. The water soluble solvent may be selected from one or more of surfactants (e.g., non-ionic surfactants), ethers (e.g., glycol ethers), alcohols, co-solvents, or any combination thereof, for an HLB of greater than or equal to 8 (e.g., at least 8) as measured by methods known in the art, e.g., NMR, gas-liquid chromatography, or invert emulsion experiments using Griffin's method or Davies's method. In one embodiment, the HLB is about 10 to about 20. In another embodiment, the HLB is less than or equal to 15. Examples of suitable water-soluble solvents can also include any mixture of these water-soluble solvents (including any modifications of these water soluble solvents). For example, the water-soluble solvent can include a mixture of non-ionic and anionic surfactants. The anionic surfactant can be present in an amount of less than or equal to 5 wt. % as a stabilizer.

Examples of suitable water-soluble solvents include, but are not limited to, (a) alcohol ethoxylates (-EO-), (b) alcohol alkoxylates (-PO-EO-), (c) alkyl polyglycol ethers, (d) alkyl phenoxy ethoxylates, (e) an ethylene glycol butyl ether (EGBE), (f) a diethylene glycol butyl ether (DGBE), (g) a triethylene glycol butyl ether (TEGBE), (h) polyoxyethylene nonylphenylether, branched, or (i) any combination thereof. In one embodiment, the water-soluble solvent comprises an alcohol, such as isopropyl alcohol (IPA), isobutyl alcohol (IBA), secondary butyl alcohol (SBA), or any combination thereof. In another embodiment, the water-soluble solvent comprises a low MW ether such as ethylene glycol monobutyl ether.

In embodiments with the use of HPAM type synthetic polymers, a non-ionic surfactant is used as the water-soluble solvent. In yet another embodiment, a mixture or combination of surfactants is used, e.g., non-ionic surfactants and anionic surfactants in a weight ratio ranging from 6:1 to 2:1. Examples of non-ionic surfactants for use as the water-soluble solvents comprise ethoxylated surfactants, nonylphenol ethoxylates or alcohol ethoxylate, other ethoxylated surfactants, or any combination thereof. In another embodiment, the anionic surfactants comprise internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy] sulfates, alkyl sulfonate, alpha olefin sulfonates (AOS), sulfosuccinate (e.g., dihexyl sulfosuccinate), or any combination thereof. In yet another embodiment, the water-soluble solvent comprises alkylpolyalkoxy sulfates as disclosed in U.S. Pat. No. 8,853,136, sulfonated amphoteric surfactants as disclosed in U.S. Pat. No. 8,714,247, surfactants based on anionic alkyl alkoxylates as disclosed in US Patent Publication No. 20140116689, or any combination thereof, each of which are incorporated herein by reference in its entirety.

In one embodiment, the water-soluble solvent comprises isopropyl alcohol (IPA), n-propyl alcohol, isobutyl alcohol (IBA), methyl-isobutyl alcohol, secondary butyl alcohol (SBA), ethylene glycol monobutyl ether, diethylene glycol monobutyl ether, triethylene glycol monobutyl ether, or any combination thereof. In one embodiment, the water soluble solvent comprises an ionic surfactant selected from ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, alpha olefin sulfonates (AOS), sulfosuccinates (e.g., dihexyl sulfosuccinates), alkylpolyalkoxy sulfates, sulfonated amphoteric surfactants, or any combination thereof. Examples of suitable water-soluble solvents can also include any combination or mixture of these water-soluble solvents (including any modifications of these water soluble solvents).

In one embodiment, the water soluble solvent comprises a co-solvent, and the co-solvent comprises ionic surfactant, non-ionic surfactant, anionic surfactant, cationic surfactant, nonionic surfactant, amphoteric surfactant, ketones, esters, ethers, glycol ethers, glycol ether esters, lactams, cyclic urea, alcohols, aromatic hydrocarbons, aliphatic hydrocarbons, alicyclic hydrocarbons, nitroalkanes, unsaturated hydrocarbons, halocarbons, alkyl aryl sulfonates (AAS), alpha olefin sulfonates (AOS), internal olefin sulfonates (IOS), alcohol ether sulfates derived from propoxylated C12 to C20 alcohols, ethoxylated alcohols, mixtures of an alcohol and an ethoxylated alcohol, mixtures of anionic and cationic surfactants, disulfonated surfactants, polysulfonated surfactants, aromatic ether polysulfonates, isomerized olefin sulfonates, alkyl aryl sulfonates, medium alcohol (C10 to C17) alkoxy sulfates, alcohol ether [alkoxy] carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-HDGE"), 4-methylpentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, or any combination thereof. Examples of suitable co-solvents can also include any mixture of these co-solvents (including any modifications of these co-solvents).

Optional additive: The term "optional additive" refers to practically any other additive that may be injected into the hydrocarbon-bearing formation. Examples of optional additives comprise anionic or non-ionic surfactants, biocides, co-solvents, chelators, reducing agents/oxygen scavengers, stabilizers, etc., or any combination thereof, in an amount of less than or equal to 10 wt. % (of the total weight of the polymer suspension). In one embodiment, a stabilizer is added to further stabilize a suspended polymer. For example, an anionic surfactant can be present in an amount of less than or equal to 5 wt. % as a stabilizer.

Examples of internal olefin sulfonates and the methods to make them are found in U.S. Pat. No. 5,488,148, U.S. Patent Application Publication 2009/0112014, and SPE 129766, each of which is incorporated by reference. Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211,837, 9,783,729, 9,422,469, 9,605,198, 9,617,464, and 9,976,072; as well as U.S. Patent Application Nos. 2005/0199395, 2006/0185845, 2006/0189486, 2009/0270281, 2011/0046024, 2011/0100402, 2011/0190175, 2007/0191633, 2010/004843, 2011/0201531, 2011/0190174, 2011/0071057, 2011/0059873, 2011/0059872, 2011/0048721, 2010/0319920, 2010/0292110, 2012/0101010, 2011/0190174, and 2017/0198202, each of which is hereby incorporated by reference herein in its entirety for its description of example surfactants. U.S. Pat. Nos. 9,752,071 and 10,011,757 are also incorporated by reference.

Those of ordinary skill in the art will appreciate that these are not exhaustive lists of polymers, solvents, and optional additives. The terms "polymer", "solvent", and "optional additive" are not limited to any description or configuration described herein.

Sulfur: The term "sulfur" is utilized herein to refer to practically anything that contains the element "S" such as sulfate ($SO_4$—), sulfide (S—), and the like. As such, sulfur may include a sulfate, a sulfite, a sulfide, a thiosulfate, a bisulfite, etc.

Viscosity reducer: The term "viscosity reducer" refers to practically any agent that reduces viscosity (e.g., thickness). A concentration of the viscosity reducer will be added to the fluid being produced from the hydrocarbon-bearing formation via the production wellbore (e.g., at a first location) to degrade the polymer present in the fluid. The addition of the concentration of the viscosity reducer (e.g., at a first location) is in a sufficient quantity to allow for complete chemical degradation of the polymer prior to the addition of the concentration of the neutralizer (e.g., at the second location) in the fluid such that excess viscosity reducer is present in the fluid. The addition of the concentration of the neutralizer (e.g., at the second location) is sufficiently upstream of any surface fluid processing equipment to allow for complete neutralization of the excess viscosity reducer such that excess neutralizer is present in the fluid prior to the fluid reaching any of the surface fluid processing equipment. In one embodiment, the first location is sufficiently upstream of the second location to allow for complete chemical degradation of the polymer prior to the fluid reaching the second location, and wherein the second location is sufficiently upstream of any of the surface fluid processing equipment to allow for complete neutralization of the excess viscosity reducer in the fluid prior to the fluid reaching any of the surface fluid processing equipment.

As discussed further hereinbelow, the actual concentration of the viscosity reducer to be added in order for the polymer to undergo complete chemical degradation may be determined in a laboratory setting using a viscometer and using at least one hydrocarbon-free sample representative with the fluid such as: (a) at least one sample of fluid being produced via the production wellbore, (b) at least one synthetic fluid sample representative with the fluid being produced, or any combination thereof. Regarding synthetic fluid samples, ion chromatography may be utilized to determine the components present in a brine being produced, for example, and a synthetic brine sample with those components may be created for the experiments. Hydrocarbons are omitted or separated from samples so that the hydrocarbons do not affect viscosity measurements.

It is worth noting that the concentration of the viscosity reducer that is added may be higher than necessary for complete chemical degradation of the polymer in the fluid, sometimes referred to as "over chemical degradation", to ensure that the polymer undergoes complete degradation. As such, this disclosure contemplates the following non-limiting scenarios: (i) scenario A where the concentration of the viscosity reducer determined in the laboratory setting that leads to complete chemical degradation of the polymer (e.g., concentration X) is added, as well as (ii) scenario B where more than the concentration of the viscosity reducer determined in the laboratory setting that leads to complete chemical degradation of the polymer (e.g., concentration X plus Y equals concentration Z) is added (sometimes referred to as "over complete chemical degradation"). Both the concentration X and the concentration Z may be determined in the laboratory setting. In both scenarios, any excess viscosity reducer will be neutralized as discussed hereinbelow. For example, adding more than the necessary concentration of the viscosity reducer determined in the laboratory setting ensures that the polymer will be completely chemically degraded in the fluid being produced even if the fluid being produced has a higher viscosity due to the hydrocarbons and other components in the fluid being produced. All of these scenarios are contemplated in this disclosure.

As discussed further hereinbelow, in some embodiment, complete chemical degradation of the polymer is accomplished when the viscosity of the fluid (e.g., water) returns to the viscosity of a polymer-free version of that type of fluid (e.g., water), which may be determined using the viscometer. A viscosity of less than 1.4 cp with a minimum of 9 cp after the addition of the viscosity reducer indicates that complete chemical degradation of the polymer has been accomplished. A viscosity of less than 1.4 cp with a minimum of 0.9 cp (in some embodiments, the minimum is 1.0 cp) after the addition of the viscosity reducer also indicates the return of the viscosity to that of polymer-free fluid (e.g., water). In some embodiments, titration may be utilized to determine whether complete chemical degradation of the polymer has been accomplished. In some embodiments, gel permeation chromatography (GPC) may be utilized to determine whether complete chemical degradation of the polymer has been accomplished.

In one embodiment, the viscosity reducer is a non-sulfur containing viscosity reducer. In one embodiment, the non-sulfur containing viscosity reducer comprises sodium hypochlorite. In one embodiment, the non-sulfur containing viscosity reducer comprises sodium chlorite. In one embodiment, the non-sulfur containing viscosity reducer comprises hydrogen peroxide. In one embodiment, the non-sulfur containing viscosity reducer comprises Fenton's reagent. In one embodiment, the non-sulfur containing viscosity reducer comprises potassium permanganate. In one embodiment, the non-sulfur containing viscosity reducer comprises fluorine. In one embodiment, the non-sulfur containing viscosity reducer comprises hydroxyl radical. In one embodiment, the non-sulfur containing viscosity reducer comprises atomic oxygen. In one embodiment, the non-sulfur containing viscosity reducer comprises ozone. In one embodiment, the non-sulfur containing viscosity reducer comprises perhydroxyl radical. In one embodiment, the non-sulfur containing viscosity reducer comprises hypobromous acid. In one embodiment, the non-sulfur containing viscosity reducer comprises chlorine dioxide. In one embodiment, the non-sulfur containing viscosity reducer comprises hypochlorous acid. In one embodiment, the non-sulfur containing viscosity reducer comprises hypoiodous acid. In one embodiment, the non-sulfur containing viscosity reducer comprises chlorine. In one embodiment, the non-sulfur containing viscosity reducer comprises bromine. In one embodiment, the non-sulfur containing viscosity reducer comprises iodine. In one embodiment, the non-sulfur containing viscosity reducer comprises some other oxidizer. In one embodiment, the non-sulfur containing viscosity reducer comprises sodium hypochlorite, sodium chlorite, hydrogen peroxide, Fenton's reagent, potassium permanganate, fluorine, hydroxyl radical, atomic oxygen, ozone, perhydroxyl radical, hypobromous acid, chlorine dioxide, hypochlorous acid, hypoiodous acid, chlorine, bromine, iodine, or any combination thereof. A person of ordinary skill in the art will appreciate that the non-sulfur containing viscosity reducer may be injected or added in solution form. For example, a solution may be prepared that comprises at least one non-sulfur containing viscosity reducer, such as a solution that includes 15% active non-sulfur containing viscosity reducer and 85% water.

In one embodiment, the viscosity reducer comprises sodium hypochlorite. In one embodiment, the viscosity reducer comprises sodium chlorite. In one embodiment, the viscosity reducer comprises hydrogen peroxide. In one embodiment, the viscosity reducer comprises Fenton's reagent. In one embodiment, the viscosity reducer comprises potassium permanganate. In one embodiment, the viscosity reducer comprises fluorine. In one embodiment, the viscosity reducer comprises hydroxyl radical. In one embodiment, the viscosity reducer comprises atomic oxygen. In one embodiment, the viscosity reducer comprises ozone. In one embodiment, the viscosity reducer comprises perhydroxyl radical. In one embodiment, the viscosity reducer comprises hypobromous acid. In one embodiment, the viscosity reducer comprises chlorine dioxide. In one embodiment, the viscosity reducer comprises hypochlorous acid. In one embodiment, the viscosity reducer comprises hypoiodous acid. In one embodiment, the viscosity reducer comprises chlorine. In one embodiment, the viscosity reducer comprises bromine. In one embodiment, the viscosity reducer comprises iodine. In one embodiment, the viscosity reducer comprises some other oxidizer. In one embodiment, the viscosity reducer comprises tetrakis(hyroxymethyl)-phosphonium sulfate (THPS). THPS is sometimes utilized as a biocide. In one embodiment, the viscosity reducer comprises a biocide. In one embodiment, the viscosity reducer comprises sodium persulfate. In one embodiment, the viscosity reducer comprises glutaraldehyde. In one embodiment, the viscosity reducer comprises sodium hypochlorite, sodium chlorite, hydrogen peroxide, Fenton's reagent, potassium permanganate, fluorine, hydroxyl radical, atomic oxygen, ozone, perhydroxyl radical, hypobromous acid, chlorine dioxide, hypochlorous acid, hypoiodous acid, chlorine, bromine, iodine, tetrakis(hyroxymethyl)-phosphonium sulfate, a biocide, sodium persulfate, glutaraldehyde, or any combination thereof. A person of ordinary skill in the art will appreciate that the viscosity reducer may be injected or added in solution form. For example, a solution may be prepared that comprises at least one viscosity reducer, such as a solution that includes 15% active viscosity reducer and 85% water.

In one embodiment, the viscosity reducer is added in a ratio of the polymer to the viscosity reducer of 1:1 to 5:1 by concentration. In one embodiment, the viscosity reducer is added in a ratio of the polymer to the viscosity reducer of 1:1 to 4:1 by concentration. In one embodiment, the viscosity reducer is added in a ratio of the polymer to the viscosity reducer of 1:1 to 3:1 by concentration. In one embodiment, the viscosity reducer is added in a ratio of the polymer to the viscosity reducer of 1:1 to 2:1 by concentration. The concentration of the viscosity reducer ranges from any of the minimum values described above to any of the maximum values described above. In one embodiment, the viscosity reducer is added in a ratio of the polymer to the viscosity reducer of 1:1, 2:1, 3:1, 4:1, or 5:1 by concentration.

In one embodiment, the viscosity reducer is added in a concentration of 1,500 ppm or less (e.g., 1400 ppm or less, 1300 ppm or less, 1200 ppm or less, 1100 ppm or less, 1000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 90 ppm or less, 80 ppm or less, 75 ppm or less, 70 ppm or less, 60 ppm or less, 50 ppm or less, 40 ppm or less, 30 ppm or less, 25 ppm or less, or 20 ppm or less). In one embodiment, the viscosity reducer is added in a concentration of at least 10 ppm (e.g., at least 20 ppm, at least 25 ppm, at least 30 ppm, at least 40 ppm, at least 50 ppm, at least 60 ppm, at least 70 ppm, at least 75 ppm, at least 80 ppm, at least 90 ppm, at least 100 ppm, at least 200 ppm, at least 300 ppm, at least 400 ppm, at least 500 ppm, at least 600 ppm, at least 700 ppm, at least 800 ppm, at least 900 ppm, at least 1000 ppm, at least 1100 ppm, at least 1200 ppm, at least 1300 ppm, or at least 1400 ppm). In one embodiment, the viscosity reducer is added in a concentration of 10 ppm to 1500 ppm, 10 ppm to 25 ppm, 10 ppm to 50 ppm, 10 ppm to 75 ppm, 10 ppm to 100 ppm, 10 ppm to 500 ppm, 10 ppm to 1,000 ppm, 10 ppm to 1,300 ppm, 25 ppm to 75 ppm, 25 ppm to 100 ppm, 25 ppm to 150 ppm, 25 ppm to 200 ppm, 25 ppm to 500 ppm, or 25 ppm to 1,000 ppm. The concentration of the viscosity reducer ranges from any of the minimum values described above to any of the maximum values described above. The concentration of the viscosity reducer that is added may depend on the specifics of the viscosity reducer, depend on the specifics of the polymer, and how much of the viscosity reducer will result in complete chemical degradation of the polymer, etc.

In one embodiment, residence time of the viscosity reducer in the fluid for complete chemical degradation of the polymer is 10 minutes or less (e.g., 9 minutes or less, 8 minutes or less, 7 minutes or less, 6 minutes or less, 5 minutes or less, 4 minutes or less, 3 minutes or less, 2 minutes or less, 1 minute or less, 55 seconds or less, 50 seconds or less, 45 seconds or less, 40 seconds or less, 35 seconds or less, 30 seconds or less, 25 seconds or less, 20 seconds or less, or 15 seconds or less). In one embodiment, residence time of the viscosity reducer in the fluid for complete chemical degradation of the polymer is at least 10 seconds (e.g., at least 15 seconds, at least 20 seconds, at least 25 seconds, at least 30 seconds, at least 35 seconds, at least 40 seconds, at least 45 seconds, at least 50 seconds, at least 55 seconds, at least 1 minute, at least 2 minutes, at least 3 minutes, at least 4 minutes, at least 5 minutes, at least 6 minutes, at least 7 minutes, at least 8 minutes, or at least 9 minutes). In one embodiment, residence time of the viscosity reducer in the fluid for complete chemical degradation of the polymer is 10 seconds to 10 minutes, 10 seconds to 25 seconds, 10 seconds to 45 seconds, 10 seconds to 1 minute, 10 seconds to 2 minutes, 10 seconds to 5 minutes, or 10 seconds to 7 minutes. The residence time of the viscosity reducer in the fluid for complete chemical degradation of the polymer ranges from any of the minimum values described above to any of the maximum values described above. The residence time of the viscosity reducer for complete chemical degradation of the polymer may depend on the specifics of the viscosity reducer, the specifics of the polymer, and how much time is needed for complete chemical degradation of that polymer with that viscosity reducer. The term "viscosity reducer" is not limited to any description or configuration described herein.

The viscosity reducer can be buffered at a pH of 7 or less. By buffering the viscosity reducer, the reaction time of the viscosity reducer with a polymer can be reduced, providing for a faster and more efficient oil-water separation. In addition, by adjusting the pH of the viscosity reducer, cleavage of the polymer backbone can proceed more efficiently, more quickly reducing the viscosity of the effluent water. Without wishing to be bound by theory, it is believed that by appropriately buffering a viscosity reducer, the relative concentration of a species which reacts with the polymer can be increased. By way of example, in the case of sodium hypochlorite (NaOCl), it is believed that hypochlorous acid (HOCl)—which forms upon the addition of NaOCl to water—is the primary active species which participates in the chemical reactions which degrade the polymer in solution. Lowering the pH of the viscosity reducer (e.g., from a pH of 11.5 to a pH of 7 or less) shifts the chemical equilibria which occur upon the addition of NaOCl to water, thereby increasing the concentration of HOCl present in the solution of viscosity reducer added to the oil-water mixture (and thus the rate of polymer degradation).

In some embodiments, the viscosity reducer can be buffered at a pH of 7 or less (e.g., a pH of 6.75 or less, a pH of 6.5 or less, a pH of 6.25 or less, a pH of 6 or less, a pH of 5.75 or less, a pH of 5.5 or less, a pH of 5.25 or less, a pH of 5 or less, a pH of 4.75 or less, a pH of 4.5 or less, a pH of 4.25 or less, a pH of 4 or less, a pH of 3.75 or less, a pH of 3.5 or less, a pH of 3.25 or less, a pH of 3 or less, a pH of 2.75 or less, a pH of 2.5 or less, a pH of 2.25 or less, a pH of 2 or less, a pH of 1.75 or less, a pH of 1.5 or less, a pH of 1.25 or less, a pH of 1 or less, a pH of 0.75 or less, a pH of 0.5 or less, or a pH of 0.25 or less). In some embodiments, the viscosity reducer can be buffered at a pH of at least 0 (e.g., a pH of at least 0.25, a pH of at least 0.5, a pH. of at least 0.75, a pH of at least 1, a pH of at least 1.25, a pH of at least 1.5, a pH of at least 1.75, a pH of at least 2, a pH of at least 2.25, a pH of at least 2.5, a pH. of at least 2.75, a pH of at least 3, a pH of at least 3.25, a pH of at least 3.5, a pH of at least 3.75, a pH of at least 4, a pH of at least 4.25, a pH of at least 4.5, a pH. of at least 4.75, a pH of at least 5, a pH of at least 5.25, a pH of at least 5.5, a pH of at least 5.75, a pH of at least 6, a pH of at least 6.25, a pH of at least 6.5, or a pH of at least 6.75).

The viscosity reducer can be buffered at a pH ranging from any of the minimum values described above to any of the maximum values described above. For example, the viscosity reducer can be buffered at a pH of from 2 to 7, such as a pH of from 3.5 to 7, or a pH of from 5 to 7.

In one embodiment, the viscosity reducer comprises sodium hypochlorite, and the viscosity reducer is buffered a pH of from 5 to 7, such as a pH of from 5.5 to 7. In one embodiment, the viscosity reducer comprises sodium chlorite, and the viscosity reducer is buffered at a pH of from 3 to 5, such as a pH of from 3.5 to 4.5 or a pH of from 3.8 to 4.2. In one embodiment, the viscosity reducer comprises hydrogen peroxide, and the viscosity reducer is buffered at a pH of from 3 to 7, such as a pH of from 3 to 6, a pH of from 3 to 5, or a pH of from 3.5 to 4.5. In one embodiment, the viscosity reducer comprises Fenton's reagent, and the viscosity reducer is buffered at a pH of from 0 to 5, such as a pH of from 0.5 to 4, or a pH of from 1 to 3. In one embodiment, the viscosity reducer comprises potassium permanganate, and the viscosity reducer is buffered at a pH of less than 5.5, such as a pH of from 0.5 to 5.5, a pH of from 0.5 to 4, or a pH of from 1 to 4. In one embodiment, the viscosity reducer comprises hypobromous acid, and the viscosity reducer is buffered at a pH of from 5 to 7. In one embodiment, the viscosity reducer comprises hypochlorous acid, and the viscosity reducer is buffered at a pH of from 5 to 7. In one embodiment, the viscosity reducer comprises chlorine, and the viscosity reducer is buffered at a pH of from 5 to 7, such as a pH of from 6 to 7, or a pH of from 6.5 to 7. In one embodiment, the viscosity reducer comprises tetrakis(hyroxymethyl)-phosphonium sulfate (THPS), and the viscosity reducer is buffered at a pH of from 1.5 to 6.5, such as a pH of from 2 to 6, or a pH of from 3 to 5. In one embodiment, the viscosity reducer comprises glutaraldehyde, and the viscosity reducer is buffered at a pH of from 1 to 6, such as a pH of from 2 to 6, a pH of from 3 to 5.

The viscosity reducer can be buffered using any suitable combination of acid(s) and/or base(s) to achieve a buffer having a desired pH. For example, in some cases, the viscosity reducer can be buffered by adding an acid (e.g., a weak acid) to an aqueous solution comprising the viscosity reducer. In some cases, the acid can comprise an organic acid. Examples of suitable acids can comprise acetic acid, citric acid, boric acid, tartaric acid, hydrochloric acid, succinic acid, or any combination thereof. In some examples, a strong acid may be added. In some examples, the buffer can include a conjugate base of an acid. The conjugate base can comprise two or more heteroatoms (e.g., two or more oxygen atoms). In certain examples, the conjugate base can comprise one or more carboxylate moieties. For example, the conjugate base can comprise acetate, citrate, tartrate, succinate, or any combination thereof.

Acid(s), base(s), or a combination thereof can be added to an aqueous solution comprising the viscosity reducer to achieve a desired target pH for the buffered viscosity reducer. An appropriate combination and quantity of acid(s) and/or base(s) can be selected to achieve a desired target pH in view of a number of factors, including the identity of the viscosity reducer, the concentration of the viscosity reducer, the pH of a solution of the viscosity reducer, the concentration of polymer to be degraded, the desired degradation rate of the polymer, the desired oil-water separation rate of the effluent water, or any combination thereof.

In some embodiments, the methods described herein can further comprise performing a colorimetric assay to monitor the chemical degradation of the polymer, to determine a pH at which to buffer the viscosity reducer, to determine the concentration of the viscosity reducer to add to the fluid, or any combination thereof.

Neutralizer: The term "neutralizer" refers to any agent that neutralizes the viscosity reducer. A concentration of the neutralizer will be added to the fluid (e.g., at a second location) to neutralize the viscosity reducer in the fluid. The addition of the concentration of the viscosity reducer (e.g., at a first location) is in a sufficient quantity to allow for complete chemical degradation of the polymer prior to the addition of the concentration of the neutralizer (e.g., at the second location) in the fluid such that excess viscosity reducer is present in the fluid. The addition of the concentration of the neutralizer (e.g., at the second location) is sufficiently upstream of any surface fluid processing equipment to allow for complete neutralization of the excess viscosity reducer such that excess neutralizer is present in the fluid prior to the fluid reaching any of the surface fluid processing equipment.

As discussed further hereinbelow, the actual concentration of the neutralizer to be added in order for complete neutralization of all excess viscosity reducer may be determined in the laboratory using titration and using at least one hydrocarbon-free sample representative with the fluid such as: (a) at least one sample of fluid being produced via the production wellbore, (b) at least one synthetic fluid sample representative with the fluid being produced, or any combination thereof. Regarding synthetic fluid samples, ion chromatography may be utilized to determine the components present in a brine being produced, for example, and a synthetic brine sample with those components may be created for the experiments. Hydrocarbons may be omitted or separated from samples so that the hydrocarbons do not affect viscosity measurements. In some embodiments, the sample(s) utilized with the viscosity reducer experiments may even be utilized for the neutralizer experiments.

It is worth noting that the concentration of the neutralizer that is added may be higher than necessary for complete neutralization of all excess viscosity reducer in the fluid, sometimes referred to as "over neutralization", to ensure that the excess viscosity reducer is completely neutralized. As such, this disclosure contemplates the following non-limiting scenarios: (i) scenario A where the concentration of the neutralizer determined in the laboratory setting that leads to complete neutralization of the excess viscosity reducer (e.g., concentration X1) is added, as well as (ii) scenario B where more than the concentration of the neutralizer determined in the laboratory setting that leads to complete neutralization of the excess viscosity reducer (e.g., concentration X1 plus Y1 equals concentration Z1) is added (sometimes referred to as "over neutralization"). Both the concentration X1 and the concentration Z1 may be determined in the laboratory setting. For example, adding more than the necessary concentration of the neutralizer determined in the laboratory setting ensures that the excess viscosity reducer will be completely neutralized in the fluid being produced even if the fluid being produced has hydrocarbons and other components in the fluid being produced. All of these scenarios are contemplated in this disclosure.

As discussed further hereinbelow, complete neutralization of all excess viscosity reducer is accomplished when excess (or residual) neutralizer is present in the sample, which may be determined using titration. The excess (or residual) neutralizer is present in the sample because the excess viscosity reducer has been neutralized and there is no more viscosity reducer to react with the neutralizer.

In one embodiment, the neutralizer is a non-sulfur containing neutralizer. In one embodiment, the non-sulfur containing neutralizer comprises ascorbic acid. In one embodiment, the non-sulfur containing neutralizer comprises sodium ascorbate. In one embodiment, the non-sulfur containing neutralizer comprises citric acid. In one embodiment, the non-sulfur containing neutralizer comprises ascorbic acid, sodium ascorbate, citric acid, or any combination thereof. A person of ordinary skill in the art will appreciate that the non-sulfur containing neutralizer may be injected or added in solution form.

In one embodiment, the neutralizer comprises ascorbic acid. In one embodiment, the neutralizer comprises sodium ascorbate. In one embodiment, the neutralizer comprises citric acid. In one embodiment, the neutralizer comprises sodium thiosulfate. In one embodiment, the neutralizer comprises sodium metabisulfite. In one embodiment, the neutralizer comprises ascorbic acid, sodium ascorbate, citric acid, sodium thiosulfate, sodium metabisulfite, or any combination thereof. A person of ordinary skill in the art will appreciate that the neutralizer may be injected or added in solution form.

In one embodiment, the neutralizer is added in a ratio of the excess viscosity reducer to the neutralizer of 1:2.5 to 1:5 by concentration. In one embodiment, the neutralizer is added in a ratio of the excess viscosity reducer to the neutralizer of 1:3 to 1:5 by concentration. In one embodiment, the neutralizer is added in a ratio of the excess viscosity reducer to the neutralizer of 1:3.5 to 1:5 by concentration. In one embodiment, the neutralizer is added in a ratio of the excess viscosity reducer to the neutralizer of 1:4 to 1:5 by concentration. In one embodiment, the neutralizer is added in a ratio of the excess viscosity reducer to the neutralizer of 1:4.5 to 1:5 by concentration. The concentration of the neutralizer ranges from any of the minimum values described above to any of the maximum values described above. In one embodiment, the neutralizer is added in a ratio of the excess viscosity reducer to the neutralizer of 1:2.5, 1:3, 1:3.5, 1:4, 1:4.5, or 1:5 by concentration.

In one embodiment, the neutralizer is added in a concentration of 7,500 ppm or less (e.g., 7,000 ppm or less, 6,500 ppm or less, 6,000 ppm or less, 5,500 ppm or less, 5,000 ppm or less, 4,500 ppm or less, 4,000 ppm or less, 3,500 ppm or less, 3,000 ppm or less, 2,500 ppm or less, 2,000 ppm or less, 1,500 ppm or less, 1,000 ppm or less, 900 ppm or less, 800 ppm or less, 700 ppm or less, 600 ppm or less, 500 ppm or less, 450 ppm or less, 400 ppm or less, 375 ppm or less, 350 ppm or less, 300 ppm or less, 250 ppm or less, 200 ppm or less, 150 ppm or less, 125 ppm or less, 100 ppm or less, 90 ppm or less, 80 ppm or less, 75 ppm or less, 70 ppm or less, 60 ppm or less, 50 ppm or less, 40 ppm or less, or 30 ppm or less). In one embodiment, the neutralizer is added in a concentration of at least 25 ppm (e.g., at least 30 ppm, at least 40 ppm, at least 50 ppm, at least 60 ppm, at least 70 ppm, at least 75 ppm, at least 80 ppm, at least 90 ppm, at least 100 ppm, at least 125 ppm, at least 150 ppm, at least 200 ppm, at least 250 ppm, at least 300 ppm, at least 350 ppm, at least 375 ppm, at least 400 ppm, at least 450 ppm, at least 500 ppm, at least 600 ppm, at least 700 ppm, at least 800 ppm, at least 900 ppm, at least 1,000 ppm, at least 1,500 ppm, at least 2,000 ppm, at least 2,500 ppm, at least 3,000 ppm, at least 3,500 ppm, at least 4,000 ppm, at least 4,500 ppm, at least 5,000 ppm, at least 5,500 ppm, at least 6,000 ppm, at least 6,500 ppm, or at least 7,000 ppm). In one embodiment, the neutralizer is added in a concentration of 25 ppm to 7,500 ppm, 25 ppm to 35 ppm, 25 ppm to 50 ppm, 25 ppm to 75 ppm, 25 ppm to 100 ppm, 25 ppm to 125 ppm, 25 ppm to 250 ppm, 25 ppm to 375 ppm, 25 ppm to 500 ppm, 25 ppm to 1,000 ppm, 25 ppm to 1,300 ppm, 25 ppm to 1,500 ppm, 25 ppm to 2,000 ppm, 25 ppm to 2,500 ppm, 25 ppm to 3,000 ppm, 25 ppm to 3,500 ppm, 25 ppm to 4,000 ppm, 25 ppm to 4,500 ppm, 25 ppm to 5,000 ppm, 25 ppm to 5,500 ppm, 25 ppm to 6,000 ppm, 25 ppm to 6,500 ppm, or 25 ppm to 7,000 ppm, The concentration of the neutralizer ranges from any of the minimum values described above to any of the maximum values described above. The concentration of the neutralizer that is added may depend on the specifics of the neutralizer, depend on the specifics of the viscosity reducer, how much of the neutralizer will result in complete neutralization of all excess viscosity reducer, etc.

In one embodiment, residence time of the neutralizer in the fluid for complete neutralization of all excess viscosity reducer in the fluid is 10 minutes or less (e.g., 9 minutes or less, 8 minutes or less, 7 minutes or less, 6 minutes or less, 5 minutes or less, 4 minutes or less, 3 minutes or less, 2 minutes or less, 1 minute or less, 90 seconds or less, 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, or 5 seconds or less). In one embodiment, residence time of the neutralizer in the fluid for complete neutralization of all excess viscosity reducer in the fluid is at least 1 second (e.g., at least 5 seconds, at least 10 seconds, at least 15 seconds, at least 20 seconds, at least 25 seconds, at least 30 seconds, at least 35 seconds, at least 40 seconds, at least 45 seconds, at least 50 seconds, at least 55 seconds, at least 90 seconds, at least 1 minute, at least 2 minutes, at least 3 minutes, at least 4 minutes, at least 5 minutes, at least 6 minutes, at least 7 minutes, at least 8 minutes, or at least 9 minutes). In one embodiment, residence time of the neutralizer in the fluid for complete neutralization of all excess viscosity reducer in the fluid is 1 second to 10 minutes, 1 second to 10 seconds, 1 second to 20 seconds, 1 second to 30 seconds, 1 second to 40 seconds, 1 second to 50 seconds, 1 second to 60 seconds, 1 second to 70 seconds, 1 second to 80 seconds, 1 second to 90 seconds, 1 second to 100 seconds, 1 second to 2 minutes, 1 second to 3 minutes, 1 second to 4 minutes, 1 second to 5 minutes, 1 second to 6 minutes, 1 second to 7 minutes, 1 second to 8 minutes, 1 second to 9 minutes. The residence time of the neutralizer in the fluid for complete neutralization of all excess viscosity reducer in the fluid ranges from any of the minimum values described above to any of the maximum values described above. The term "neutralizer" is not limited to any description or configuration described herein.

Surface fluid processing equipment: Surface fluid processing equipment may include practically any equipment on the surface for processing fluid from the production wellbore. Processing may include separating the fluid, such as separating hydrocarbons (e.g., oil) and water in the fluid. Processing may include heating the fluid.

In one embodiment, the surface fluid processing equipment comprises a free water knockout (FWKO). In one embodiment, the surface fluid processing equipment comprises a heat exchanger (HX). In one embodiment, the surface fluid processing equipment comprises a separator. In one embodiment, the surface fluid processing equipment comprises a flotation cell (e.g., flotation cell(s) such as a "WEMCO flotation cell" or "WEMCO flotation cells" such as, but not limited to, those commercially available under the trade name WEMCO™ for example from FLSmidth A/S). In one embodiment, the surface fluid processing equipment comprises an induced gas flotation (IFG) apparatus. In one embodiment, the surface fluid processing equipment comprises a hydrocyclone. In one embodiment, the surface fluid processing equipment comprises a filter. In one embodiment, the surface fluid processing equipment comprises a FWKO, a HX, a separator, a flotation cell, an IFG apparatus, a hydrocyclone, a filter, or any combination thereof. The term "surface fluid processing equipment" is not limited to any description or configuration described herein.

Downhole fluid lifting equipment: Downhole fluid lifting equipment may include practically any downhole equipment in the production wellbore for lifting fluid up to the surface. In one embodiment, the downhole fluid lifting equipment comprises an electrical submersible pump (ESP). In one embodiment, the downhole fluid lifting equipment comprise a hydraulic submersible pump. In one embodiment, the downhole fluid lifting equipment comprises gas lift equipment (e.g., valves, mandrels). In one embodiment, the downhole fluid lifting equipment comprises an ESP, a hydraulic submersible pump, gas lift equipment, or any combination thereof. The term "downhole fluid lifting equipment" is not limited to any description or configuration described herein.

Ambient temperature: Ambient temperature may depend on the exact place that the temperature is measured. In some places, amendment temperature is 5° C.-20° C. In some places, ambient temperature is 20° C.-25° C. In some places, ambient temperature is 15° C.-25° C.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal languages of the claims. Unless defined otherwise, all technical and scientific terms used herein have the same meanings as commonly understood by one of skill in the art to which the disclosed invention belongs. All citations referred herein are expressly incorporated by reference.

OVERVIEW: As discussed in the background, polymer is utilized in hydrocarbon recovery, but the polymer may also negatively affect the equipment utilized in hydrocarbon recovery. For example, polymer may form scaling-gel that coats an ESP and impairs its cooling. Viscous polymer may also interfere with effective oil water separation (Stoke's law) in the FWKO. Likewise, the oil separation in an IGF may also be negatively affected by higher water viscosity (Stoke's law). Even a low concentration of polymer may act as a drag-reducing agent (DRA) in a hydrocyclone and reduce its efficiency. Polymer also aggregates oil droplets and may plug a filter (e.g., filter membrane). Fresh or mechanically sheared polymer may also precipitate as a calcium scale on hot metal surfaces (80° C.-120° C.) in a HX, and the polymer-calcium-oil gel that forms has to be removed in order to restore the HX's efficiency.

Furthermore, after free oil separation, up to a few hundred ppm of oil may remain in the water. The presence of the polymer increases water viscosity and traps or suspends more oil in the water, thereby increasing the oil content. Historical techniques use heat, flocculants, and reverse emulsion breakers to remove oil from the water. All these techniques help with separation, but typically do not address the reason for increased trapping, and the reason is higher water viscosity due to the polymer.

Embodiments of treating fluid comprising hydrocarbons, water, and polymer being produced from a hydrocarbon-bearing formation via a production wellbore are provided herein. One embodiment of a method of treating fluid comprising hydrocarbons, water, and polymer being produced from a hydrocarbon-bearing formation via a production wellbore comprises adding a concentration of a viscosity reducer to the fluid to degrade the polymer present in the fluid and adding a concentration of a neutralizer to the fluid to neutralize the viscosity reducer in the fluid. The addition of the concentration of the viscosity reducer is in a sufficient quantity to allow for complete chemical degradation of the polymer prior to the addition of the concentration of the neutralizer in the fluid such that excess viscosity reducer is present in the fluid. The addition of the concentration of the neutralizer is sufficiently upstream of any surface fluid processing equipment to allow for complete neutralization of the excess viscosity reducer such that excess neutralizer is present in the fluid prior to the fluid reaching any of the surface fluid processing equipment. Residual or excess neutralizer may remain in the fluid as it reaches any fluid processing equipment.

Advantageously, those of ordinary skill in the art will appreciate that the polymer may be utilized for hydrocarbon recovery such as in EOR processes (including CEOR processes), and the polymer in the fluid being produced via the production wellbore will undergo complete chemical degradation to reduce or eliminate negative impacts of the polymer on the performance and life-span of surface fluid processing equipment. Depending on the embodiment, the complete chemical degradation of the polymer will also reduce or eliminate negative impacts of the polymer on the performance and life-span of downhole fluid lifting equipment. As an example, the tendency of the polymer to precipitate in the presence of divalent ions and form polymer scale in the ESP and the HX may be reduced or even eliminated due to the complete chemical degradation of the polymer. As another example, the viscous impact of the polymer in the FWKO, its drag reducing impact in the hydrocyclone, the viscous impact to the separation of the oil droplets in the IGF, the rapid polymer-oil-fouling of the filter (e.g., membrane filter), the fouling of the HX by polymer-Ca-oil scale, or any combination thereof may be reduced or even eliminated due to the complete chemical degradation of the polymer.

Advantageously, those of ordinary skill in the art will appreciate that the viscosity reducer may oxidize the polymer to reduce its viscosity and molecular size. The viscosity reducer reduces the polymer molecular weight and consequently reduces viscosity of the fluid to near that of polymer-free fluid (e.g., water), allowing a more rapid and efficient oil-water separation and minimizing the amount of water-in-oil (WIO) and oil-in-water (OIW) emulsions. Indeed, degrading the polymer allows practically any emulsion, for example, caused by produced surfactants, to be treated effectively by demulsifiers. Indeed, the viscosity reducer may allow for faster and more efficient oil-water separation by conventional chemical demulsifiers.

Advantageously, those of ordinary skill in the art will appreciate the benefits of complete neutralization. For example, any excess viscosity reducer has undergone complete neutralization (e.g., by neutralizing any free oxygen in the oil-free water) to render the fluid better suitable or suitable for re-injecting, discharging, mixing additional polymer, or any combination thereof after processing. Indeed, neutralizing excess viscosity reducer ensures that the fluid (e.g., separated water of the fluid) may be safely used for re-injecting, discharging, mixing additional polymer, or any combination thereof after processing. Moreover, the complete neutralization of all excess viscosity reducer will reduce or even prevent corrosion of the surface fluid processing equipment, the downhole fluid lifting equipment, or any combination thereof due to the excess viscosity reducer.

Advantageously, those of ordinary skill in the art will appreciate that fewer negative impacts on the surface fluid processing equipment, the downhole fluid lifting equipment, or any combination thereof may also improve oil-water separation. Complete chemical degradation of the polymer improves separation of hydrocarbons (e.g., oil) and water in fluid being produced via the production wellbore. For example, a viscosity reducer, such as an oxidizer, can be used to destroy the polymer backbone and reduce water viscosity. Furthermore, the oxidizer may also act as a bactericide to eliminate extraneous biological activity. Less corrosion on the surface fluid processing equipment may also improve oil-water separation. The water and oil quality after separation may also be better as discussed hereinabove.

Advantageously, those of ordinary skill in the art will appreciate that if the hydrocarbon-bearing formation, the fluid being produced via the production wellbore, etc. do not comprise sulfur, then the non-sulfur containing viscosity reducer and the non-sulfur containing neutralizer may be selected to maintain a substantially sulfur-free state. For example, those of ordinary skill in the art will appreciate that sea water may naturally contain a concentration of sulfur. Nonetheless, in one embodiment, the non-sulfur containing viscosity reducer comprises sodium hypochlorite, sodium chlorite, hydrogen peroxide, Fenton's reagent, potassium permanganate, fluorine, hydroxyl radical, atomic oxygen, ozone, perhydroxyl radical, hypobromous acid, chlorine dioxide, hypochlorous acid, hypoiodous acid, chlorine, bromine, iodine, or any combination thereof. In one embodiment, the non-sulfur containing neutralizer comprises ascorbic acid, sodium ascorbate, citric acid, or any combination thereof.

By maintaining the substantially sulfur-free state, some or all desulfurization processes may be avoided in some embodiments. For example, in one embodiment, the fluid without sulfur may be injected into the hydrocarbon-bearing formation (that is being produced), a different hydrocarbon-bearing formation, or any combination thereof. In one embodiment, the fluid without sulfur may be discharged as permitted by law. In one embodiment, additional polymer may be added to the fluid without sulfur in order increase the viscosity of the fluid without sulfur again and re-inject into the hydrocarbon-bearing formation (that is being produced), a different hydrocarbon-bearing formation, or any combination thereof. Indeed, those of ordinary skill in the art will appreciate that by maintaining the substantially sulfur-free state, the fluid without sulfur may be reused more quickly, for example, in another EOR process.

FIG. 1 illustrates one embodiment of a method of treating fluid comprising hydrocarbons, water, and polymer being produced from a hydrocarbon-bearing formation via a production wellbore, referred to as method 11. For example, the method 11 may be performed as part of an EOR process, which is described hereinabove in the hydrocarbon recovery section.

At step 12, the method 11 includes adding a concentration of a viscosity reducer to the fluid comprising the hydrocarbons, the water, and the polymer being produced from the hydrocarbon-bearing formation via the production wellbore (e.g., at a first location) to degrade the polymer present in the fluid. At step 13, the method 11 includes adding a concentration of a neutralizer to the fluid (e.g., at a second location) to neutralize the viscosity reducer in the fluid. The addition of the concentration of the viscosity reducer is in a sufficient quantity to allow for complete chemical degradation of the polymer prior to the addition of the concentration of the neutralizer in the fluid such that excess viscosity reducer is present in the fluid. The addition of the concentration of the neutralizer is sufficiently upstream of any surface fluid processing equipment to allow for complete neutralization of the excess viscosity reducer such that excess neutralizer is present in the fluid prior to the fluid reaching any of the surface fluid processing equipment. In one embodiment, the first location is sufficiently upstream of the second location to allow for complete chemical degradation of the polymer prior to the fluid reaching the second location. In one embodiment, the second location is sufficiently upstream of any of the surface fluid processing equipment to allow for complete neutralization of the excess viscosity reducer in the fluid prior to the fluid reaching any of the surface fluid processing equipment.

In some embodiments, such as, but not limited to when the first location and the second location are different, the concentration of the viscosity reducer and the concentration of the neutralizer may be added continuously to the fluid. In some embodiments, such as, but not limited to when the first location and the second location are substantially the same location, the concentration of the viscosity reducer and the concentration of the neutralizer may be added in batch to the fluid. Furthermore, it is worth noting that the concentration of the viscosity, the concentration of the neutralizer, or any combination thereof may be adjusted (e.g., via dosing pump setting) in response to the polymer concentration in the fluid being produced.

After step 13, the fluid will pass to the surface fluid processing equipment for separation at step 14. For example, the hydrocarbons will be separated from the fluid and the water of the fluid may be reused or discharged. Moreover, the fluid, and more specifically, the separated water of the fluid, will be more suitable for re-injecting (step 15), discharging (step 16), mixing additional polymer (step 17), or any combination thereof due to the complete chemical degradation of the polymer and complete neutralization of the viscosity reducer.

Figure 11A:
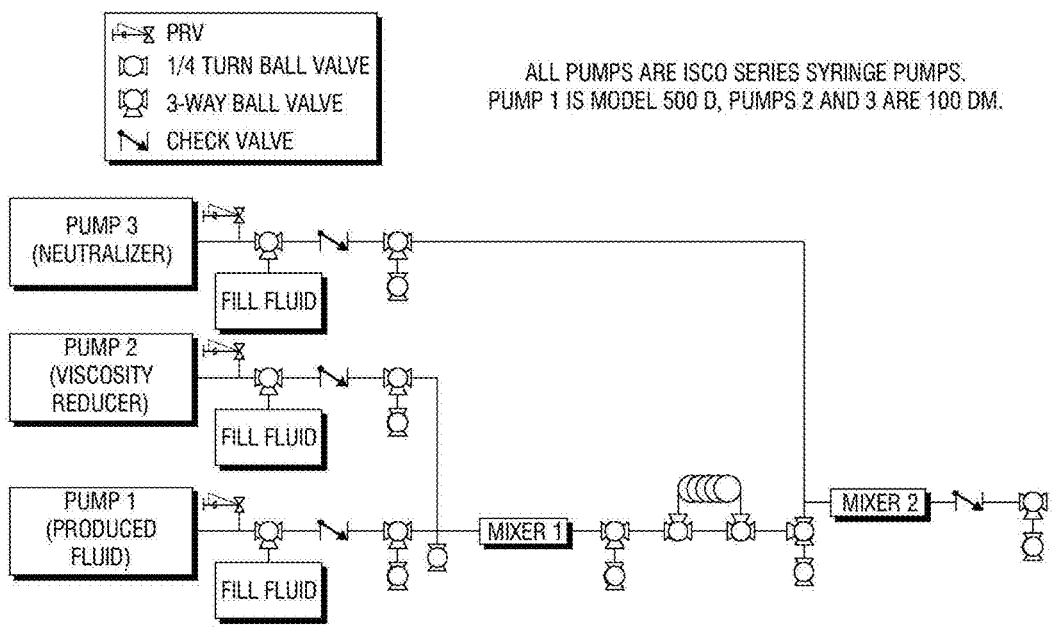
FIGS. 11A, 11B, and 11C illustrate different views of apparatuses that may be used in a laboratory setting to determine a concentration of viscosity reducer to add for complete chemical degradation of a polymer, a concentration of neutralizer to add for complete neutralization of all excess viscosity reducer, or any combination thereof according to the instant disclosure.
Figure 11B:
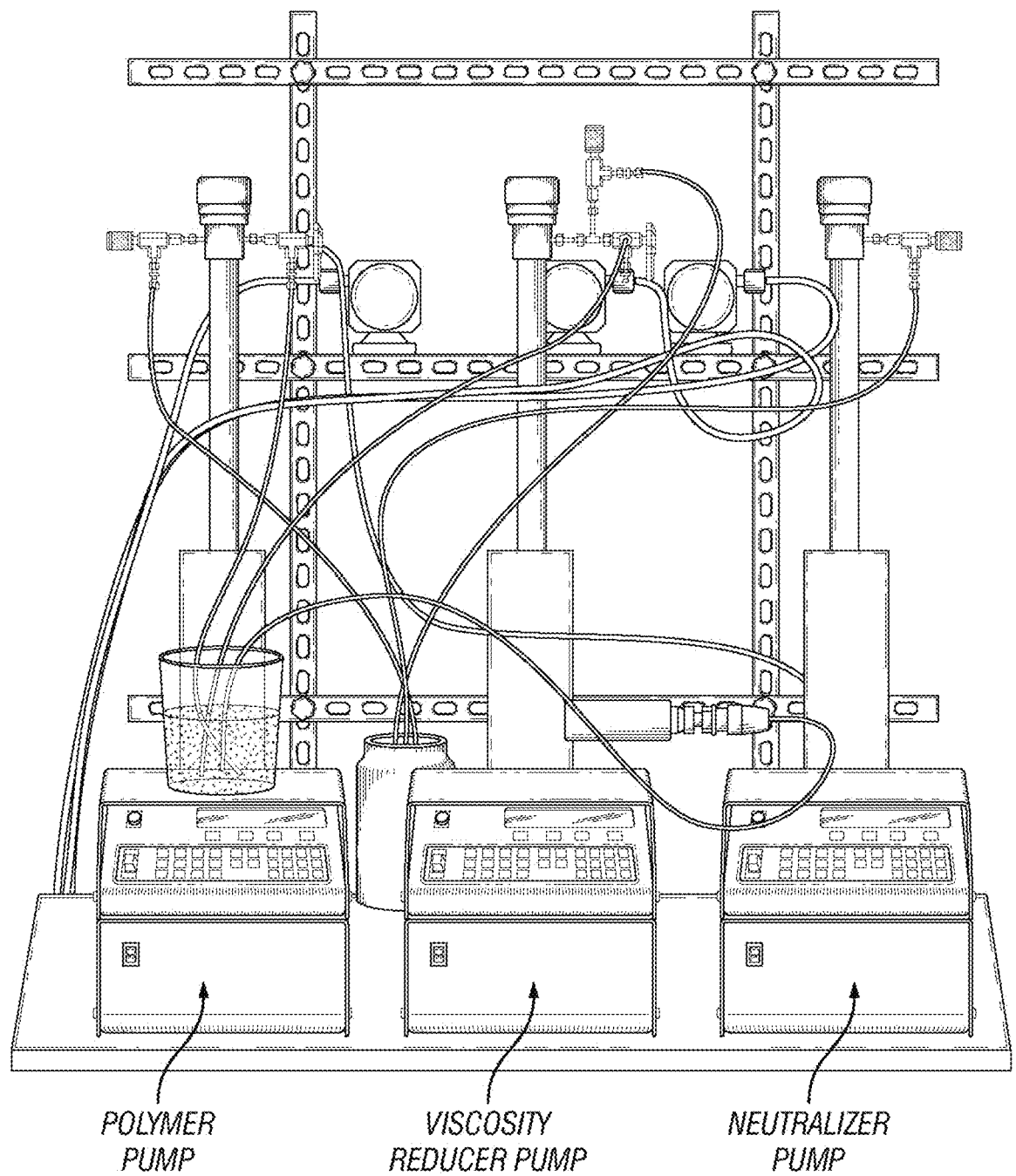
Figure 11C:
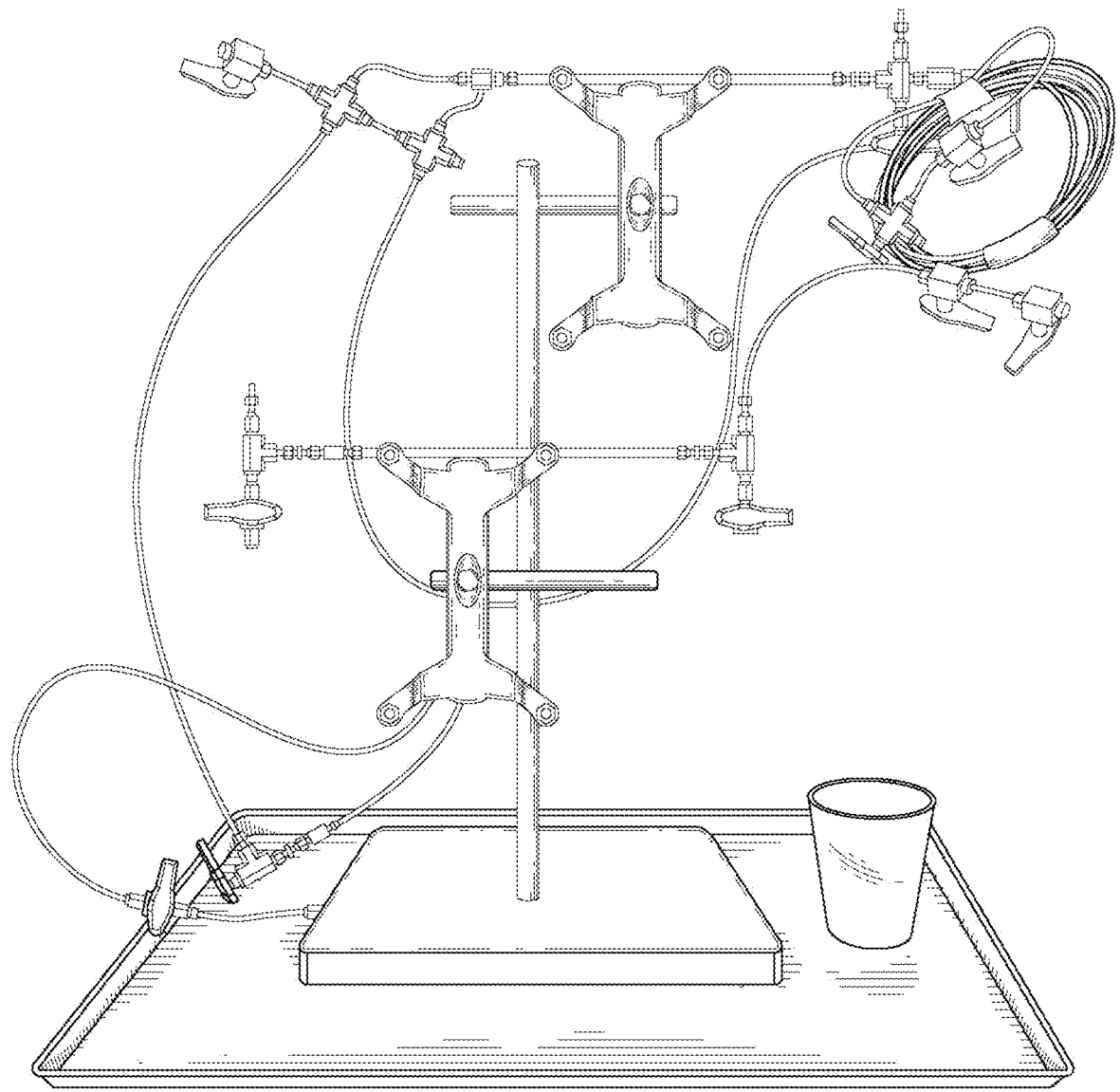

The actual concentration of the viscosity reducer to be added in order for the polymer to undergo complete chemical degradation may be determined in a laboratory setting using a viscometer. Complete chemical degradation of the polymer is accomplished when the viscosity of the water returns to the viscosity of a polymer-free version of that type of water. For example, after the EOR process has commenced, one or more samples using the fluid being produced via the production wellbore may be prepared. If the sample(s) includes hydrocarbons, the hydrocarbons may be removed with a separator in the laboratory setting from the sample(s) so that the hydrocarbons do not affect the viscosity measurements. Alternatively, the sample(s) may be prepared using fluid collected after the hydrocarbons have been separated by the surface fluid processing equipment. Alternatively, the sample(s) may be created using ion chromatography without hydrocarbons. Some embodiments include determining the concentration of the viscosity reducer to add to the fluid for complete chemical degradation of the polymer by using at least one hydrocarbon-free sample representative of the fluid, wherein determining the concentration of the viscosity reducer comprises causing the at least one sample to return to having a polymer-free viscosity, causing the at least one sample to have a viscosity of less than 1.4 cp with a minimum of 9 cp, causing excess viscosity reducer to be present in the at least one sample, or any combination thereof. FIGS. 11A, 11B, and 11C illustrate different views of apparatuses that may be used in the laboratory setting to determine the concentration of viscosity reducer for complete chemical degradation of the polymer, the concentration of neutralizer for complete neutralization of all excess viscosity reducer, or any combination thereof according to the present disclosure. Such measurements can also be taken in the field, e.g., using inline viscometers.

As a first example, assuming the water used in the EOR process is fresh water, fresh water without any polymer has a viscosity of 1 centipoise (cp) at 20° C. Experiments may be run using the viscometer in the laboratory setting with the sample(s) of the fluid being produced via the production wellbore to determine what concentration of the viscosity reducer will return the viscosity of the fresh water in the sample(s) to the viscosity of 1 cp at 20° C. of fresh water without any polymer. For instance, if the fresh water in the sample(s) is determined to have a viscosity of 100 cp, due to the concentration of polymer in the sample(s), then experiments may be run using the viscometer to determine what concentration of the viscosity reducer will cause the viscosity of the fresh water in the sample(s) to drop from 100 cp to 1 cp at 20° C. The return to the viscosity of polymer-free fresh water indicates that the concentration of polymer in the sample(s) has undergone complete chemical degradation.

As another example, assuming the water in the EOR process is sea water, sea water without any polymer has a viscosity of 1.052 cp at 20° C. Experiments may be run using the viscometer in the laboratory setting with the sample(s) of the fluid being produced via the production wellbore to determine what concentration of the viscosity reducer will return the viscosity of the sea water in the sample(s) to the viscosity of 1.052 cp at 20° C. of sea water without any polymer. For instance, if the sea water in the sample(s) is determined to have a viscosity of 100 cp, due to the concentration of polymer in the sample(s), then experiments may be run using the viscometer to determine what concentration of the viscosity reducer will cause the viscosity of the sea water in the sample(s) to drop from 100 cp to 1 cp at 20° C. The return to the viscosity of polymer-free sea water indicates that the concentration of polymer in the sample(s) has undergone complete chemical degradation.

As another example, brine is oftentimes utilized. The viscosity of the brine at 20° C. may be determined using a viscometer before any polymer is added to the brine. Experiments may be run using the viscometer in the laboratory setting with the sample(s) of the fluid being produced via the production wellbore to determine what concentration of the viscosity reducer will return the viscosity of the brine in the sample(s) to the viscosity of the polymer-free version of that brine at 20° C. For instance, if the brine in the sample(s) is determined to have a viscosity of 200 cp, due to the concentration of polymer in the sample(s), then experiments may be run using the viscometer to determine what concentration of the viscosity reducer will cause the viscosity of the brine in the sample(s) to drop from 200 cp to the viscosity of the polymer-free version of that brine at 20° C. The return to the viscosity of polymer-free brine indicates that the concentration of polymer in the sample(s) has undergone complete chemical degradation.

In short, the complete chemical degradation of the polymer may be determined indirectly through the reduction in viscosity of the water to a polymer-free viscosity for that type of water, for example, at ambient temperature (e.g., 20° C. to 25° C.). The determined concentration of viscosity reducer, as well as the residence time corresponding to the determined concentration of viscosity reducer for complete chemical degradation of the polymer in some embodiments, may be utilized in step 12.

As another example, in one embodiment, a viscosity of less than 1.4 cp (e.g., less than 1.3 cp, less than 1.2 cp, or less than 1.1 cp) for the sample(s) in the laboratory setting after the addition of the viscosity reducer indicates complete chemical degradation of the polymer. As another example, in one embodiment, a viscosity of at least 0.9 cp (e.g., at least 1 cp, at least 1.1 cp, or at least 1.2) for the sample(s) in the laboratory setting after the addition of the viscosity reducer indicates complete chemical degradation of the polymer. As another example, in one embodiment, a viscosity of a minimum 0.9 cp and less than 1.4 cp for the sample(s) after the addition of the viscosity reducer indicates complete chemical degradation of the polymer. As another example, in one embodiment, a viscosity of a minimum 1.0 cp and less than 1.4 cp for the sample(s) after the addition of the viscosity reducer indicates complete chemical degradation of the polymer. As another example, in one embodiment, a viscosity of 9 cp-1.3 cp, 0.9 cp-1.2 cp, 0.9 cp-1.1 cp, 1 cp-1.3 cp, 1 cp-1.2 cp, 1 cp-1.1 cp, or 1.1 cp or 1.3 cp for the sample(s) in the laboratory setting after the addition of the viscosity reducer indicates complete chemical degradation of the polymer. The viscosity can be determined with a viscometer in the laboratory setting. The viscosity of the sample(s) in the laboratory setting after the addition of the viscosity reducer from any of the minimum values described above to any of the maximum values described above indicates complete chemical degradation of the polymer.

Moreover, the fluid has a viscosity of less than 1.4 cp with a minimum viscosity of 0.9 cp (or a minimum viscosity of 1 cp in some embodiments) after separation of at least some of the hydrocarbons from the fluid by the surface fluid processing equipment. In one embodiment, a viscosity of less than 1.4 cp (e.g., less than 1.3 cp, less than 1.2 cp, or less than 1.1 cp) in the laboratory setting or at the field for a sample of the fluid being produced by the production wellbore after the viscosity reducer has been added to the fluid and after the fluid has passed through the FWKO or other separation apparatus would also indicate complete chemical degradation of the polymer. As another example, in one embodiment, a viscosity of at least 0.9 cp (e.g., at least 1 cp, at least 1.1 cp, or at least 1.2) in the laboratory setting or at the field for a sample of the fluid being produced by the production wellbore after the viscosity reducer has been added to the fluid and after the fluid has passed through the FWKO or other separation apparatus would also indicate complete chemical degradation of the polymer. As another example, in one embodiment, a viscosity of a minimum 0.9 cp and less than 1.4 cp in the laboratory setting or at the field for a sample of the fluid being produced by the production wellbore after the viscosity reducer has been added to the fluid and after the fluid has passed through the FWKO or other separation apparatus would also indicate complete chemical degradation of the polymer. As another example, in one embodiment, a viscosity of a minimum 1 cp and less than 1.4 cp in the laboratory setting or at the field for a sample of the fluid being produced by the production wellbore after the viscosity reducer has been added to the fluid and after the fluid has passed through the FWKO or other separation apparatus would also indicate complete chemical degradation of the polymer. As another example, in one embodiment, a viscosity of 9 cp-1.3 cp, 0.9 cp-1.2 cp, 0.9 cp-1.1 cp, 1 cp-1.3 cp, 1 cp-1.2 cp, 1 cp-1.1 cp, or 1.1 cp or 1.3 cp in the laboratory setting or at the field for a sample of the fluid being produced by the production wellbore after the viscosity reducer has been added to the fluid and after the fluid has passed through the FWKO or other separation apparatus would also indicate complete chemical degradation of the polymer. The viscosity can be determined with a viscometer or in-line viscometer. The viscosity in the laboratory setting or at the field for a sample of the fluid being produced by the production wellbore after the viscosity reducer has been added to the fluid and after the fluid has passed through the FWKO or other separation apparatus from any of the minimum values described above to any of the maximum values described above indicates complete chemical degradation of the polymer.

Also, of note, the presence of excess viscosity reducer may also indicate that the polymer has undergone complete chemical degradation. For example, the excess viscosity reducer may be present in the sample(s) because the polymer has degraded and there is no more polymer left to react with the viscosity reducer, hence the excess viscosity reducer. Any quantity of viscosity reducer after the viscosity reducer and the polymer reaction may be considered excess viscosity reducer, such as viscosity reducer of at least one 1 ppm, viscosity reducer in a range of 1 ppm to 10 ppm, excess viscosity reducer in a range of 1 ppm to 25 ppm, excess viscosity reducer in a range of 1 ppm to 50 ppm, excess viscosity reducer in a range of 1 ppm to 75 ppm, excess viscosity reducer in a range of 1 ppm to 100 ppm, etc. Whether or not excess viscosity reducer is present in the sample(s) may be determined with titration in the laboratory setting. For example, titration may be utilized to determine that a particular sample contains 25 ppm of excess viscosity reducer.

Also, of note, complete chemical degradation of the polymer in the sample(s) may also be determined via gel permeation chromatography (GPC). For example, GPC may be utilized to determine if the molecular chains have shortened. For example, the GPC may be utilized to determine if the polymer in the sample(s), such as polymers with smaller molecular chains like HPAM, have shortening of molecular chains after the addition of the viscosity reducer. Shortening of molecular chains may indicate complete chemical degradation of the polymer. GPC may therefore also be utilized to determine the concentration of the viscosity reducer that will cause complete chemical degradation of the polymer.

The actual concentration of the neutralizer to be added in order for complete neutralization of all excess viscosity reducer may be determined in the laboratory setting. Complete neutralization of all excess viscosity reducer is accomplished when excess neutralizer is present. For example, experiments may continue on the sample(s) with the excess viscosity reducer after complete chemical degradation of the polymer (or experiments may be run on different sample(s) having the determined concentration of viscosity reducer or quantity of viscosity reducer similar to the excess viscosity reducer) to determine what concentration of the neutralizer to utilize to accomplish complete neutralization of the excess viscosity reducer in the sample(s) so as to result in excess neutralizer in the sample(s). Some embodiments include determining the concentration of the neutralizer to add to the fluid for complete neutralization of the excess viscosity reducer in the fluid by using at least one hydrocarbon-free sample representative of the fluid, wherein determining the concentration of the neutralizer comprises causing excess neutralizer to be present in the at least one sample. The excess neutralizer is present because the excess viscosity reducer has been neutralized and there is no more viscosity reducer to react with the neutralizer, hence the excess neutralizer. Any quantity of neutralizer after the excess viscosity reducer and the neutralizer reaction may be considered excess neutralizer, such as excess neutralizer of at least one 1 ppm, excess neutralizer in a range of 1 ppm to 10 ppm, excess neutralizer in a range of 1 ppm to 25 ppm, excess neutralizer in a range of 1 ppm to 50 ppm, excess neutralizer in a range of 1 ppm to 75 ppm, excess neutralizer in a range of 1 ppm to 100 ppm, etc.

Whether or not there is excess neutralizer in the sample(s) may be determined via titration (with the viscosity reducer) in the laboratory setting at ambient temperature (e.g., 20° C. to 25° C.). For instance, the remaining neutralizer would be reacted with a titrant during titration. The reaction of neutralizer and titrant is 1:1. Depending on how much titrant gets used, the amount of neutralizer remaining would be determined. If this is a 1:2 reaction and say in titration the titrant used is x moles, then the amount of neutralizer present would be x/2 moles.

As an example, in the laboratory setting using titration, assume the sample contains 25 ppm of excess viscosity reducer and 125 ppm of neutralizer is added to the sample at a ratio of the viscosity reducer to the neutralizer of 1:5. After the viscosity reducer and the neutralizer react, excess neutralizer of more than 0 ppm remains in the sample. The excess neutralizer that remains may be a non-sulfur containing neutralizer that comprises ascorbic acid, sodium ascorbate, citric acid, or any combination thereof. The excess neutralizer indicates that the excess viscosity reducer of 25 ppm has undergone complete neutralization.

In short, the complete neutralization of the viscosity reducer may be determined indirectly through the presence of the excess neutralizer. The determined concentration of neutralizer, as well as the residence time corresponding to the determined concentration of neutralizer for complete neutralization of all excess viscosity reducer in some embodiments, may be utilized in step 13. In some embodiments, determining the concentration of the viscosity reducer, the concentration of the neutralizer, or both comprises using a viscometer, titration, high performance liquid chromatography, or any combination thereof.

The first location and the second location may vary in the steps 12-13. During the EOR process, the injection fluid containing polymer and water among other components is injected into the injection wellbore, and the injection fluid flows through the hydrocarbon-bearing formation towards the production wellbore picking up the hydrocarbons that are swept towards the production wellbore. The fluid being produced via the production wellbore passes through a wellhead of the production wellbore towards surface fluid processing equipment via surface piping. For example, the first location and the second location may depend on the available equipment, order of the equipment, distance between equipment, residence time for complete chemical degradation of the polymer, residence time for complete neutralization of all excess viscosity reducer, etc.

In one embodiment, the first location is downstream of the wellhead of the production wellbore. In one embodiment, the first location is prior to any downhole fluid lifting equipment in the production wellbore. In one embodiment, the surface fluid processing equipment comprises a FWKO, and the second location is upstream of the FWKO. In one embodiment, the surface fluid processing equipment comprises a HX downstream of the FWKO, and the second location is upstream of the FWKO. In one embodiment, the surface fluid processing equipment comprises a separator downstream of the HX, and the second location is upstream of the FWKO. In one embodiment, the surface fluid processing equipment comprises a flotation cell, an IFG apparatus, a hydrocyclone, a filter, or any combination thereof downstream of the FWKO, and the second location is upstream of the FWKO. In one embodiment, the first location and the second location are upstream of the FWKO.

As an example, assume 400 ppm of the polymer in the fluid being produced via the production wellbore, 100 ppm of the viscosity reducer is added for complete chemical degradation of the 400 ppm of the polymer, and 150 ppm of the neutralizer is added to completely neutralize 50 ppm of excess viscosity reducer per experiments run in the laboratory setting. At the first location, 100 ppm of the viscosity reducer is added at a ratio of the polymer to the viscosity reducer of 4:1 by concentration so that the polymer undergoes complete chemical degradation. As the viscosity reducer reacts with the polymer and the polymer undergoes complete chemical degradation, the viscosity of the water of the fluid returns to a polymer-free viscosity for that type of water and the concentration of the viscosity reducer may lower to 50 ppm. Thus, the excess viscosity reducer is 50 ppm in this example. Afterwards, at the second location, 150 ppm of the neutralizer is added for complete neutralization of the 50 ppm of excess viscosity reducer at a ratio of the excess viscosity reducer to the neutralizer of 1:3. Excess neutralizer of more than 0 ppm remains in the fluid (e.g., at least 1 ppm of the excess neutralizer, at least 5 ppm of the excess neutralizer, etc.) as confirmation that the excess viscosity reducer has been completely neutralized. The excess neutralizer that remains may be a non-sulfur containing neutralizer that comprises ascorbic acid, sodium ascorbate, citric acid, or any combination thereof. The fluid (e.g., separated water of the fluid) in this example is more suitable for re-injecting, discharging, mixing additional polymer, or any combination thereof due to the complete chemical degradation of the polymer and complete neutralization of the excess viscosity reducer.

After separation at step 14, the separated water of the fluid may flow to a step 15, a step 16, a step 17, or any combination thereof. At step 15, the method 11 includes re-injecting the separated water of the fluid after the step 14. For example, after the complete chemical degradation of the polymer and after the complete neutralization of all excess viscosity reducer, the separated water of the fluid may be re-injected into the hydrocarbon-bearing formation, a different hydrocarbon-bearing formation, or any combination thereof. The separated water of the fluid may be re-injected into the hydrocarbon-bearing formation through the same injection wellbore used in this EOR process, through a different injection wellbore drilled into the hydrocarbon-bearing formation, or any combination thereof. The separated water of the fluid may be re-injected into one or more injection wellbores drilled into the different hydrocarbon-bearing formation. The separated water of the fluid may be re-injected using substantially the same design, equipment, and methodologies that were used in this EOR process.

At step 16, the method 11 includes discharge of the separated water of the fluid after the step 14. For example, after the complete chemical degradation of the polymer and after the complete neutralization of all excess viscosity reducer, the separated water of the fluid may be discharged as permitted by law.

At step 17, the method 11 includes mixing additional polymer (sometimes referred to as fresh polymer" into the separated water of the fluid after step 14. For example, after the complete chemical degradation of the polymer and after the complete neutralization of all excess viscosity reducer, additional polymer may be mixed into the separated water of the fluid, such as at a third location, in order to increase the viscosity of the separated water of the fluid again. For example, the third location is downstream of the second location. For example, the separated water of the fluid may flow to a main line and additional polymer may be mixed with the separated water of the fluid, such as where at least one mixer is positioned for mixing polymer and/or mixing injection fluid, before injection into an injection wellbore. After mixing the additional polymer into the separated water of the fluid, the separated water of the fluid with increased viscosity due to the additional polymer may be re-injected into the hydrocarbon-bearing formation, the different hydrocarbon-bearing formation, or any combination thereof as in step 15. If the non-sulfur containing viscosity reducer and the non-sulfur containing neutralizer were utilized, then a substantially sulfur-free state may be maintained, which may allow the separated water of the fluid to be reused more quickly.

The additional polymer to be mixed into the separated water of the fluid at step 17 may have substantially the same characteristics as the polymer at the start of the EOR process before the fluid started to be produced from the hydrocarbon-bearing formation via the production wellbore. For example, one or more of the following characteristics may be substantially the same for the additional polymer mixed into the separated water of the fluid at step 17 and the polymer at the start of the EOR process: (a) type of polymer (e.g., powder polymer, liquid polymer, etc.), (b) concentration of polymer, (c) constituents of the polymer if applicable (e.g., all of the constituents, such as polymer, mineral oil, water, chelating agent, alkali, emulsifier, surfactant, biocide, solvent, co-solvent, optional additive, electrolyte, base, any combination thereof, etc.), (d) polymer mixing equipment and techniques, etc. For example, the polymer at the start of the EOR process and the additional polymer are substantially the same polymer because they are both synthetic polymers with similar constituents and similar concentrations.

However, in some embodiments, one or more characteristics of the additional polymer may be different as compared to the polymer at the start of the EOR process, for example, if it is believed that the difference may improve hydrocarbon recovery. As an example, the concentration of the additional polymer may be higher as compared to the concentration of the polymer at the start of the EOR process to improve hydrocarbon recovery. As another example, the polymer at the start of the EOR process and the additional polymer have substantially the same constituents, but in different concentrations, etc.

In one embodiment, 50 ppm to 50,000 ppm of additional polymer may be mixed into the separated water of the fluid at step 17, as illustrated in Table 1 below. In a second embodiment, 50 ppm to 10,000 ppm of additional polymer may be mixed into the separated water of the fluid at step 17. In a third embodiment, 50 ppm to 5,000 ppm of additional polymer may be mixed into the separated water of the fluid at the step 17. Furthermore, in some embodiments, one or more other components may also be added to the separated water of the fluid before, after, or at about the same time as the additional polymer. Optionally, an electrolyte may be added to the separated water of the fluid of 1 ppm to 50,000 ppm. Optionally, a surfactant may be added to the separated water of the fluid of 1,000 ppm to 50,000 ppm. Optionally, a co-solvent may be added to the separated water of the fluid of 1,000 ppm to 100,000 ppm, and so on. Table 1 illustrates various components that may also be added.

TABLE 1

| Polymer (and its constituents) | 50 ppm to 50,000 ppm |
| --- | --- |
| Surfactant | 1,000 ppm to 50,000 ppm |
| Co-solvent | 1,000 ppm to 100,000 ppm |
| Alkali | 100 ppm to 25,000 ppm |
| Chelant | 1 ppm to 5,000 ppm |
| Mineral Oil | 1 ppm to 5,000 ppm |
| Electrolyte | 1 ppm to 50,000 ppm |
| Biocide | 1 ppm to 1,000 ppm |

In short, those of ordinary skill in the art will appreciate that various options are available regarding the additional polymer and mixing the additional polymer. For example, if the system includes a collection vessel, the additional polymer may be mixed into the separated water of the fluid after the fluid exits the collection vessel. Alternatively, the additional polymer may be mixed into the separated water of the fluid while the separated water of the fluid is housed in the collection vessel. Nonetheless, the additional polymer may be mixed into the separated water of the fluid at step 17 as discussed hereinabove in the hydrocarbon recovery section, and the separated water of the fluid with the additional polymer may be re-injected as discussed hereinabove at the step 15.

Those of ordinary skill in the art will appreciate that various modifications may be made to the method 11 and other embodiments provided herein. For example, complete chemical degradation of the polymer may be detected if the fluid has a viscosity of less than 1.4 cp with a minimum viscosity of 9 cp after separation of at least some of the hydrocarbons from the fluid by the surface fluid processing equipment. For example, the method 11 of FIG. 1 may include at least one step to check the viscosity of the fluid after mixing of the additional polymer into the separated water of the fluid at the step 17 and before re-injecting at the step 15. The viscosity of the separated water of the fluid may be checked using a viscometer, such as the in-line viscometer and systems and methods described in U.S. Patent Application Publication No. 2013/0298644, which is incorporated by reference. Alternatively, the viscosity of the separated water of the fluid may be checked using the portable apparatus and systems and methods described in U.S. Patent Application Publication No. 2018/0031462, each of which is incorporated by reference. The method 11 may also include a step of adding at least one demulsifier to the fluid, for example, before any of the surface fluid processing equipment to help separate the hydrocarbons and the water of the fluid. By doing so, less water may flow through the separator due to the addition of the demulsifier.

Figure 2:
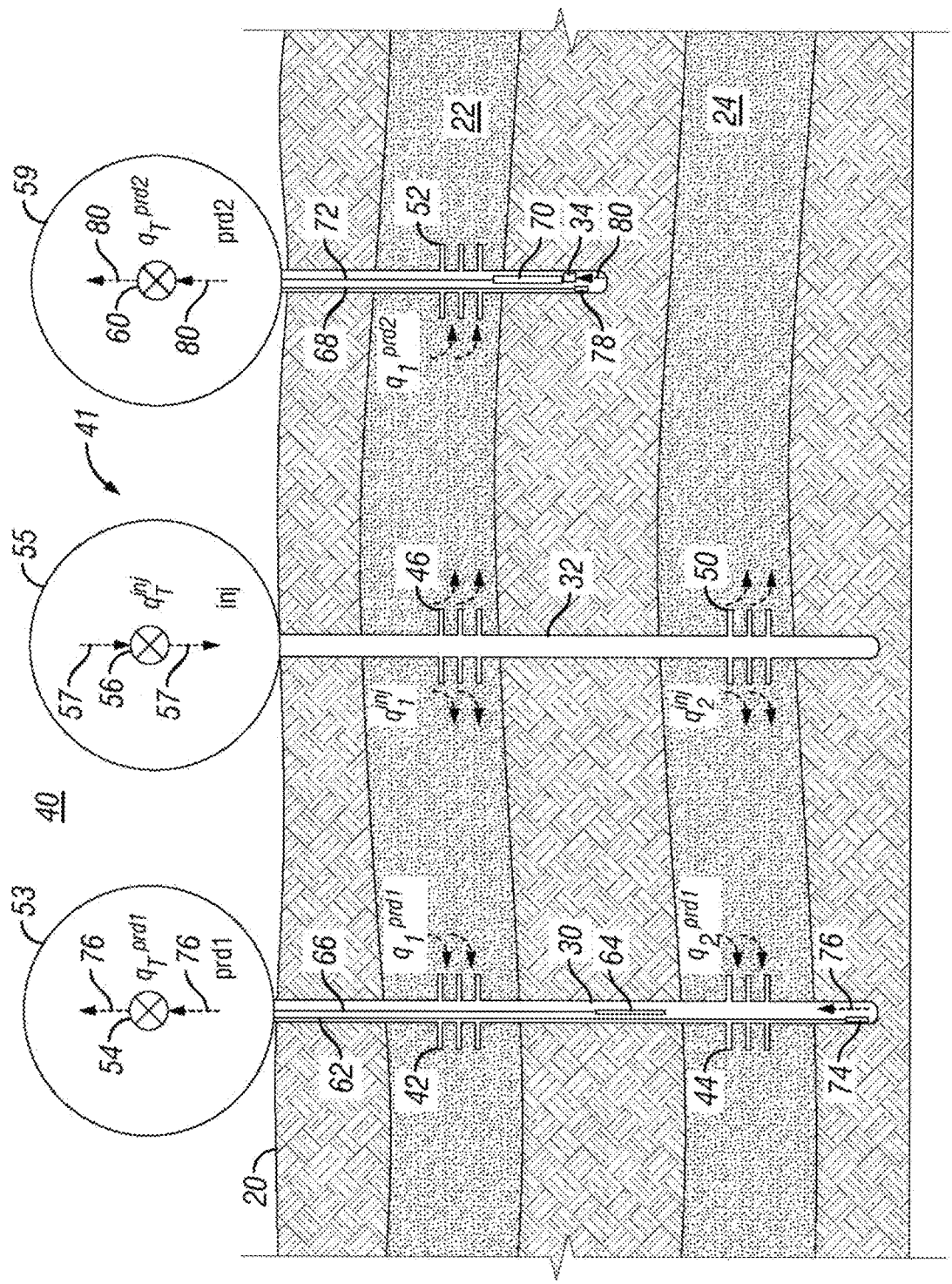
FIG. 2 illustrates one embodiment of a system of treating fluid comprising hydrocarbons, water, and polymer being produced from a hydrocarbon-bearing formation via a production wellbore.

FIG. 2 illustrates one embodiment of a system of treating fluid comprising hydrocarbons, water, and polymer being produced from a hydrocarbon-bearing formation via a production wellbore. FIG. 2 schematically illustrates an exemplary multilayered hydrocarbon-bearing formation (or subterranean reservoir) 20. The hydrocarbon-bearing formation 20 can be any type of subsurface formation in which hydrocarbons are stored, such as limestone, dolomite, oil shale, sandstone, or any combination thereof. As illustrated in FIG. 2, production wellbores 30, 34 and injection wellbore 32 are drilled and completed in the hydrocarbon-bearing formation 20. Production or injection wellbores can deviate from the vertical position such that in some embodiments, one or more wellbores can be a directional wellbore, horizontal wellbore, or a multilateral wellbore. In embodiments, fewer or additional injection wellbores and/or production wellbores can also extend into hydrocarbon-bearing zones 22, 24 of the hydrocarbon-bearing formation 20. The hydrocarbon-bearing formation 20 includes a plurality of rock layers including the hydrocarbon-bearing strata or zones 22, 24. In embodiments, the hydrocarbon-bearing formation 20 may include a different number of zones than those illustrated in FIG. 2.

The production wellbores 30, 34 and the injection wellbore 32 extend into one or more of the plurality of rock layers (e.g., hydrocarbon-bearing strata or zones 22, 24) of the hydrocarbon-bearing formation 20 such that the production wellbores 30, 34 and the injection wellbore 32 are in fluid communication with the hydrocarbon-bearing zones 22, 24. As part of the EOR process, the injection wellbore 32 can inject fluid 57 (e.g., injection fluid) that includes polymer and water into the hydrocarbon-bearing zones 22, 24. The fluid 57 may be mixed on site on the surface 40. The fluid 76, 80 being produced from the hydrocarbon-bearing formation 20 via the production wellbores 30, 34 comprise hydrocarbons from the hydrocarbon-bearing formation 20, some or all of the water from the fluid 57 injected into the injection wellbore 32, and some or all of the polymer from the fluid 57 injected into the injection wellbore 32 as a result of the EOR process.

The production wellbores 30, 34 and the injection wellbore 32 also fluidly connect the hydrocarbon-bearing zones 22, 24 to surface 40 of the hydrocarbon-bearing formation 20. The surface 40 of the hydrocarbon-bearing formation 20 can be a ground surface as depicted in FIG. 2, or a platform surface or seafloor in an offshore environment. The production wellbores 30, 34 and the injection wellbore 32 fluidly connect with a surface facility comprising surface fluid processing equipment 41 on the surface 40. For example, the surface fluid processing equipment 41 may include equipment such as, but not limited to, a FWKO, a HX, a separator, a flotation cell, an IGF apparatus, a hydrocyclone, a filter, etc. as illustrated in more detail in FIGS. 3-4.

The production or injection wellbores may be completed in any manner (e.g., an openhole completion, a cemented casing and/or liner completion, a gravel-packed completion, etc.). As shown in FIG. 2, completions 42, 44, 46, 50, 52 provide fluid communication between the injection wellbore 32, the hydrocarbon-bearing zones 22, 24, and the production wellbores 30, 34. Perforations can also be utilized for fluid communication. The production wellbore 34 only connects with upper hydrocarbon-bearing zone 22. Each of the production wellbores 30, 34 and the injection wellbore 32 may include a wellhead, such as wellheads 53, 55, 59. Chokes or well control devices 54, 56, 60 of the wellheads 53, 55, 59 are used to control the flow of the fluid 57 into the injection wellbore 32 and control the flow of fluid 76, 80 out of the production wellbores 30, 34. Well control devices 54, 56, 60 also control the pressure profiles in the production wellbores 30, 34 and the injection wellbore 32. From the wellheads 53, 59, the fluid 76, 80 being produced by the production wellbores 30, 34 flows to the surface fluid processing equipment 41.

The production wellbores 30, 34 may include downhole fluid lifting equipment such as electric submersible pumps (ESPs) 64, 70 to lift the fluid 76, 80 up through the production wellbores 30, 34 to the wellheads 53, 59. The ESPs 64, 70 may be coupled to ESP cables 66, 72, for example, to provide power to the ESPs 64, 70. The ESPs 64, 70 may be positioned in practically any location within the production wellbores 30, 34 to lift the fluid 76, 80 to the wellheads 53, 59.

In some embodiments, at least a portion of an ESP may be coated with a coating to reduce polymer adherence. In some embodiments, at least a portion of the ESP which is in contact with fluid during operation of the ESP is coated with a coating to reduce polymer adherence. In certain embodiments, substantially all of the ESP which is in contact with fluid during operation of the ESP is coated with a coating to reduce polymer adherence. Depending on the composition of the coating as well as the surface(s) of the ESP which are coated, the coating can be applied to ESP surfaces prior to assembly of the ESP, at a suitable stage during assembly of the ESP, after assembly of the ESP, or any combination thereof. For example, in the case of coatings that require curing steps which may damage electronic components (e.g., coatings that are deposited using thermal curing), coatings may be deposited on surface(s) of components of the ESP before and/or during assembly, but prior to assembly of the motor and/or other electronic components of the ESP. Likewise, in the case of coatings that require irradiation of coated surfaces as part of the curing step (e.g., coatings that are deposited using a UV curing step), coatings may be deposited on surface(s) of components of the ESP before and/or during assembly (when they can be readily irradiated with UV light), and then the ESP can be assembled.

A variety of suitable coatings are known in the art. By way of example, in some embodiments, the coating can comprise an organic-inorganic hybrid coating. Such coatings may be formed using a sol-gel comprising a silane, silanol, metal oxide precursor, a derivative thereof, or combination thereof deposited on a surface of a substrate (a surface of the ESP or a component thereof). Such coatings can include base chemical reagent(s) to form the body of the base composite. In some embodiments, the composite solution can further include chelating agent(s) to enhance homogeneity of the organic/inorganic material(s) in the solution, bonding agent(s) to aid bonding of the composite to a desired surface, plasticizer(s) to maintain elasticity of the base composite, viscosity modifier(s) to achieve a desired viscosity for the solution, hydrophobic chemical agent(s) to increase the surface hydrophobicity of the resulting composite, or any combination thereof. In some embodiments, a surface treatment comprising hydrophobic chemical agent(s) may be applied after deposition of the sol-gel to increase the surface hydrophobicity of the resulting composite. Examples of such coatings are described, for example, in U.S. Patent Application Publication No. 2017/0313888, which is hereby incorporated by reference in its entirety.

The base chemical reagent(s) to form the body of the base composite may comprise at least one alkoxysilane, metal oxide precursor, or any combination thereof having a general formula of $M(OR)_4$ (M=Si, Al, Ti, In, Sn, or Zr), where R comprises hydrogen, a substituted or unsubstituted alkyl, or derivatives thereof. Nonlimiting examples of such chemicals includes tetramethyl orthosilicate, tetraethyl orthosilicate, tetraisopropyl orthosilicate, tetra(tert-butyl) orthosilicate, tetra(sec-butyl) orthosilicate, aluminum methoxide, aluminum ethoxide, aluminum isopropoxide, aluminum tert-butoxide, aluminum tri-sec-butoxide, titanium methoxide, titanium ethoxide, titanium isopropoxide, titanium tert-butoxide, titanium tri-sec-butoxide, and derivatives bearing similar structures.

Example chelating agent(s) to enhance homogeneity of the organic material(s) in the solution may comprise at least one alkoxysilane, metal oxide precursor, or any combination thereof having a general formula of $M(OR)_xR'_yR''_z$ (M=Si, Al, In, Sn, or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl, or derivatives thereof; R' comprises hydrogen, a substituted or unsubstituted alkyl, or derivatives thereof, and R" comprises a substituted or unsubstituted alky or alkenyl group comprising from 3 to 20 carbon atoms. Nonlimiting examples of such chemicals include trimethoxyphenylsilane, dimethoxymethylphenylsilane, methoxydimethylphenylsilane, trimethoxyphenethylsilane, dimethoxymethylphenethylsilane, methoxydimethylphenethylsilane, trimethoxyoctylsilane, dimethoxymethyloctylsilane, methoxydimethyloctylsilane, trimethoxydodecylsilane, dimethoxymethyldodecylsilane, methoxydimethyldodecylsilane, trimethoxydecylsilane, dimethoxymethyldecylsilane, methoxydimethyldecylsilane, trimethoxyoctadecylsilane, dimethoxymethyloctadecylsilane, methoxydimethyloctadecylsilane, trimethoxyhexylsilane, dimethoxymethylhexylsilane, methoxydimethylhexylsilane, trimethoxy (cyclohexylmethyl) silane, dimethoxymethyl (cyclohexylmethyl) silane, methoxydimethyl(cyclohexylmethyl) silane, triethoxyphenylsilane, diethoxymethylphenylsilane, ethoxydimethylphenylsilane, triethoxyphenethylsilane, diethoxymethylphenethylsilane, ethoxydimethylphenethylsilane, triethoxyoctylsilane, diethoxymethyloctylsilane, ethoxydimethyloctylsilane, triethoxydodecylsilane, diethoxymethyldodecylsilane, ethoxydimethyldodecylsilane, triethoxydecylsilane, diethoxymethyldecylsilane, ethoxydimethyldecylsilane, triethoxyoctadecylsilane, diethoxymethyloctadecylsilane, ethoxydimethyloctadecylsilane, triethoxyhexylsilane, diethoxymethylhexylsilane, ethoxydimethylhexylsilane, triethoxy (cyclohexylmethyl) silane, diethoxymethyl(cyclohexylmethyl) silane, ethoxydimethyl(cyclohexylmethyl) silane, and derivatives bearing similar structures.

Example chelating agent(s) to enhance homogeneity of the inorganic material(s) in the solution may comprise at least one alkoxysilane, metal oxide precursor, or any combination thereof having a general formula of $M(OR)_xR'_yR''_z$ (M=Si, Al, In, Sn, or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl, or derivatives thereof and R" comprises a substituted or unsubstituted amine (including primary, secondary and tertiary) or thiol. Nonlimiting examples of such chemicals includes 3-aminopropyltrimethoxysilane, 3-aminopropyltriethoxysilane, 2-aminoethyltrimethoxysilane, 2-aminoethyltriethoxysilane, N-methylaminopropyltrimethoxysilane, N-methylaminopropyltriethoxysilane 4-aminobutylmethyldimethoxysilane, 4-aminobutylmethyldiethoxysilane, 3-aminopropyldimethylmethoxysilane, 3-aminopropyldimethylethoxysilane, 3-aminopropylmethyldimethoxysilane, 3-aminopropylmethyldiethoxysilane, N,N-dimethyl-3-aminopropyltrimethoxysilane, N,N-dimethyl-3-aminopropyltriethoxysilane, N,N-diethyl-3-aminopropyltrimethoxysilane, N,N-diethyl-3-aminopropyltriethoxysilane, N,N-diethylaminomethyltrimethoxysilane, N,N-diethylaminomethyltriethoxysilane, bis(2-hydroxyethyl)-3-aminopropyltrimethoxysilane, bis(2-hydroxyethyl)-3-aminopropyltriethoxysilane, N-(2'-aminoethyl)-3-aminopropyltrimethoxysilane, N-(2'-aminoethyl)-3-aminopropyltriethoxysilane, N-butyl-3-aminopropyltrimethoxysilane, N-butyl-3-aminopropyltriethoxysilane, N-octyl-3-aminopropyltrimethoxysilane, N-octyl-3-aminopropyltriethoxysilane, N-cyclohexyl-3-aminopropyltrimethoxysilane, N-cyclohexyl-3-aminopropyltriethoxysilane, N-(3'-trimethoxysilylpropyl)-piperazine, N-(3'-triethoxysilylpropyl)-piperazine, N-(3'-trimethoxysilylpropyl) morpholine, N-(3'-triethoxysilylpropyl) morpholine, bis(3-trimethoxysilylpropyl)amine, bis(3-triethoxysilylpropyl)amine, tris(3-trimethoxysilylpropyl)amine, tris(3-triethoxysilylpropyl)amine, N-methyl-N-butyl-3-aminopropyltrimethoxysilane, N-methyl-N-butyl-3-aminopropyltriethoxysilane, N-(3'-aminopropyl)-3-aminopropyltrimethoxysilane, N-(3'-aminopropyl)-3-aminopropyltriethoxysilane, N-phenyl-3-aminopropyltrimethoxysilane, N-phenyl-3-aminopropyltriethoxysilane, 3-mercaptopropyltrimethoxysilane, 3-mercaptopropyltriethoxysilane, and derivatives bearing similar structures.

Example bonding agent(s) to aid bonding of the organic/inorganic composite to a desired surface may comprise at least one alkoxysilane, metal oxide precursor, or any combination thereof having a general formula of $M(OR)_xR'_yR''_z$ (M=Si, Al, In, Sn, or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl, or derivatives thereof; R' comprises hydrogen, a substituted or unsubstituted alkyl, or derivatives thereof; and R" comprises a substituted or unsubstituted epoxy or glycidoxy. Nonlimiting examples of such chemicals includes 2-(3,4-epoxycyclohexyl)ethyltrimethoxysilane, 2-(3,4-epoxycyclohexyl)-ethyltriethoxysilane, 5,6-epoxyhexyltrimethoxysilane, 5,6-epoxyhexyltriethoxysilane, glycidoxymethyltrimethoxysilane, glycidoxymethyltriethoxysilane, 2-glycidoxyethyltrimethoxysilane, 2-glycidoxyethyltriethoxysilane, 3-glycidoxypropyltrimethoxysilane, 3-glycidoxypropyltriethoxysilane, 4-glycidoxybutyltrimethoxysilane, 4-glycidoxybutyltriethoxysilane, and derivatives bearing similar structures.

Example plasticizer(s) to maintain elasticity of the base composite may comprise at least one alkoxysilane, metal oxide precursor, or any combination thereof having a general formula of $M(OR)_{4-x}R'_x$ (M=Si, Al, In, Sn, or Ti; x is the integer 1, 2 or 3), where R comprise hydrogen, a substituted or unsubstituted alkyl, or derivatives thereof and R' comprise a substituted or unsubstituted alkyl, a substituted or unsubstituted alkenyl, a substituted or unsubstituted alkynyl, a substituted or unsubstituted aryl, or derivatives thereof. Nonlimiting examples of such chemicals includes trimethoxymethylsilane, dimethoxydimethylsilane, methoxytrimethylsilane, trimethoxyethylsilane, dimethoxydiethylsilane, methoxytriethylsilane, trimethoxypropylsilane, dimethoxydipropylsilane, methoxytripropylsilane, trimethoxyisobutylsilane, triethoxyisobutylsilane, dimethoxydiisobutylsilane, diethoxydiisobutylsilane, trimethoxyphenylsilane, dimethoxydiphenylsilane, methoxytriphenylsilane, trimethoxyphenethylsilane, dimethoxydiphenethylsilane, methoxytriphenethylsilane, triethoxymethylsilane, diethoxydimethylsilane, ethoxytrimethylsilane, triethoxyethylsilane, diethoxydiethylsilane, ethoxytriethylsilane, triethoxypropylsilane, diethoxydipropylsilane, ethoxytripropylsilane, triethoxyphenylsilane, diethoxydiphenylsilane, ethoxytriphenylsilane, triethoxyphenethylsilane, diethoxydiphenethylsilane, ethoxytriphenethylsilane, and derivatives bearing similar structures.

Example viscosity modifier(s) to achieve a desired viscosity for the solution may comprise at least one alkylsiloxane in oligomer/co-oligomer form, polymer/co-polymer form, or any combination thereof having a general formula of

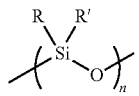

and average molecular weight equal to or between 100 to 100,000 Da, where R and R' can be the same or different and comprise hydrogen, a substituted or unsubstituted alkyl, or derivatives thereof. Nonlimiting examples of such chemicals include 3-aminopropyl-terminated poly(dimethylsiloxane), chlorine-terminated poly(dimethylsiloxane), glycidyl ether-terminated poly(dimethylsiloxane), hydride-terminated poly(dimethylsiloxane), hydroxy-terminated poly(dimethylsiloxane), hydroxyalkyl-terminated poly(dimethylsiloxane), vinyl-terminated poly(dimethylsiloxane), trimethylsilyl-terminated poly(dimethylsiloxane), and derivatives bearing similar structures.

Optionally, functional additives may be incorporated into the coating composition to provide, for example, anti-abrasion, anti-microbial, anti-bacterial, anti-fungal benefits and/or pigmentation. The additives may be composed of materials including but not limited to, organic/inorganic molecules/polymers having molecular weight up to about 100,000 Da, organic micro/nano materials in their natural or synthetic forms (e.g. particles, nanotubes and nanosheets) having sizes equal to or between about 2 nm to 500 μm; metal/metal oxide micro/nano materials (e.g. silver, titanium oxide, zinc oxide, aluminum oxide, iron oxide, selenium oxide, tellurium oxide and clay, which may be composed of kaolinite, montmorillonite, illite or chlorite) in their natural or synthetic forms (e.g. particles, nanotubes and nanosheets) having sizes equal to or between about 2 nm to 500 μm; or any combination thereof.

Coatings can be formed by mixing solvent(s), base chemical reagents(s), chelating agent(s), bonding agent(s), plasticizer(s), viscosity modifier(s), functional additive(s), and/or pigment(s) in an acidic condition (pH≤5) to form a coating solution. In some embodiments, a coating solution may comprise at least the solvent(s), base chemical reagent(s), chelating agent(s), bonding agent(s), and plasticizer(s). In some embodiments, the coating solution may optionally further include viscosity modifier(s), functional additive(s) and/or pigment(s). In some embodiments, the coating solution may comprise 1-10 vol. % of water, 10-40 vol. % of at least one solvent(s), 30-70 vol. % of at least one base chemical reagent(s), 10-20 vol. % of at least one plasticizer(s), 1-10 vol. % of at least one bonding agent(s), and the rest of the volume may comprise the chelating agent(s), the viscosity modifier(s), the functional additive(s), and/or the pigment(s). In some embodiments, the coating solution may comprise 3-8 vol. % of water, 20-30 vol. % of at least one solvent(s), 40-60 vol. % of at least one base chemical reagent(s), 10-15 vol. % of at least one plasticizer(s), 1-5 vol. % of at least one bonding agent(s), and the remaining volume may comprise any optional additives. In some embodiments, the coating solution is similar to the embodiments above, but the concentration of plasticizer(s) is less than 15 vol. %, or more preferably less than 10 vol. %. In some embodiments, the coating solution is similar to the embodiments above, but the concentration of bonding agent(s) is less than 5 vol. %, or more preferably less than 3 vol. %. The mixture of the aforementioned chemical agents may be stirred at elevated temperature equal to or between 50 to 100° C. for about ½ hour to 10 days, or preferably between 50 to 70° C. for about ½ hour to 12 hours. In some embodiments, the coating solution can be further diluted with more solvent(s) to a final concentration no less than 20 vol. % to form the final coating solution for application to a surface, such as a final concentration between 60 to 100 vol. % (e.g., 80 to 100 vol. %). In some embodiments, the organic/inorganic composite solution is at least partially hydrolyzed or completely hydrolyzed. The coating solution can then be deposited on a surface of the ESP to afford a coating. This can comprise, for example, spraying, misting, doctor-blading, padding, foaming, rolling, inkjet printing, dipping, flush or dip-coating, immersing, soaking, or any combination thereof. The solvent may then be removed from the materials, and the materials may be dried or cured at a set temperature equal to or between about 25 and 200° C. In certain embodiments, the crosslink density of the crosslinkable components, e.g., the degree of crosslinking can range from 1% to 100% of complete crosslinking.

If desired, the target surface may be activated before the deposition of the organic/inorganic coating solution. The surface activation may be achieved by reaction with ozone, oxygen, hydrogen peroxide, halogens, other reactive oxidizing species, or any combination thereof. The activation can create an energetically reactive surface, increase the concentration of free radicals, bind molecules on the surface covalently, or any combination thereof. In some embodiments, the surface activation may be achieved by ozone plasma generated by intense UV light. In other embodiments, surface activation may be achieved by plasma treatment. In yet another embodiment, surface activation may be achieved by ozone generation using a corona discharge, flame, or plasma.

If desired, the resulting coatings may then be treated with the hydrophobic chemical agent(s) to increase the surface hydrophobicity of the resulting organic/inorganic nanocomposite. This can comprise contacting the coating with a hydrophobic solution that comprises solvents, hydrophobic chemical agents and/or other chemical agents, which renders the surface hydrophobic/superhydrophobic, generates nanoscopic or microscopic topography, or any combination thereof. In some embodiments, the hydrophobic solution comprises at least one solvent and a hydrophobic chemical agent. In some embodiments, the hydrophobic solution may further include one or more other chemical agents. In some embodiments, the hydrophobic chemical agents and/or other chemical agents may be deposited utilizing a vapor treatment.

As a nonlimiting example, in some cases, the hydrophobic chemical agent can include at least one type of fluoroalkylsilane covalently bonded to the resulting surface, which renders the surface hydrophobic/superhydrophobic. The covalently bound fluoroalkylsilane can also generate nanoscopic or microscopic topography. In some embodiments, the hydrophobic chemical agents may have a general formula of fluoroalkylsilane $[CF_3(CF_2)_a(CH_2)_b]_cSiR_dX_e$ (where X=Cl, Br, I, or other suitable organic leaving groups, R comprises a substituted or unsubstituted alkyl, a substituted or unsubstituted alkenyl, a substituted or unsubstituted alkynyl, a substituted or unsubstituted aryl, or derivatives thereof, a is the integer 0, 1, 2, 3 . . . to 20, b is the integer 0, 1, 2, 3 . . . to 10, c is the integer 1, 2, or 3, d is the integer 0, 1, 2, or 3, and e is the integer 1, 2, or 3, provided that the sum of c, d and e equals 4). Example fluoroalkylsilane species may include, but are not limited to, trichloro(3,3,3-trifluoropropyl) silane, dichloro-methyl (3,3,3-trifluoropropyl) silane, chloro-dimethyl (3,3,3-trifluoropropyl) silane, trichloro(1H,1H,2H,2H-perfluorobutyl) silane, dichloro-methyl (1H,1H,2H,2H-perfluorobutyl) silane, chloro-dimethyl (1H,1H,2H,2H-perfluorobutyl) silane, trichloro(1H,1H,2H,2H-perfluorohexyl) silane, dichloro-methyl (1H,1H,2H,2H-perfluorohexyl) silane, chloro-dimethyl (1H,1H,2H,2H-perfluorohexyl) silane, trichloro(1H,1H,2H,2H-perfluorooctyl) silane, dichloro-methyl (1H,1H,2H,2H-perfluorooctyl) silane, chloro-dimethyl (1H,1H,2H,2H-perfluorooctyl) silane, trichloro(1H,1H,2H,2H-perfluorodecyl) silane, dichloro-methyl (1H,1H,2H,2H-perfluorodecyl) silane, chloro-dimethyl (1H,1H,2H,2H-perfluorodecyl) silane, trichloro(1H,1H,2H,2H-perfluorododecyl) silane, dichloro-methyl (1H,1H,2H,2H-perfluorododecyl) silane, chloro-dimethyl (1H,1H,2H,2H-perfluorododecyl) silane, and derivatives bearing similar structures. In some embodiments, these hydrophobic chemical agent(s) may be dissolved or dispersed in one or more organic solvents. The concentration of the hydrophobic chemical agent(s) in organic solvent(s) is equal to or between 0.1 and 15 vol. %. Example organic solvents may include but not limited to toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers, and petroleum hydrocarbons.

Other chemical agents may also be used alone or in conjunction with fluoroalkylsilanes to perform similar tasks to render the surface hydrophobic and/or to generate nanoscopic topography. In some embodiments, other chemical agents may be hydrophobic and may have a general formula of alkylsilane $[CH_3(CH_2)_a]_bSiR_cX_d$; where X comprises Cl, Br, I, or other suitable organic leaving groups, R comprises a substituted or unsubstituted alkyl, a substituted or unsubstituted alkenyl, a substituted or unsubstituted alkynyl, a substituted or unsubstituted aryl, or derivatives thereof, and a is the integer 0, 1, 2, 3 . . . to 20, b is the integer 1, 2 or 3, c is the integer 0, 1, 2, or 3, and d is the integer 1, 2 or 3, provided that the sum of b, c and d equals 4. The preferred alkylsilane species may include, but are not limited to, chlorosilane, dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chlorodimethylphenethylsilane, dichloromethylphenethylsilane, trichlorophenethylsilane, chlorodimethyloctylsilane, dichloromethyloctylsilane trichlorooctylsilane, chlorodimethyldodecylsilane, dichloromethyldodecylsilane, trichlorododecylsilane, chlorodecyldimethylsilane, dichlorodecylmethylsilane, trichlorodecylsilane, chlorodimethyloctadecylsilane, dichloromethyloctadecylsilane, trichlorooctadecylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, (cyclohexylmethyl)trichlorosilane, and derivatives bearing similar structures. In some embodiments, these chemical agent(s) may be dissolved or dispersed in one or more organic solvents. Typically, the concentration of the hydrophobic chemical agent(s) in organic solvent(s) is equal to or between 0.1 and 15 vol. %. Example organic solvents may include but not limited to toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers, and petroleum hydrocarbons. Other chemical agents may also be used alone or in conjunction with fluoroalkylsilanes or alkylsilanes to perform similar tasks to render the surface hydrophobic and/or to generate nanoscopic topography.

Another example hydrophobic chemical agent includes an alkoxyfluoroalkylsilane covalently bonded to the resulting surface, which renders the surface hydrophobic/superhydrophobic and/or generates nanoscopic topography. The hydrophobic chemical agent may have a general formula of alkoxyfluoroalkylsilane $[CF_3(CF_2)_a(CH_2)_b]_cSiR_d[alkoxy]_e$ (where [alkoxy] comprise methoxy, ethoxy, propoxy, isopropoxy, butoxy, isobutoxy, or any combination thereof; R comprises a substituted or unsubstituted alkyl, a substituted or unsubstituted alkenyl, a substituted or unsubstituted alkynyl, a substituted or unsubstituted aryl, or derivatives thereof, a is the integer 0, 1, 2, 3 . . . to 20, b is the integer 0, 1, 2, 3 . . . to 10, c is the integer 1, 2, or 3, d is the integer 0, 1, 2, or 3, and e is the integer 1, 2, or 3, provided that the sum of c, d and e equals 4). Example alkoxyfluoroalkylsilane species may include, but are not limited to, trimethoxy (3,3,3-trifluoropropyl) silane, triethoxy (3,3,3-trifluoropropyl) silane, tripropoxy (3,3,3-trifluoropropyl) silane, triisopropoxy (3,3,3-trifluoropropyl) silane, trimethoxy (1H,1H,2H,2H-perfluorobutyl) silane, triethoxy (1H,1H,2H,2H-perfluorobutyl) silane, tripropoxy (1H,1H,2H,2H-perfluorobutyl) silane, triisopropoxy (1H,1H,2H,2H-perfluorobutyl) silane, trimethoxy (1H,1H,2H,2H-perfluorohexyl) silane, triethoxy (1H,1H,2H,2H-perfluorohexyl) silane, tripropoxy (1H,1H,2H,2H-perfluorohexyl) silane, triisopropoxy (1H,1H,2H,2H-perfluorohexyl) silane, trimethoxy (1H,1H,2H,2H-perfluorooctyl) silane, triethoxy (1H,1H,2H,2H-perfluorooctyl) silane, tripropoxy (1H,1H,2H,2H-perfluorooctyl) silane, triisopropoxy (1H,1H,2H,2H-perfluorooctyl) silane, trimethoxy (1H,1H,2H,2H-perfluorooctyl) silane, triethoxy (1H,1H,2H,2H-perfluorodecyl) silane, tripropoxy (1H,1H,2H,2H-perfluorodecyl) silane, triisopropoxy (1H,1H,2H,2H-perfluorodecyl) silane, trimethoxy (1H,1H,2H,2H-perfluorodecyl) silane, triethoxy (1H,1H,2H,2H-perfluorododecyl) silane, tripropoxy (1H,1H,2H,2H-perfluorododecyl) silane, triisopropoxy (1H,1H,2H,2H-perfluorododecyl) silane, and derivatives bearing similar structures. In some embodiments, these hydrophobic chemical agents may be dissolved or dispersed in an organic solvent or a mixture of organic solvents. Typically, the concentration of the hydrophobic chemical agent(s) in organic solvent(s) is equal to or between 0.1 and 15 vol. %. Example organic solvents may include, but are not limited to, methanol, ethanol, n-propanol, isopropanol, n-butanol, isobutanol, acetone, acetonitrile, dioxane, tetrahydrofuran, tetrachloroethylene, n-propyl bromide, dimethylformamide, dimethyl sulfoxide, and water.

In some embodiments, the alkoxyfluoroalkylsilane $[CF_3(CF_2)_a(CH_2)_b]_cSiR_d[alkoxy]_e$ can be chemically converted from fluoroalkylsilane $[CF_3(CF_2)_a(CH_2)_b]_cSiR_dX_e$ by mixing and heating the fluoroalkylsilane in the corresponding solvent(s) (e.g. methanol, ethanol, isopropanol, and water). The mixture of the chemical agent can then be stirred at elevated temperature equal to or between 50 to 100° C. for about 1 hour to 7 days in an acidic environment (pH≤1) before being neutralized with KOH (may contain up to 15% (by weight) of water) until the pH reached is equal to or between 6 and 8. The hydrophobic solutions can then be used directly or further diluted in an appropriate solvent (e.g. methanol, ethanol, isopropanol, denatured ethanol, water, etc.).

Other chemical agents can be use alone or in conjunction with another agent (e.g., an alkoxyfluoroalkylsilane) to render the surface hydrophobic and/or to generate nanoscopic topography. In some embodiments, other chemical agents may be hydrophobic and may have a general formula of alkoxyalkylsilane $[CH_3(CH_2)_a]_bSiR_c[alkoxy]_d$; where [alkoxy] comprise methoxy, ethoxy, propoxy, isopropoxy, butoxy, isobutoxy, or any combination thereof; R comprise a substituted or unsubstituted alkyl, a substituted or unsubstituted alkenyl, a substituted or unsubstituted alkynyl, a substituted or unsubstituted aryl, or derivatives thereof, and a is the integer 0, 1, 2, 3 . . . to 20, b is the integer 1, 2 or 3, c is the integer 0, 1, 2, or 3, and d is the integer 1, 2 or 3, provided that the sum of b, c and d equals 4. Example alkoxyalkylsilane species may include, but are not limited to, trimethoxyisobutylsilane, triethoxyisobutylsilane, dimethoxydiisobutylsilane, diethoxydiisobutylsilane, trimethoxy (hexyl) silane, triethoxy (hexyl) silane, tripropoxy (hexyl) silane, triisopropoxy (hexyl) silane, trimethoxy (octyl) silane, triethoxy (octyl) silane, tripropoxy (octyl) silane, triisopropoxy (octyl) silane, trimethoxy (decyl) silane, triethoxy (decyl) silane, tripropoxy (decyl) silane, triisopropoxy (decyl) silane, trimethoxy (dodecyl) silane, triethoxy (dodecyl) silane, tripropoxy (dodecyl) silane, triisopropoxy (dodecyl) silane, and derivatives bearing similar structures. In some embodiments, these agent may be dissolved or dispersed in an organic solvent or a mixture of organic solvents. The concentration of these agent(s) in organic solvent(s) is equal to or between 0.1 and 15 vol. %. Example organic solvents may include, but are not limited to, methanol, ethanol, n-propanol, isopropanol, n-butanol, isobutanol, acetone, acetonitrile, dioxane, tetrahydrofuran, tetrachloroethylene, n-propyl bromide, dimethylformamide, dimethyl sulfoxide, and water. Other chemical agents may also be used alone or in conjunction with alkoxyalkylsilanes to perform similar tasks to render the surface hydrophobic and/or to generate nanoscopic topography.

In some embodiments, the alkoxyalkylsilane $[Ch_3(CH_2)_a]_bSiR_c[alkoxy]_d$ can be chemically converted from alkylsilane $[CH_3(CH_2)_a]_bSiR_cX_d$ by mixing and heating the fluoroalkylsilane in the correspondent solvent(s) (e.g. methanol, ethanol, isopropanol, and/or water). The mixture of the thereof chemical agents can be stirred at elevated temperature equal to or between 50 to 100° C. for about 1 hour to 7 days in an acidic environment (pH≤1) before being neutralized with KOH (may contain up to 15% (by weight) of water) until the pH reached is equal to or between 6 and 8. These solutions can then be used directly or further diluted in an appropriate solvent (e.g. methanol, ethanol, isopropanol, denatured ethanol, water, etc.).

In some embodiments, the coating can comprise a single layer. In other embodiments, the coating can comprise a multilayer coating comprising from two to five layers. In some embodiments, the coating can comprise a metal-oxide layer (e.g., a $SiO_2$ layer). For example, in some examples, the coating can comprise an organic-inorganic hybrid layer (e.g., comprising a metal oxide such as $SiO_2$) and a hydrophobic surface coating (e.g., a fluoropolymer and/or other hydrophobic chemical agent described above). In some embodiments, the coating can comprise an organic-inorganic hybrid layer and a primer layer to enhance adhesion of the organic-inorganic hybrid layer to the surface of the ESP. In some embodiments, the coating can comprise an organic-inorganic hybrid layer, a hydrophobic surface coating (e.g., a fluoropolymer and/or other hydrophobic chemical agent described above), and a primer layer to enhance adhesion of the organic-inorganic hybrid layer to the surface of the ESP. In some examples, the coating can have a total thickness of from 500 nm to 250 microns (e.g., from 1 micron to 200 microns, or from 5 microns to 120 microns). In some embodiments, the coating can exhibit a surface energy of 40 mN/m or less (e.g., 35 mN/m or less, 30 mN/m or less, 25 mN/m or less, or 20 mN/m or less). For example, in some embodiments, the coating can exhibit a surface energy of from 10 to 40 mN/m.

A wide variety of other suitable coatings and coating materials are known in the art, including fluoropolymer coatings (e.g., perfluoroalkoxy alkanes, polytetrafluoroethylene, polyvinylfluoride, polyvinylidene fluoride, polychlorotrifluoroethylene, fluorinated ethylene-propylene, polyethylenetetrafluoroethylene, polyethylenechlorotrifluoroethylene, perfluorinated elastomers such as FFPM, FFKM, FPM, FKM, or FEPM, perfluoropolyether, copolymers thereof, and blends thereof), phenolic coatings, and epoxy coatings. Suitable coatings and coating components are known in the art, and include those coatings described in U.S. Pat. Nos. 9,029,491, 6,288,198, 6,630,205, 7,345,131, U.S. Patent Application Publication No. 2008/090010, U.S. Patent Application Publication No. 2003/049486, U.S. Patent Application Publication No. 2007/017402 A1, U.S. Patent Application Publication No. 2009/0099287, U.S. Patent Application Publication No. 2008/0090010, U.S. Patent Application Publication Nos. 2010/0291487, 2011/0268899, 2003/0080458, and 2010/0092686, DE10106342, each of which is hereby incorporated by reference in its entirety. Examples of suitable commercially available coatings and coating materials include, for example, coatings and coating materials available under the tradename StreaMax™ from Chemours (fluoropolymer-based coating systems), HeatX™ from Oceanit (nanocomposite omniphobic coatings), Curramix™ from Curran (including epoxy coatings sold under the tradenames Curran 500™, Curran 1000R™, Curran 1200™, Curran 1500™, and Curran 2500™), and CORE Coat™ from Danish Technological Institute (DTI) (including sol-gel coatings under the tradenames CC010 ™, CC020 ™, and CC030 ™), or any combination thereof. At least one of these entities also offers services to apply a coating(s).

The downhole fluid lifting equipment is not limited to ESPs, and for example, a hydraulic submersible pump, gas lift equipment, or other lifting equipment may be utilized in some embodiments. The rate of flow of fluids through the production wellbores 30, 34 and the injection wellbore 32 may be limited by the fluid handling capacities of the surface facilities. Furthermore, while the control devices 54, 56, 60 are illustrated above surface in FIG. 2, control devices can also be positioned downhole to control the flow of fluids injected into or received from each of the hydrocarbon-bearing zones 22, 24.

The production wellbores 30, 34 may also include tubings 62, 68 for adding concentration of viscosity reducers 74, 78 into the production wellbores 30, 34. The viscosity reducers 74, 78 may be stored in one or more storage tanks on the surface 40 and pumped down the tubings 62, 68 using one or more pumps on the surface 40. For example, a storage tank may be utilized for the viscosity reducer 74 and a different storage tank may be utilized for the viscosity reducer 78, or alternatively, a common storage tank may be utilized for both the viscosity reducers 74, 78. Similarly, a pump may be utilized for the viscosity reducer 74 and a different pump may be utilized for the viscosity reducer 78, or alternatively, a common pump may be utilized for both the viscosity reducers 74, 78. The tubings 62, 68 may be new tubing, existing tubing, or any combination thereof. For example, any existing tubing already located in the production wellbores 30, 34, such as to inject a corrosion inhibitor or a scale inhibitor, may be utilized to add the viscosity reducers 74, 78 into the production wellbores 30, 34. The tubings 62, 68 may be ⅛ inch to ½ inch in diameter. As illustrated, outlets of the tubings 62, 68 may be positioned towards the bottom of the production wellbores 30, 34 so that the viscosity reducers 74, 78 exit the outlets prior to any downhole fluid lifting equipment (e.g., the ESPs 64, 70) in the production wellbores 30, 34. The viscosity reducers 74, 78 may be added towards the bottom of the production wellbores 30, 34 regardless of the location of the ESPs 64, 70. In some embodiments, the tubings 62, 68 (and outlets of the tubings 62, 68) may be positioned in a different location than illustrated in FIG. 2. The tubings 62, 68 should be long enough to position the outlets in the desired locations in the production wellbores 30, 34.

Figure 3:
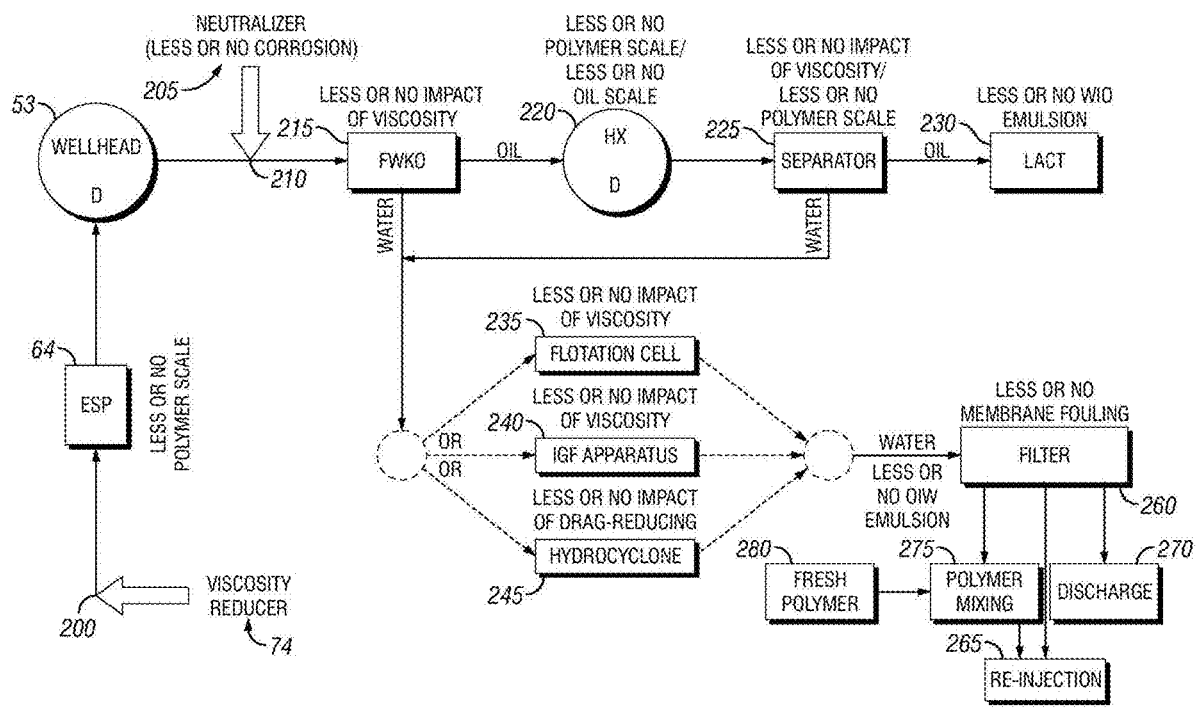
FIG. 3 illustrates a more detailed view of the system of FIG. 2, including the surface fluid processing equipment of FIG. 2.

FIG. 3 is a more detailed view of the system of FIG. 2, including a more detailed view of the surface fluid processing equipment 41 on the surface 40. For simplicity, FIG. 3 will focus on the production wellbore 30, but the same discussion applies to the production wellbore 34. FIG. 3 will focus on some possible places for the first location and the second location. Of note, in FIG. 3, the wellhead and other components illustrated after the wellhead may be coupled as illustrated in FIG. 3 via surface piping (sometimes referred to as flowline(s) or pipe(s)) to accomplish the fluid flow illustrated in FIG. 3.

As illustrated in FIGS. 2-3, the concentration of the viscosity reducer 74 may be added to the fluid 76 being produced by the production wellbores 30 at a first location 200 prior to any downhole fluid lifting equipment, such as prior to the ESP 64, in the production wellbore 30 via the tubing 62 for complete chemical degradation of the polymer present in the fluid 76. The first location 200 is in the vicinity of the outlet of the tubing 62 prior to the ESP 64. In some embodiments, the residence time of the viscosity reducer 74 in the fluid 76 for complete chemical degradation of the polymer is 10 minutes or less. The fluid 76 with the viscosity reducer 74, and with polymer that is on its way to complete chemical degradation or already undergone complete chemical degradation depending on the residence time of the viscosity reducer 74, flows up the production wellbore 30 through the ESP 64 towards the wellhead 53. Consistent with this disclosure, complete chemical degradation of the polymer in the fluid 76 may lead to less or no polymer scaling on the ESP 64. The concentration of the viscosity reducer 74 to be added may be determined through experiments in a laboratory setting as explained further hereinabove. Of note, the viscosity reducer may be added at the first location 200, or other downhole location, in the production wellbore 30 even if the production wellbore 30 did not include the ESP 64.

As illustrated in FIGS. 2-3, the fluid 76 with the viscosity reducer 74 flows from the wellhead 53 to at least one of the surface fluid processing equipment 41 on the surface 40 through surface piping. For example, the surface fluid processing equipment 41 comprises a FWKO 215, and the wellhead 53 and the FWKO 215 are coupled via surface piping. A concentration of neutralizer 205 is added to the fluid 76 being produced through the wellhead 53 at a second location 210 to neutralize the viscosity reducer 74 in the fluid 76. The second location 210 is upstream of the FWKO 215, in other words, the second location 210 is before the FWKO 215. In some embodiments, the residence time of the neutralizer 205 in the fluid 76 for complete neutralization of all excess viscosity reducer 74 in the fluid 76 is 10 minutes or less.

The neutralizer 205 may be stored in a storage tank on the surface 40 and added to the fluid 76 at the second location 210 using at least one dosing pump and at least one injection quill into the pipe coupling the wellhead 53 to the FWKO 215. For example, the quill (e.g., second injection apparatus) may penetrate about halfway through the pipe and about perpendicular to the flow stream to facilitate mixing of the neutralizer 205 with the fluid 76. The neutralizer 205 may mix with the fluid 76 without a mixer. The neutralizer 205 will cause complete neutralization of all excess viscosity reducer 74 in the fluid 76 prior to the fluid 76 reaching the FWKO 215. The concentration of the neutralizer 205 to be added may be determined through experiments in a laboratory setting as explained further hereinabove. The concentration of the viscosity reducer 74 discussed hereinabove and the concentration of the neutralizer 205 may be added continuously to the fluid 76.

The first location 200 (where the viscosity reducer 74 is added) is sufficiently upstream of the second location 210 (where the neutralizer 205 is added) to allow for complete chemical degradation of the polymer prior to the fluid 76 reaching the second location 210. The second location 210 is sufficiently upstream of any surface fluid processing equipment 41, such as the FWKO 215, to allow for complete neutralization of all excess viscosity reducer 74 in the fluid 76 prior to the fluid 76 reaching any surface fluid processing equipment 41. Consistent with this disclosure, complete neutralization of the excess viscosity reducer 74 may lead to less or no corrosion of the surface fluid processing equipment 41 by the viscosity reducer 74.

As illustrated in FIGS. 2-3, the fluid 76 with the neutralizer 205 (excess neutralizer) flows to the FWKO 215 to separate the water and the hydrocarbons (oil) of the fluid 76. Consistent with this disclosure, complete neutralization of the excess viscosity reducer 74 and complete chemical degradation of the polymer may lead to less or no impact of viscosity on the FWKO 215.

As illustrated in FIGS. 2-3, the surface fluid processing equipment 41 comprises a HX 220 downstream of the FWKO 215, and the second location 210 is upstream of the FWKO 215. The FWKO 215 and the HX 220 are coupled via surface piping. The fluid 76, primarily the hydrocarbons, flow from the FWKO 215 through the HX 220 to heat the fluid 76. Consistent with this disclosure, complete neutralization of the excess viscosity reducer 74 and complete chemical degradation of the polymer may lead to less or no polymer scale on the HX 220. Furthermore, consistent with this disclosure, complete neutralization of the excess viscosity reducer 74 and complete chemical degradation of the polymer may lead to less or no oil scale on the HX 220.

Of note, the HX 220 may be operated at a temperature that is 150 degrees Celsius or less (e.g., 145 degrees Celsius or less, 140 degrees Celsius or less, 135 degrees Celsius or less, 130 degrees Celsius or less, 125 degrees Celsius or less, 120 degrees Celsius or less, 115 degrees Celsius or less, 110 degrees Celsius or less, 105 degrees Celsius or less, 100 degrees Celsius or less, 95 degrees Celsius or less, 90 degrees Celsius or less, 85 degrees Celsius or less, 80 degrees Celsius or less, 75 degrees Celsius or less, 70 degrees Celsius or less, 65 degrees Celsius or less, 60 degrees Celsius or less, 55 degrees Celsius or less, 50 degrees Celsius or less, 45 degrees Celsius or less, 40 degrees Celsius or less, 35 degrees Celsius or less, 30 degrees Celsius or less, 25 degrees Celsius or less, 20 degrees Celsius or less, 15 degrees Celsius or less, 10 degrees Celsius or less, 5 degrees Celsius or less). In one embodiment, the HX 220 may be operated at a temperature that is at least 1 degrees Celsius (e.g., at least 5 degrees Celsius, at least 10 degrees Celsius, at least 15 degrees Celsius, at least 20 degrees Celsius, at least 25 degrees Celsius, at least 30 degrees Celsius, at least 35 degrees Celsius, at least 40 degrees Celsius, at least 45 degrees Celsius, at least 50 degrees Celsius, at least 55 degrees Celsius, at least 60 degrees Celsius, at least 65 degrees Celsius, at least 70 degrees Celsius, at least 75 degrees Celsius, at least 80 degrees Celsius, at least 85 degrees Celsius, at least 90 degrees Celsius, at least 95 degrees Celsius, at least 100 degrees Celsius, at least 105 degrees Celsius, at least 110 degrees Celsius, at least 115 degrees Celsius, at least 120 degrees Celsius, at least 125 degrees Celsius, at least 130 degrees Celsius, at least 135 degrees Celsius, at least 140 degrees Celsius, or at least 145 degrees Celsius). In one embodiment, the HX 220 may be operated at a temperature range of 1 degrees Celsius to 150 degrees Celsius, 40 degrees Celsius to 140 degrees Celsius, 80 degrees Celsius to 135 degrees Celsius, 1 degree Celsius to 140 degrees Celsius, 4 degrees Celsius to 140 degrees Celsius, or 80 degrees Celsius to 140 degrees Celsius. The temperature ranges from any of the minimum values described above to any of the maximum values described above. The temperature of the HX 220 may depend on the specifics of the fluid 76 being produced via the production wellbore 30, the specifics of the hydrocarbons, etc.

In some embodiments, at least a portion of the HX may be coated with a coating to reduce polymer adherence. In some embodiments, at least a portion of the HX which is in contact with fluid during operation is coated with a coating to reduce polymer adherence. In certain embodiments, substantially all of the HX which is in contact with fluid during operation is coated with a coating to reduce polymer adherence. In some embodiments, the heat exchanger comprises a plurality of plates (such as, but not limited to, plate and frame heat exchangers or plate and shell heat exchangers), and at least one of these plates may be coated with the coating to reduce polymer adherence. In some embodiments, the heat exchanger comprises a plurality of tubes (such as, but not limited to, shell and tube heat exchangers), and at least one of these tubes may be coated with the coating to reduce polymer adherence. When present, the coating can be any of the coatings described above with respect to the ESP.

As illustrated in FIGS. 2-3, the surface fluid processing equipment 41 comprises a separator 225 downstream of the HX 220, and the second location 200 is upstream of the FWKO 215. The HX 220 and the separator 225 are coupled via surface piping. The fluid 76, primarily the hydrocarbons, flow from the HX 220 through the separator 225 to further separate the water and the hydrocarbons. Consistent with this disclosure, complete neutralization of the excess viscosity reducer 74 and complete chemical degradation of the polymer may lead to less or no impact of viscosity on the separator 225. Furthermore, consistent with this disclosure, complete neutralization of the excess viscosity reducer 74 and complete chemical degradation of the polymer may lead to less or no polymer scale on the separator 225.

As illustrated in FIGS. 2-3, the hydrocarbons from the separator 225 flow via surface piping to a Lease Automatic Custody Transfer unit (LACT) 230 for sale and other activities. Consistent with this disclosure, complete neutralization of the excess viscosity reducer 74 and complete chemical degradation of the polymer may lead to less or no water in oil (WIO) emulsions in the LACT 230.

As illustrated in FIGS. 2-3, the surface fluid processing equipment 41 comprises a flotation cell, an IGF apparatus, a hydrocyclone, a filter, or any combination thereof downstream of the FWKO 215, and the second location 210 is upstream of the FWKO 215. These components may be coupled as illustrated in FIG. 3 via surface piping to handle primarily the water of the fluid 76. A flotation cell 235, an IGF apparatus 240, a hydrocyclone 245, or any combination thereof may be utilized to remove solids and any remaining hydrocarbons from the water of the fluid 76. For example, the water of the fluid 76 from the FWKO 215, the separator 225, or both may flow through a flotation cell 235. Consistent with this disclosure, complete neutralization of the excess viscosity reducer 74 and complete chemical degradation of the polymer may lead to less or no impact of viscosity on the flotation cell 235. Alternatively, for example, the water of the fluid 76 from the FWKO 215, the separator 225, or both may flow through the IGF apparatus 240. Consistent with this disclosure, complete neutralization of the excess viscosity reducer 74 and complete chemical degradation of the polymer may lead to less or no impact of viscosity on the IGF apparatus 240. Alternatively, for example, the water of the fluid 76 from the FWKO 215, the separator 225, or both may flow through the hydrocyclone 245. Consistent with this disclosure, complete neutralization of the excess viscosity reducer 74 and complete chemical degradation of the polymer may lead to less or no impact of drag-reducing on the hydrocyclone 245. Furthermore, consistent with this disclosure, complete neutralization of the excess viscosity reducer 74 and complete chemical degradation of the polymer may lead to less or no oil in water emulsions in the water of the fluid 76 flowing out of the flotation cell 235, the IGF apparatus 240, and the hydrocyclone 245. In some embodiments, the water of the fluid 76 may flow through two of these components or even flow through all three of these components.

As illustrated in FIGS. 2-3, the water of the fluid 76 flows from the flotation cell 235, the IGF apparatus 240, the hydrocyclone 245, or any combination thereof via surface piping through a filter 260 to remove any remaining solids. Consistent with this disclosure, complete neutralization of the excess viscosity reducer 74 and complete chemical degradation of the polymer may lead to less or no membrane fouling of the filter 260.

As illustrated in FIGS. 2-3, the water of the fluid 76 flows from the filter 260 to re-injection 265, discharge 270, polymer mixing 275, or any combination thereof. Regarding re-injection 265, the water of the fluid 76 may be injected into the hydrocarbon-bearing formation 20 (e.g., via the injection wellbore 32 or different injection wellbore), a different hydrocarbon-bearing formation via a different injection wellbore, or any combination thereof. Regarding discharge 270, the water in the fluid 76 may be discharged as permitted by law.

Regarding polymer mixing 275, a concentration of additional polymer 280 may be added to the water of the fluid 76 to increase the viscosity of the water of the fluid 76. For example, the additional polymer may be added at a third location (e.g., after the filter 260) that is downstream of the second location. For instance, after the filter 260, the water of the fluid 76 may return to a main water line and the additional polymer 280 may mixed in with the water of the fluid 76 to create more fluid 57 for injection (discussed in FIG. 2). Thus, the third location may be the location where polymer is mixed in at the surface 40, such as where at least one mixer is located for mixing polymer, for this EOR process. The same or similar polymer mixing design utilized for the fluid 57 injected into the injection wellbore 32 that was used at the start of the EOR process may be utilized at polymer mixing 275, as explained further hereinabove. For example, polymer mixing 275 may include mixing the same synthetic polymer (with same constituents and same concentrations) in the same manner as the fluid 57 injected into the injection wellbore 32. However, in some embodiments, polymer mixing 275 may include making at least one change, such as, but not limited to, changing a constituent or concentration of the polymer, to improve hydrocarbon recovery. The polymer mixing 275 may be performed in a manner different than at the start of the EOR process.

The water of the fluid 76 with the increased viscosity may be injected into the hydrocarbon-bearing formation 20 (e.g., via the injection wellbore 32), a different hydrocarbon-bearing formation via a different injection wellbore, or any combination thereof, as discussed with re-injection 265.

Figure 4:
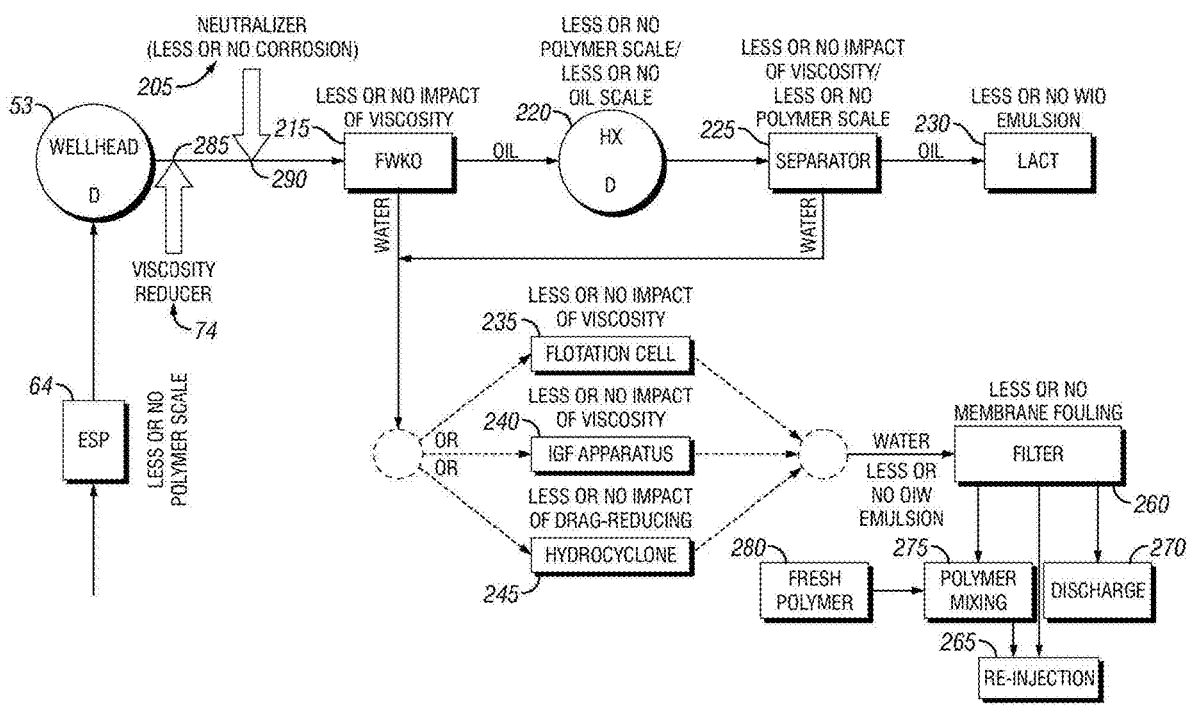
FIG. 4 illustrates a modification to the system of FIG. 3.

FIG. 4 illustrates the system of FIG. 3 with a different first location and a different second location. In FIG. 4, the viscosity reducer 74 is added at a first location 285 instead of the first location 200 of FIG. 3. The first location 285 of FIG. 4 is downstream of the wellhead 53 of the production wellbore 30. In FIG. 4, the neutralizer 205 is added at a second location 290 instead of the second location 210 of FIG. 3. The second location 290 of FIG. 4 is downstream of the wellhead 53 of the production wellbore 30. The first location 285 and the second location 290 are upstream of the FWKO 215. The first location 285 (where the viscosity reducer 74 is added) is sufficiently upstream of the second location 290 (where the neutralizer 205 is added) to allow for complete chemical degradation of the polymer prior to the fluid 76 reaching the second location 290. The second location 290 is sufficiently upstream of any surface fluid processing equipment 41, such as the FWKO 215, to allow for complete neutralization of all excess viscosity reducer 74 in the fluid 76 prior to the fluid 76 reaching any surface fluid processing equipment 41. Consistent with this disclosure, complete neutralization of the excess viscosity reducer 74 and complete chemical degradation of the polymer may lead to less or no corrosion of the surface fluid processing equipment 41, as well as other advantageous discussed in the context of FIG. 3.

The viscosity reducer 74 may be stored in a storage tank on the surface 40 and added to the fluid 76 at the first location 285 using at least one dosing pump and at least one injection quill into the pipe coupling the wellhead 53 to the FWKO 215. For example, the quill (e.g., first injection apparatus) may penetrate about halfway through the pipe and about perpendicular to the flow stream to facilitate mixing of the viscosity reducer 74 with the fluid 76. The viscosity reducer 74 may mix with the fluid 76 without a mixer. The viscosity reducer 74 will cause complete degradation of the polymer in the fluid 76 prior to the fluid 76 reaching the second location 290 where the neutralizer 205 is added. The concentration of the viscosity reducer 74 to be added may be determined through experiments in a laboratory setting as explained further hereinabove. The concentration of the viscosity reducer 74 (and the concentration of the neutralizer, discussed further hereinbelow) may be added continuously to the fluid 76.

Similarly, the neutralizer 205 may be stored in a storage tank on the surface 40 and added to the fluid 76 at the second location 290 using at least one dosing pump and at least one injection quill into the pipe coupling the wellhead 53 to the FWKO 215, as explained hereinabove in the context of the second location 210 in FIG. 3. The neutralizer 205 will cause complete neutralization of all excess viscosity reducer 74 in the fluid 76 prior to the fluid 76 reaching the FWKO 215. The concentration of the neutralizer 205 to be added may be determined through experiments in a laboratory setting as explained further hereinabove.

Indeed, the viscosity reducer may be added at practically any location downhole in the production wellbore or practically any location on the surface as long as the location satisfies the criteria (a)-(b). Similarly, the neutralizer may be added at practically any location downhole in the production wellbore or practically any location on the surface as long as the location satisfies the criteria (a)-(b). In some embodiments, the first location may even represent a plurality of locations such that the viscosity reducer is added at multiple locations and/or the second location may even represent a plurality of locations such that the neutralizer is added at multiple locations as long as the criteria (a)-(b) is satisfied.

Furthermore, those of ordinary skill in the art will appreciate that other modifications may be made to the systems illustrated in FIGS. 3-4. For example, the separator 225 may be positioned upstream of the FWKO 215 if the fluid 76 being produced via the production wellbore 30 is expected to contain a lot more hydrocarbons than water. The FWKO 215 may be upstream of the separator 225 (as in FIGS. 3-4) if the fluid 76 being produced via the production wellbore 30 is expected to contain a lot more water than hydrocarbons.

Example 1: Sodium hypochlorite (NaOCl), the viscosity reducer, may be effective in purifying water on a large scale. Sodium hypochlorite dissolved in water ionizes into the highly oxidative hypochlorous acid (HOCl) and less active hypochlorite ion (OCl−). The pH controls the abundance of each species. No pH modification was used for these experiments. The concentration of sodium hypochlorite caused the powder polymer X to undergo complete chemical degradation, which is indicated by the viscosity of <1 cp for the brine. Indeed, the viscosity of the brine having powder polymer X returned to the viscosity of the polymer-free version of that brine due to the viscosity reducer of NaOCl. As indicated herein, a viscosity of less than 1.4 cp for the brine indicates complete chemical degradation of the polymer.

In this Example 1, powder polymer X was hydrated for 24 hours in brine to yield a concentration of 10,000 ppm. The solution was diluted with 73:27 brine to a concentration of 2,000 ppm (typical dosage of polymer for CEOR). The solution was allowed to stir at 400 rpm for a period of 2 hours to fully hydrate the diluted polymer. To 20 mL of polymer solution, 0.125 µL of 7.85% NaOCl was added. As polymer degrade, the viscosity is reduced to less than 1 cp. The viscosity was measured as a function of time on a Brookfield DV-E LV with UL adapter at 25° C. The results of the study is provided in Table 2 below:

TABLE 2

Viscosity of 2000 ppm of powder polymer in 73:27 brine treated with 7.85% NaOCl as a function of time

| Polymer | Conc, ppm | Polymer, mL | NaOCl wt % | NaOCl, uL | RPM | Time, min | Visc, cp |
|---|---|---|---|---|---|---|---|
| Powder polymer X | 2000 | 20 | — | — | 6 | 0 | 31.9 |
| Powder polymer X | 2000 | 20 | 7.85 | 0.125 | 6 | 3 | <1 |

Figure 5:
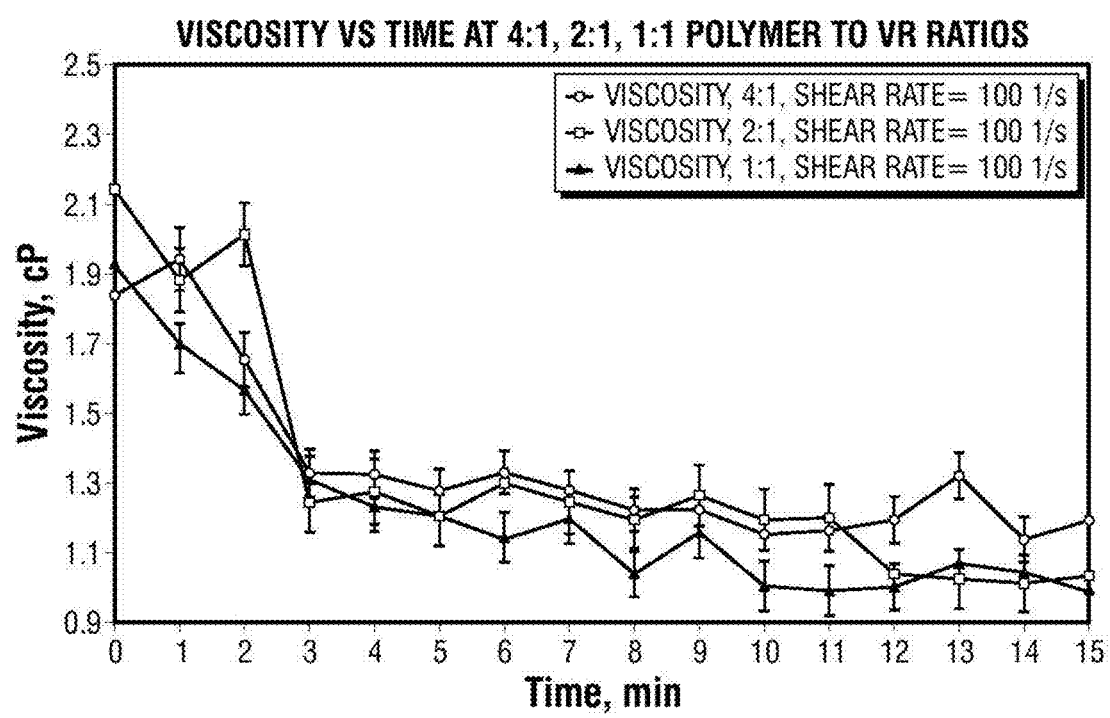
FIG. 5 is a plot illustrating a viscosity reduction example.

Example 2: FIG. 5 is a plot illustrating a viscosity reduction example. More specifically, FIG. 5 is a plot illustrating a reduction in viscosity in three samples as a function of time. The viscosity reducer in these three samples is sodium hypochlorite (NaOCl). These three samples were prepared using fluid being produced from an active production wellbore and the water in these three samples is brine. The sample corresponding with the curve having the x's has a ratio of polymer concentration to viscosity reducer concentration of 1:1. The sample corresponding with the curve having the squares has a ratio of polymer concentration to viscosity reducer concentration of 2:1. The sample corresponding with the curve having the diamonds has a ratio of the polymer to the viscosity reducer is 4:1 by concentration. Hydrocarbons were not present in the samples. The polymer in these three samples is HPAM. The polymer is present because the three sample include brine being produced that includes polymer, but it is also contemplated in this disclosure that representative synthetic samples may be created and polymer may be added to the synthetic samples.

As discussed hereinabove, complete chemical degradation of the polymer may be detected indirectly when the viscosity of the water decreases to the viscosity of the polymer-free version of that water (brine in these three samples). FIG. 5 illustrates that the viscosity of the curves with the squares and the x's decreased to about 1 cp at 20° C. in response to the addition of the viscosity reducer. A viscosity of about 1 cp at 20° C. is consistent with the viscosity of polymer-free brine. Thus, the polymer corresponding to the curves with the squares and the x's has undergone complete chemical degradation in response to the addition of the viscosity reducer. As indicated herein, a viscosity of less than 1.4 cp for the brine indicates complete chemical degradation of the polymer.

Of note: The curve with the diamonds does illustrate a reduction in viscosity, but the viscosity at 15 minutes is higher than the viscosity of the other two curves at 15 minutes of about 1 cp at 20° C. The higher viscosity of the curve with the diamonds potentially indicates that a higher concentration of the viscosity reducer is needed for the higher concentration of polymer in order to reduce the viscosity to that of polymer-free brine, or a measurement error occurred.

Figure 6:
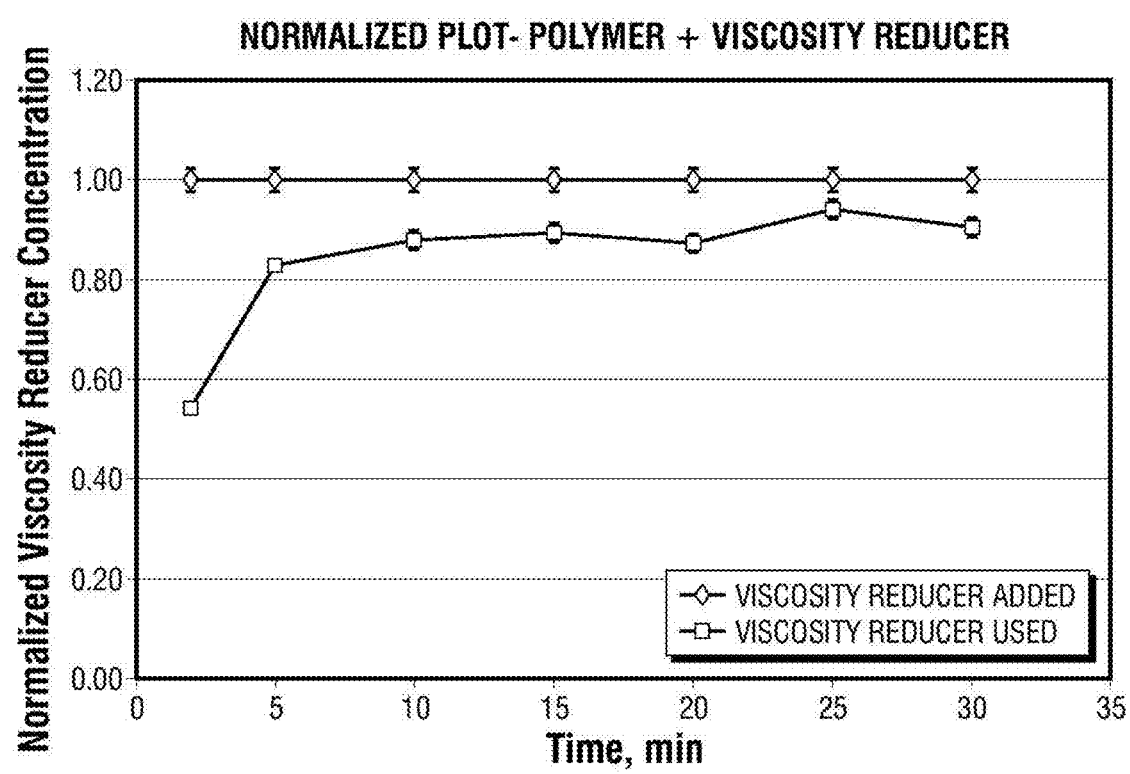
FIG. 6 is a plot illustrating a viscosity reducer example.

Example 3: FIG. 6 is a plot illustrating a viscosity reducer example. More specifically, FIG. 5 illustrates a normalized viscosity reducer concentration added to a sample and the reaction of the normalized viscosity reducer concentration with a polymer concentration as a function of time. The viscosity reducer in this sample is sodium hypochlorite (NaOCl). This sample was prepared using fluid being produced from an active production wellbore and the water in this sample is brine. The polymer in this sample is HPAM. The ratio of the polymer to the viscosity reducer is 1:1 by concentration.

In FIG. 6, for every part of viscosity reducer added, about 90% of the viscosity reducer is used up in the reaction. About 10% of the concentration of the viscosity reducer remains in the sample as excess viscosity reducer based on titration. As discussed hereinabove, the excess viscosity reducer will undergo complete neutralization with a concentration of neutralizer.

Figure 7:
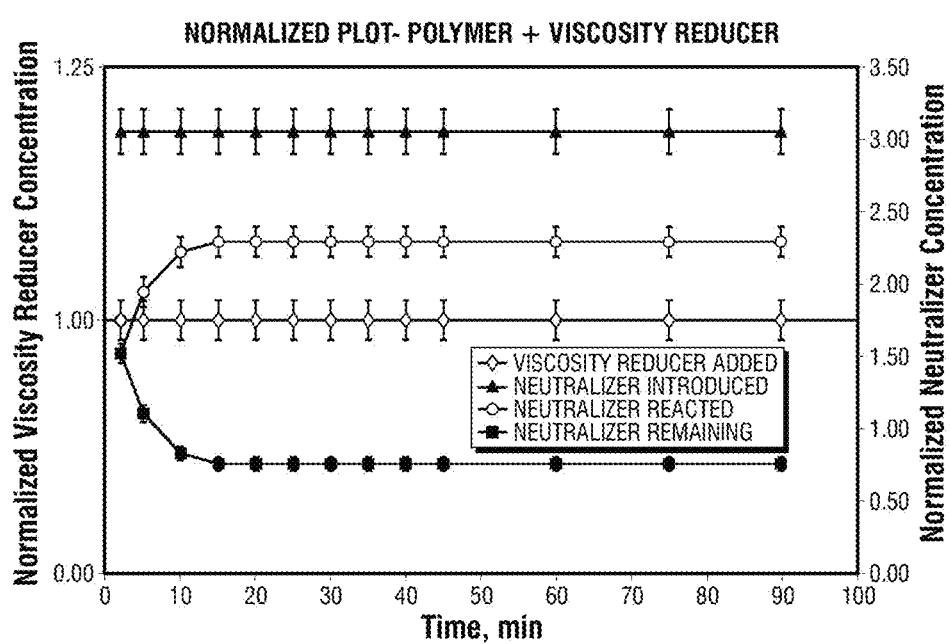
FIG. 7 is a plot illustrating a neutralizer example.

Example 4: FIG. 7 is a plot illustrating a neutralizer example. More specifically, FIG. 7 illustrates a normalized neutralizer concentration added to a sample and the reaction of the normalized neutralizer concentration with a normalized viscosity reducer concentration. FIG. 7 also illustrates the amount of excess neutralizer remaining in the sample after the reaction via titration at ambient temperature. The viscosity reducer in this sample is sodium hypochlorite (NaOCl). The sample was prepared using fluid being produced from an active production wellbore and the water in this sample is brine. The neutralizer in this sample is sodium thiosulfate. The curve with the diamonds indicates that the normalized viscosity reducer concentration is 1.00 in the sample. The curve with the triangles indicates that the normalized neutralizer is 3.1 in the sample. The ratio of the viscosity reducer to the neutralizer is 1:3.3 by concentration.

In FIG. 7, the curve with the circles indicates that the neutralizer reacted with the viscosity reducer as illustrated in the secondary y-axis on the right. The curve with the squares indicates that excess neutralizer remained, determined through titration, as illustrated in the secondary y-axis on the right. The presence of the excess neutralizer indicates that the viscosity reducer has undergone complete neutralization.

Figure 8:
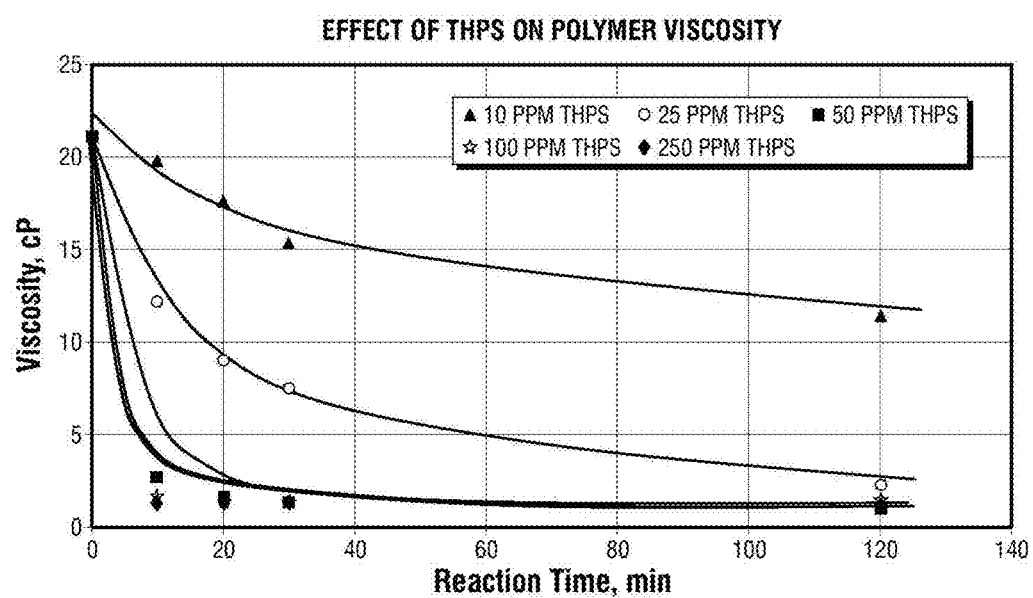
FIG. 8 is a plot illustrating another viscosity reduction example.

Example 5: FIG. 8 is a plot illustrating another viscosity reduction example. More specifically, FIG. 8 is a plot illustrating a reduction in viscosity in five samples as a function of time. The viscosity reducer in these five samples is tetrakis(hyroxymethyl)-phosphonium sulfate (THPS). Sodium thiosulfate was used as a neutralizer to arrest the reactions. The three curves with squares and diamonds, corresponding to 50 ppm THPS, 100 THPS, and 250 ppm THPS, indicate that the viscosity of the sample returned to a viscosity of polymer-free water of less than 1.4 cp.

Figure 9:
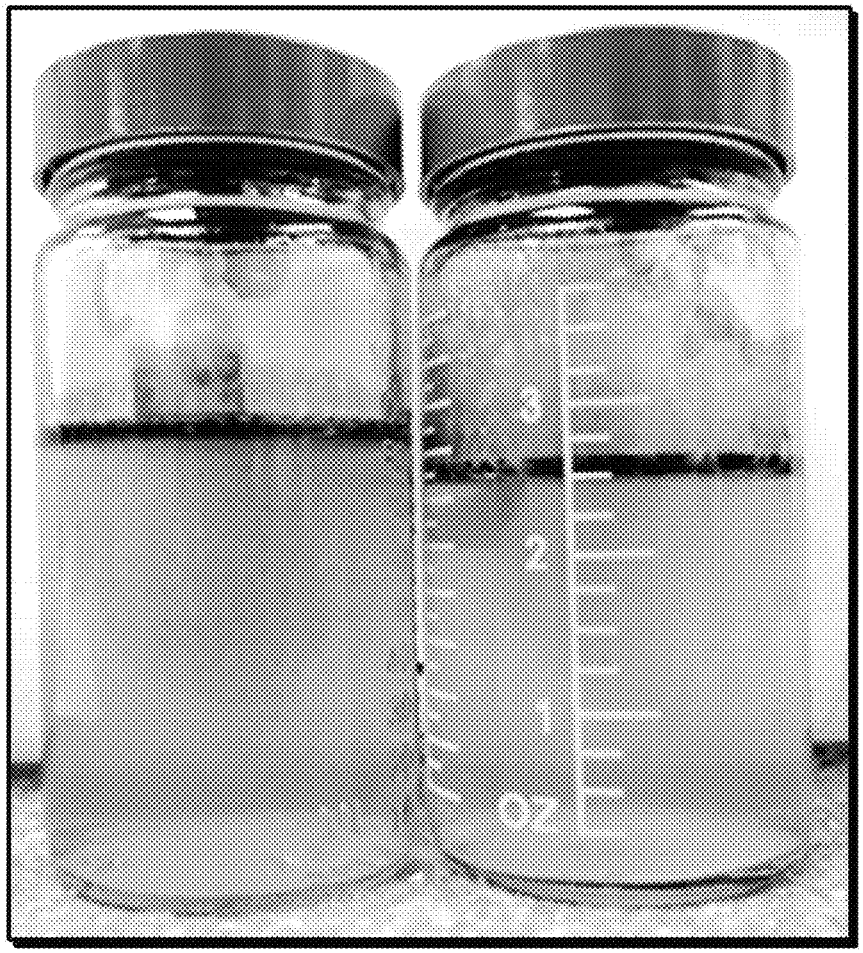
FIG. 9 illustrates an example showing a reduction in oil in water emulsions due to a viscosity reducer.

Example 6: FIG. 9 illustrates that approximately 7 minutes after the addition of 100 ppm of sodium hypochlorite, which is the viscosity reducer, the control showed approximately 300 ppm of oil in water (OIW) and the sample showed less than 70 ppm of OIW.

Figure 10:
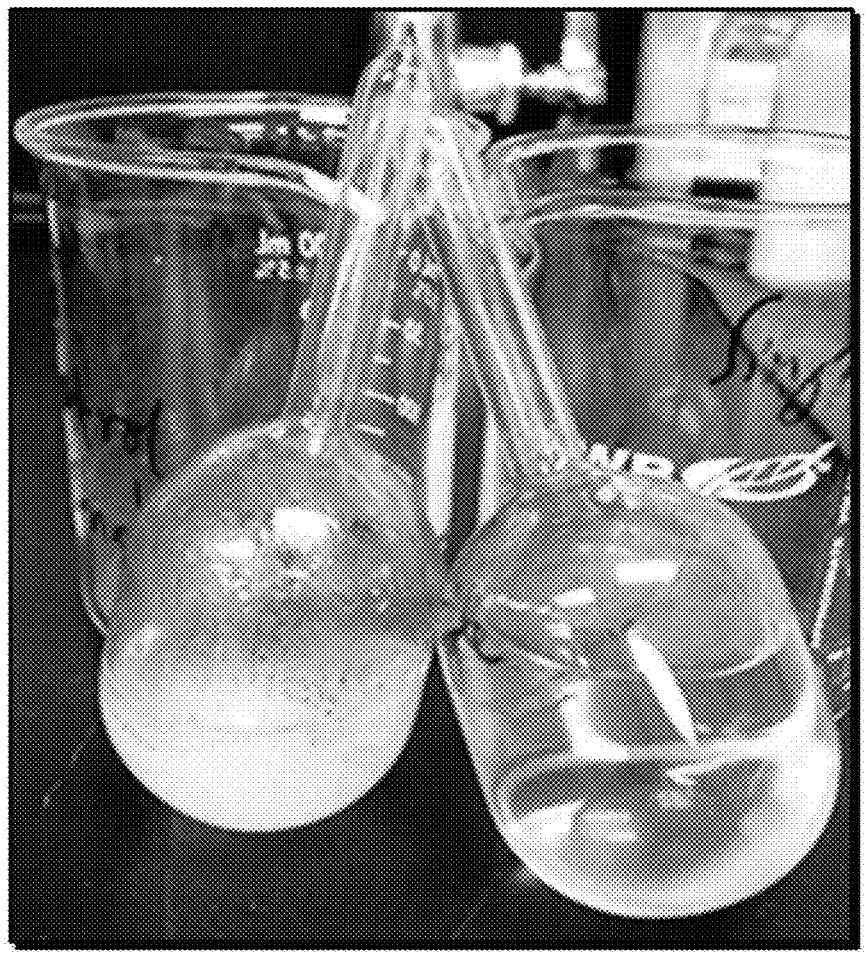
FIG. 10 illustrates an example showing absence of gelling due to a viscosity reducer.

Example 7: In FIG. 10, an absence of any gelling is observed in the sample containing approximately 100 ppm of sodium hypochlorite, which is the viscosity reducer. The control and the sample were heated at 120° C. for 60 h.

Example 8: The impact of pH on viscosity reduction. As described in the Examples above, a viscosity reducer can cleave the polymer backbone, reducing the polymer's molecular weight (and by extension the viscosity of a solution containing the effluent water). Further, oxidation of the polymer can allow for faster and more efficient oil-water separation. Specifically, the viscosity reducer can oxidize functional groups in the polymer chain, reducing the interaction between the polymer chain and oil molecules. This can increase the rate of the oil-water separation.

In this Example, the impact of pH on the activity of an example viscosity reducer was evaluated. By adjusting the pH of viscosity reducer, the reaction time of the viscosity reducer with the polymer can be reduced, providing for a faster and more efficient oil-water separation. In addition, by adjusting the pH of the viscosity reducer, cleavage of the polymer backbone can proceed more efficiently, more quickly reducing the viscosity of the effluent water. Further, colorimetric assays and/or viscosity measurements can be used to monitor the effect of the viscosity reducer, determine a pH at which to buffer the viscosity reducer, determine a concentration of viscosity reducer to add to effluent water, confirm the improvement provided by buffering the viscosity reducer, or any combination thereof.

Figure 12:
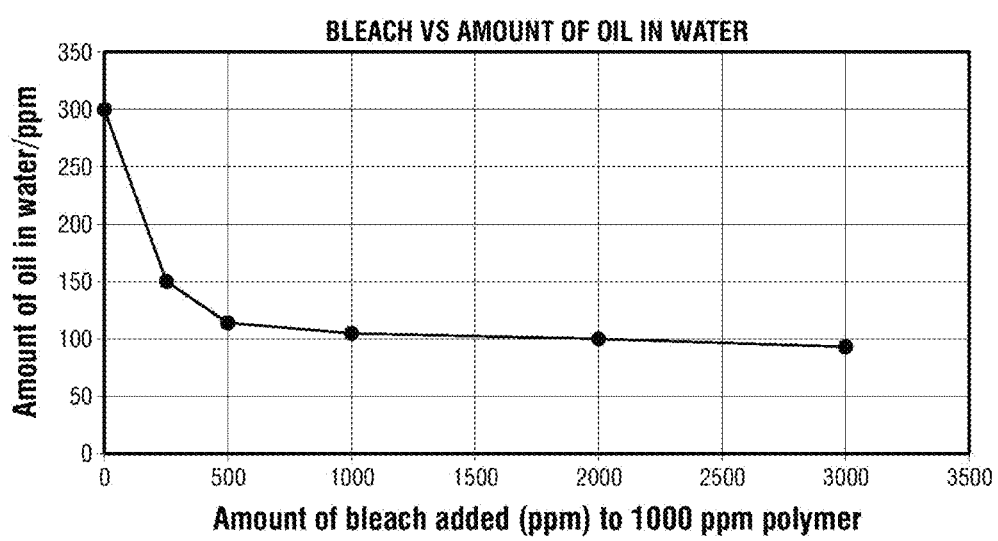
FIG. 12 is a plot showing the concentration of oil in water (in ppm) the addition of varying concentrations of aqueous NaOCl (pH 11.5).

FIG. 12 is a plot showing the concentration of oil in water (in ppm) upon the addition of varying concentrations of aqueous NaOCl. The pH of the aqueous NaOCl was not buffered or adjusted, and thus the aqueous NaOCl had a pH of approximately 11.5. All samples included 1000 ppm of polymer. The concentration of oil was measured 7 minutes after the addition of aqueous NaOCl. As shown in FIG. 12, the addition of increasing quantities of viscosity reducer resulted in a decrease in the concentration of oil present in the water (consistent with an increased rate of oil-water separation).

Figure 13:
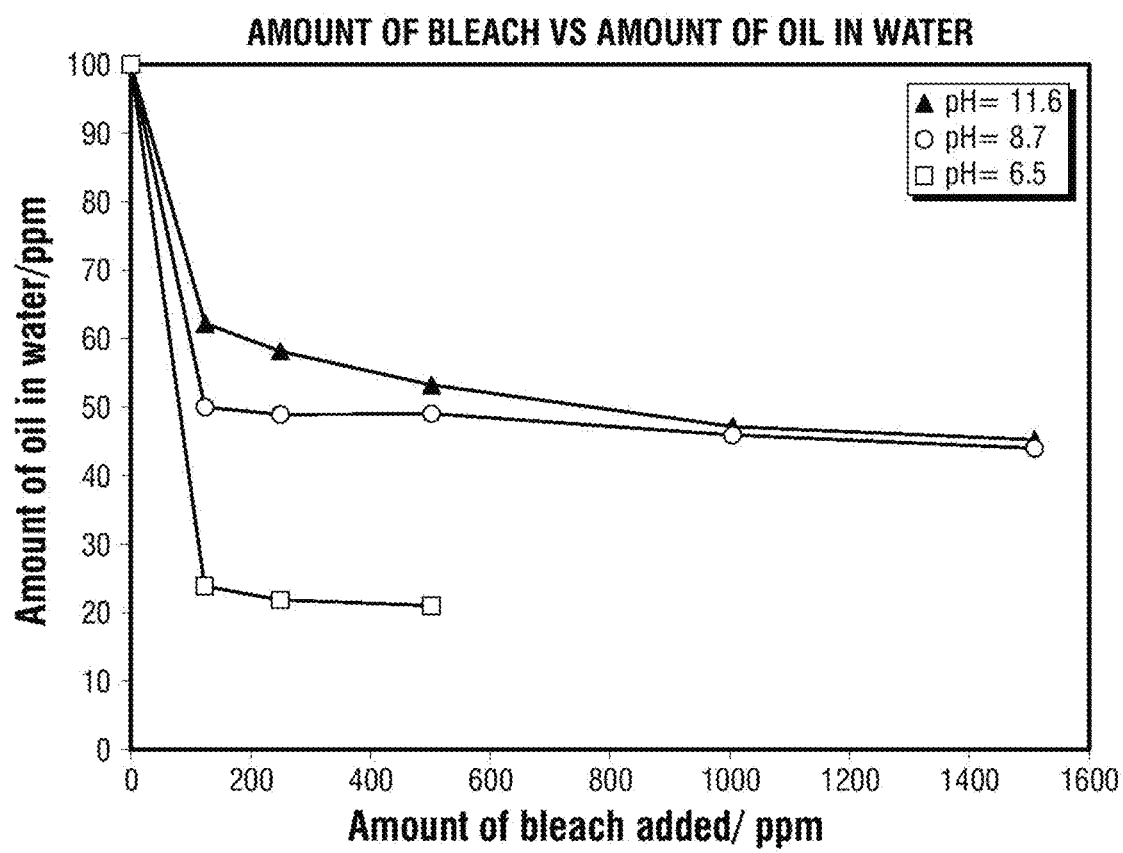
FIG. 13 is a plot showing the concentration of oil in water (in ppm) the addition of varying concentrations of aqueous NaOCl (pH 11.5, pH 8.7, and pH 6.5).

FIG. 13 compares the oil-water separation of a solution containing 500 ppm of polymer X upon the addition of varying quantities of three different aqueous NaOCl solutions: unbuffered NaOCl (pH 11.5), NaOCl buffered at pH 8.7, and NaOCl buffered at pH 6.5. The pH of the NaOCl solution was reduced by addition of varying quantities of acetic acid. The concentration of oil was measured 5 minutes after the addition of aqueous NaOCl. As shown in FIG. 13, as the pH of the aqueous NaOCl decreased, the concentration of oil present in the water also decreased (consistent with an increased rate of oil-water separation). Without wishing to be bound by theory, it is believed that hypochlorous acid (HOCl)—which forms upon the addition of NaOCl to water—is the primary active species which participates in the chemical reactions which degrade the polymer in solution. Lowering the pH of the viscosity reducer shifts the chemical equilibria which occur upon the addition of NaOCl to water, thereby increasing the concentration of HOCl present in the solution of viscosity reducer added to the oil-water mixture (and thus the rate of polymer degradation).

Figure 14A:
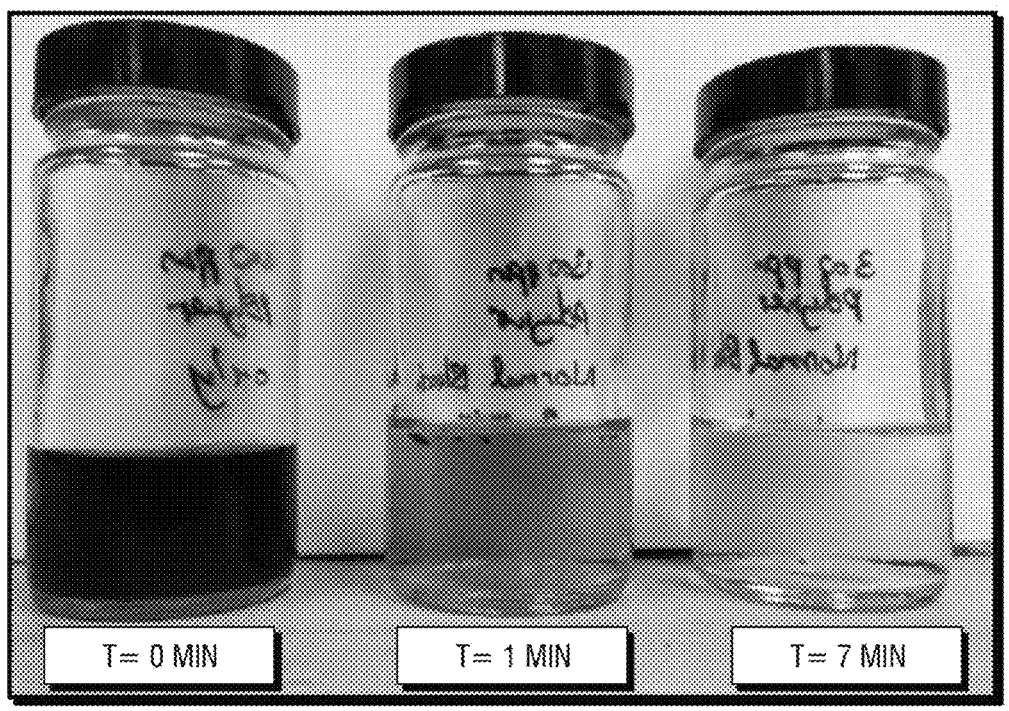
FIG. 14A and FIG. 14B illustrate the results of a colorimetric assay used to compare the reactivity of unbuffered NaOCl (pH 11.5.
Figure 14B:
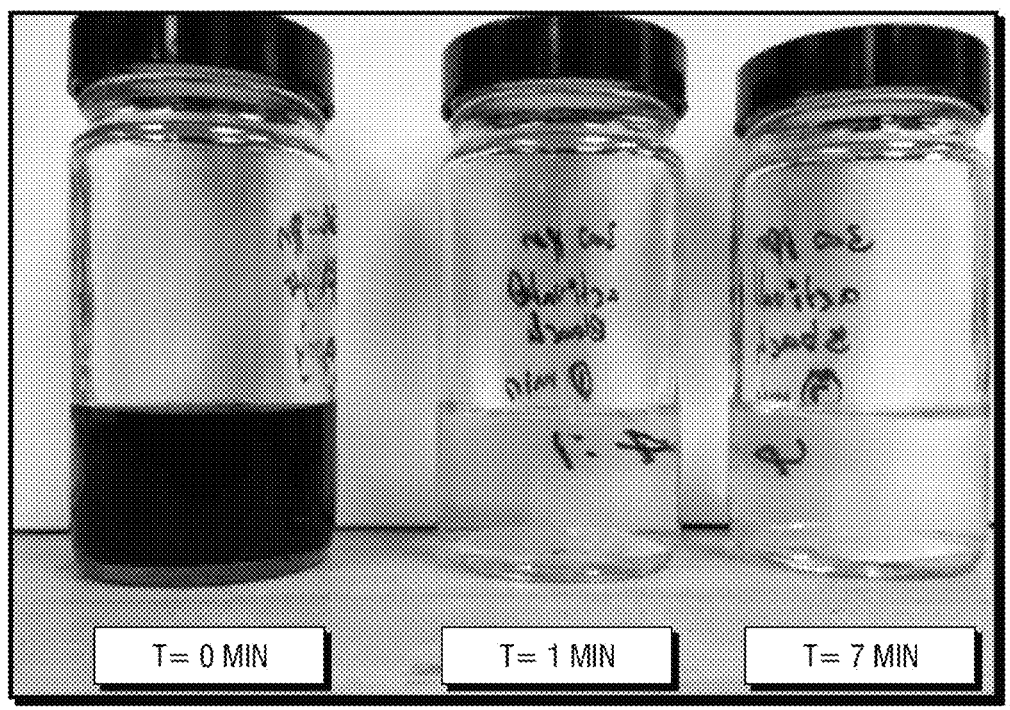

FIG. 14A and FIG. 14B illustrate the results of a colorimetric assay used to compare the reactivity of unbuffered NaOCl (pH 11.5; FIG. 14A) and NaOCl buffered at pH 6.5 (FIG. 14B) with a polymer over 7 minutes. The pH of the NaOCl solution was reduced by addition of acetic acid. All samples included 500 ppm polymer and 125 ppm of viscosity reducer (NaOCl). As shown in the photographs taken 1 minute after the addition of the viscosity reducer, the solution formed upon the addition of unbuffered NaOCl (pH 11.5; FIG. 14A) remained colored while the solution formed upon the addition of NaOCl buffered at pH 6.5 was colorless. This indicates that the buffered NaOCl reacted much more efficiently with the polymer.

Figure 15A:
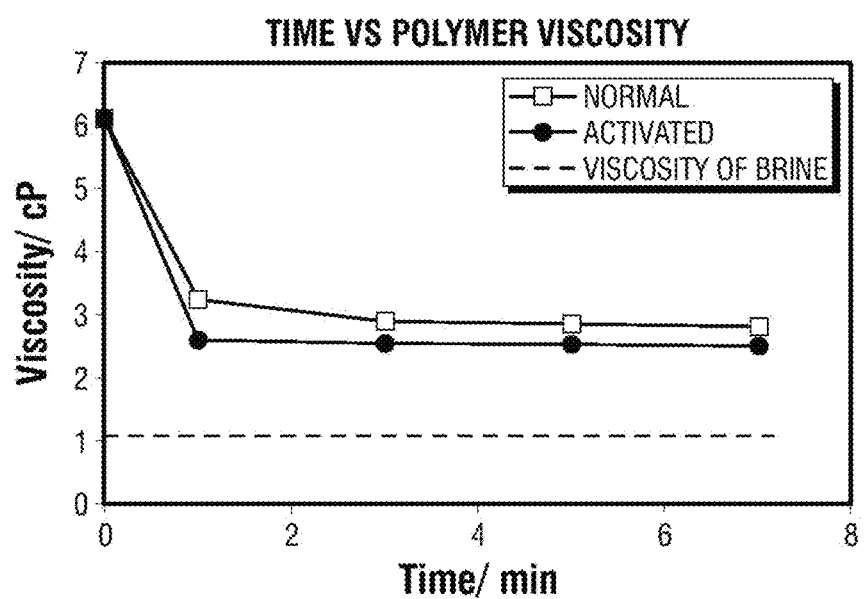
FIG. 15A and FIG. 15B compare the effect of the pH of the viscosity reducer on the viscosity of polymer solution over 7 minutes.
Figure 15B:
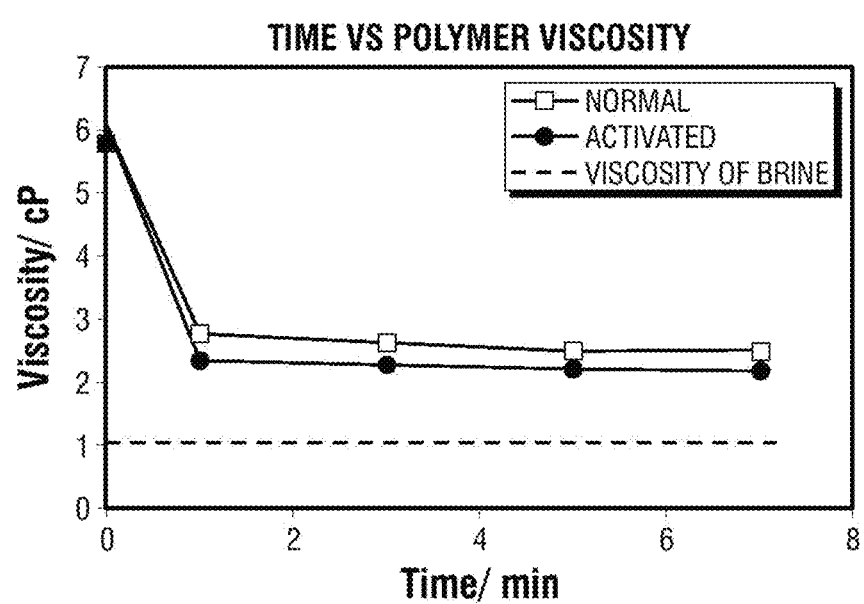

FIG. 15A and FIG. 15B compare the effect of the pH of the viscosity reducer on the viscosity of polymer solution over 7 minutes. FIG. 15A included 500 ppm polymer and 125 ppm of viscosity reducer (NaOCl). FIG. 15B included 500 ppm polymer and 250 ppm of viscosity reducer (NaOCl). As shown in FIG. 15A and FIG. 15B, the addition of NaOCl buffered at pH 6.5 (acetic acid added, labeled as "Activated") resulted in a larger and more rapid decrease in viscosity over 7 minutes than the addition of unbuffered NaOCl (pH 11.5). These results suggest that the activity of a viscosity reducer can be significantly improved by buffering the viscosity reducer at an appropriate pH prior to its addition to effluent water containing hydrocarbons, water and polymer.

In conclusion, following injection of various chemicals slugs in an EOR process, polymer is often produced with the oil and other injected chemicals, and frequently forms emulsions. Given the high viscosity of the polymer-rich fluid being produced via the production wellbore, higher concentrations of oil are entrapped. Furthermore, polymer shearing by electrical submersible pumps (ESP's), can create strong emulsions with high volumes of trapped oil. Traditional methods of water clarification using polymer-based flocculants are targeted to remove oil particulates that can adhere to the polymers. In some instances, the polymers are even tailored to specific oils. However, for polymer flooding, these polymers compete with the partially hydrolyzed polyacrylamide (HPAM's) that are sometimes used for EOR. The basic backbone for many water-soluble polymers is polyacrylamide and hence addition of specifically tailored polymers does not improve separation. It also does not address the driving force, i.e. the enhanced viscosity of produced polymer, which traps the oil. Other negative impacts, such as polymer scaling and membrane fouling, are also discussed. Provided herein are embodiments of systems and methods where the polymer undergoes complete chemical degradation using the viscosity reducer. Furthermore, the excess viscosity reducer undergoes complete neutralization using a neutralizer. By doing so, the fluid (e.g., the separated water of the fluid) may be made more suitable or suitable for re-injection, discharge, additional polymer mixing, or any combination thereof. Furthermore, in some embodiments, once the viscosity is lowered, additional emulsion breakers may also be utilized to readily target the oil-water interfaces due to reduced viscosity and rapidly induce separation.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. All citations referred herein are expressly incorporated herein by reference.

The invention claimed is:

1. A system of treating fluid, the system comprising:
a production wellbore for producing fluid comprising hydrocarbons, water, and polymer from a hydrocarbon-bearing formation;
a first injection apparatus for adding a concentration of a viscosity reducer to the fluid to degrade the polymer present in the fluid;
a second injection apparatus for adding a concentration of a neutralizer to the fluid to neutralize the viscosity reducer in the fluid; and
surface fluid processing equipment for separating the hydrocarbons from the fluid; wherein:
a pH of the viscosity reducer is lowered to a pH of 7 or less;
the addition of the concentration of the viscosity reducer is in a sufficient quantity to allow for complete chemical degradation of the polymer prior to the addition of the concentration of the neutralizer in the fluid such that excess viscosity reducer is present in the fluid; and
the addition of the concentration of the neutralizer is sufficiently upstream of any of the surface fluid processing equipment to allow for complete neutralization of the excess viscosity reducer such that excess neutralizer is present in the fluid prior to the fluid reaching any of the surface fluid processing equipment,
wherein the concentration of the viscosity reducer is added at a first location, and wherein the concentration of the neutralizer is added at a second location.

2. The system of claim 1, wherein the fluid is passed through the surface fluid processing equipment to separate the hydrocarbons and the water, and wherein a concentration of additional polymer is added to the separated water to increase the viscosity of the separated water, and
wherein the separated water with the increased viscosity is injected into the hydrocarbon-bearing formation, a different hydrocarbon-bearing formation, or any combination thereof.

3. The system of claim 1, wherein the surface fluid processing equipment comprises a free water knockout, a heat exchanger, a separator, a flotation cell, an induced gas flotation apparatus, a hydrocyclone, a filter, or any combination thereof.

4. The system of claim 3, wherein the surface fluid processing equipment comprises the heat exchanger and wherein at least a portion of the heat exchanger is coated with a coating to reduce polymer adherence.

5. The system of claim 4, wherein the coating has a thickness of from 5 microns to 120 microns.

6. The system of claim 4, wherein the coating comprises from one to three layers.

7. The system of claim 4, wherein the coating comprises an organic-inorganic hybrid coating, a fluoropolymer coating, or any combination thereof.

8. The system of claim 1, wherein the first location is prior to any downhole fluid lifting equipment in the production wellbore.

9. The system of claim 8, wherein the downhole fluid lifting equipment comprises an electronic submersible pump, a hydraulic submersible pump, gas lift equipment, or any combination thereof.

10. The system of claim 9, wherein the downhole fluid lifting equipment comprises the electric submersible pump and wherein at least a portion of the electric submersible pump is coated with a coating to reduce polymer adherence.

11. The system of claim 10, wherein the coating has a thickness of from 5 microns to 120 microns.

12. The system of claim 10, wherein the coating comprises an organic-inorganic hybrid coating, a fluoropolymer coating, or any combination thereof.

13. The system of claim 1, wherein the first location is downstream of a wellhead of the production wellbore.

14. The system of claim 1, wherein the surface fluid processing equipment comprises a free water knockout, and the second location is upstream of the free water knockout.

15. The system of claim 14, wherein the surface fluid processing equipment comprises a heat exchanger downstream of the free water knockout, and the second location is upstream of the free water knockout.

16. The system of claim 14, wherein the surface fluid processing equipment comprises a flotation cell, an induced gas flotation apparatus, a hydrocyclone, a filter, or any combination thereof downstream of the free water knockout, and the second location is upstream of the free water knockout.

17. The system of claim 14, wherein the first location and the second location are upstream of the free water knockout.

18. The system of claim 1, wherein the first location is sufficiently upstream of the second location to allow for complete chemical degradation of the polymer prior to the fluid reaching the second location, and wherein the second location is sufficiently upstream of any of the surface fluid processing equipment to allow for complete neutralization of the excess viscosity reducer in the fluid prior to the fluid reaching any of the surface fluid processing equipment.

19. The system of claim 1, wherein the concentration of the viscosity reducer and the concentration of the neutralizer are added continuously to the fluid.

20. The system of claim 1, wherein the fluid has a viscosity of less than 1.4 cp with a minimum viscosity of 0.9 cp after separation of at least some of the hydrocarbons from the fluid by the surface fluid processing equipment.

* * * * *